(12) United States Patent
Montero et al.

(10) Patent No.: US 12,322,195 B2
(45) Date of Patent: Jun. 3, 2025

(54) METHODS, SYSTEMS, ARTICLES OF MANUFACTURE, AND APPARATUS TO DETERMINE RELATED CONTENT IN A DOCUMENT

(71) Applicant: Nielsen Consumer LLC, Chicago, IL (US)

(72) Inventors: David Montero, Valladolid (ES); Javier Martinez Cebrian, Madrid (ES); Jose Javier Yebes Torres, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 207 days.

(21) Appl. No.: 18/148,947

(22) Filed: Dec. 30, 2022

(65) Prior Publication Data

US 2024/0013562 A1    Jan. 11, 2024

Related U.S. Application Data

(60) Provisional application No. 63/358,782, filed on Jul. 6, 2022.

(51) Int. Cl.
     *G06V 30/19*      (2022.01)
     *G06F 16/901*      (2019.01)
     (Continued)

(52) U.S. Cl.
     CPC .... *G06V 30/19187* (2022.01); *G06F 16/9024* (2019.01); *G06V 10/44* (2022.01);
     (Continued)

(58) Field of Classification Search
     CPC .................................................. G06F 16/9024
     See application file for complete search history.

(56) References Cited

U.S. PATENT DOCUMENTS 3,323,135 A    6/1967   Miller
5,410,611 A    4/1995   Huttenlocher et al.
(Continued)

FOREIGN PATENT DOCUMENTS

CA      2957433 A1    9/2017
CN    103123685 A    5/2013
(Continued)

OTHER PUBLICATIONS

Oliveira et al., "dhSegment: A generic deep-learning approach for document segmentation," In 16th International Conference on Frontiers in Handwriting Recognition (ICFHR), dated Aug. 14, 2019, 6 pages.

(Continued)

*Primary Examiner* — Edward Park
(74) *Attorney, Agent, or Firm* — Hanley, Flight & Zimmerman, LLC

(57) ABSTRACT

Methods, apparatus, systems, and articles of manufacture are disclosed that determine related content. An example apparatus includes processor circuitry to generate a segment-level graph by sampling segment-level edges among segment nodes representing text segments, the segment-level graph including segment node embeddings representing features of the segment nodes; cluster the text segments to form entities by applying a first GAN based model to the segment-level graph to update the segment node embeddings; generate a multi-level graph by (a) generating an entity-level graph including hypernodes representing the entities and sampled entity edges connecting ones of the hypernodes, and (b) connecting the segment nodes to respective ones of the hypernodes using relation edges; generate hypernode embeddings by propagating the updated segment node embeddings using a relation graph; and cluster the entities by product by applying a second GAN based (Continued)

model to the multi-level graph, the multi-level graph to generate updated hypernode embeddings.

25 Claims, 22 Drawing Sheets

(51) Int. Cl.
  *G06V 10/44* (2022.01)
  *G06V 10/82* (2022.01)
  *G06V 30/14* (2022.01)
  *G06V 30/148* (2022.01)

(52) U.S. Cl.
  CPC .......... *G06V 10/82* (2022.01); *G06V 30/1448* (2022.01); *G06V 30/153* (2022.01); *G06V 30/19107* (2022.01)

(56) References Cited

U.S. PATENT DOCUMENTS

| | | | |
|---|---|---|---|
| 5,606,690 | A | 2/1997 | Hunter et al. |
| 7,454,063 | B1 | 11/2008 | Kneisl et al. |
| 7,792,709 | B1 | 9/2010 | Trandal et al. |
| 8,285,047 | B2 | 10/2012 | Nagarajan et al. |
| 8,494,281 | B2 | 7/2013 | Nagarajan |
| 8,787,695 | B2 | 7/2014 | Wu |
| 8,792,141 | B2 | 7/2014 | Moore et al. |
| 8,983,170 | B2 | 3/2015 | Nepomniachtchi et al. |
| 9,014,432 | B2 | 4/2015 | Fan et al. |
| 9,158,744 | B2 | 10/2015 | Rao |
| 9,239,952 | B2 | 1/2016 | Hsu |
| 9,262,686 | B1 | 2/2016 | Singer |
| 9,290,022 | B2 | 3/2016 | Makabe |
| 9,298,979 | B2 | 3/2016 | Nepomniachtchi et al. |
| 9,323,135 | B1 | 4/2016 | Veloso |
| 9,324,073 | B2 | 4/2016 | Nepomniachtchi et al. |
| 9,384,389 | B1 | 7/2016 | Sankaranarayanan |
| 9,384,839 | B2 | 7/2016 | Avila et al. |
| 9,396,540 | B1 | 7/2016 | Sampson |
| 9,684,842 | B2 | 6/2017 | Deng |
| 9,710,702 | B2 | 7/2017 | Nepomniachtchi et al. |
| 9,747,504 | B2 | 8/2017 | Ma et al. |
| 9,760,786 | B2 | 9/2017 | Sahagun et al. |
| 9,824,270 | B1 | 11/2017 | Mao |
| 9,875,385 | B1 | 1/2018 | Humphreys |
| 10,026,061 | B2* | 7/2018 | Cheek ................. G06Q 10/105 |
| 10,032,072 | B1 | 7/2018 | Tran et al. |
| 10,157,425 | B2 | 12/2018 | Chelst et al. |
| 10,235,585 | B2 | 3/2019 | Deng |
| 10,242,285 | B2 | 3/2019 | Thrasher et al. |
| 10,395,772 | B1 | 8/2019 | Lucas et al. |
| 10,679,283 | B1 | 6/2020 | Pesce |
| 11,256,760 | B1 | 2/2022 | Corcoran |
| 11,257,049 | B1 | 2/2022 | Durazo Almeida |
| 11,321,956 | B1 | 5/2022 | Geng |
| 11,410,446 | B2 | 8/2022 | Shanmuganathan et al. |
| 11,414,053 | B2 | 8/2022 | Tanaami et al. |
| 11,468,491 | B2 | 10/2022 | Dalal |
| 11,476,981 | B2 | 10/2022 | Wei et al. |
| 11,562,557 | B2 | 1/2023 | Miginnis et al. |
| 11,587,148 | B2 | 2/2023 | Elder |
| 11,593,552 | B2 | 2/2023 | Sarkar |
| 11,625,930 | B2 | 4/2023 | Rodriguez et al. |
| 11,809,985 | B2 | 11/2023 | Polanía Cabrera et al. |
| 11,810,383 | B2 | 11/2023 | Patel et al. |
| 11,842,035 | B2 | 12/2023 | Jahjah et al. |
| 2002/0037097 | A1 | 3/2002 | Hoyos et al. |
| 2003/0185448 | A1 | 10/2003 | Seeger et al. |
| 2006/0232619 | A1 | 10/2006 | Otsuka et al. |
| 2007/0041642 | A1 | 2/2007 | Romanoff et al. |
| 2008/0205759 | A1 | 8/2008 | Zandifar et al. |
| 2009/0164422 | A1 | 6/2009 | Pacella |
| 2010/0306080 | A1 | 12/2010 | Trandal et al. |
| 2011/0122443 | A1 | 5/2011 | Otsuka et al. |
| 2011/0243445 | A1 | 10/2011 | Uzelac et al. |
| 2011/0289395 | A1 | 11/2011 | Breuel et al. |
| 2011/0311145 | A1 | 12/2011 | Bern et al. |
| 2012/0183211 | A1 | 7/2012 | Hsu et al. |
| 2012/0274953 | A1 | 11/2012 | Makabe |
| 2012/0330971 | A1 | 12/2012 | Thomas et al. |
| 2013/0058575 | A1 | 3/2013 | Koo et al. |
| 2013/0170741 | A9 | 7/2013 | Hsu et al. |
| 2014/0002868 | A1 | 1/2014 | Landa et al. |
| 2014/0064618 | A1 | 3/2014 | Janssen, Jr. |
| 2014/0188647 | A1 | 7/2014 | Argue |
| 2014/0195891 | A1 | 7/2014 | Venkata Radha Krishna Rao |
| 2015/0039479 | A1 | 2/2015 | Gotanda |
| 2015/0127428 | A1 | 5/2015 | Gharachorloo |
| 2015/0169951 | A1 | 6/2015 | Khintsitskiy et al. |
| 2015/0254778 | A1 | 9/2015 | Kmak et al. |
| 2015/0317642 | A1 | 11/2015 | Argue |
| 2015/0363792 | A1 | 12/2015 | Arini |
| 2015/0363822 | A1 | 12/2015 | Rowe |
| 2016/0034863 | A1 | 2/2016 | Ross |
| 2016/0063469 | A1 | 3/2016 | Etzion |
| 2016/0125383 | A1 | 5/2016 | Chan |
| 2016/0171585 | A1 | 6/2016 | Singh |
| 2016/0203625 | A1 | 7/2016 | Khan et al. |
| 2016/0210507 | A1 | 7/2016 | Abdollahian |
| 2016/0234431 | A1 | 8/2016 | Kraft et al. |
| 2016/0307059 | A1 | 10/2016 | Chaudhury et al. |
| 2016/0342863 | A1 | 11/2016 | Kwon et al. |
| 2017/0293819 | A1 | 10/2017 | Deng |
| 2017/0364450 | A1 | 12/2017 | Struttmann |
| 2018/0005345 | A1 | 1/2018 | Apodaca et al. |
| 2018/0053045 | A1 | 2/2018 | Lorenzini et al. |
| 2018/0060302 | A1 | 3/2018 | Liang et al. |
| 2018/0317116 | A1 | 11/2018 | Komissarov et al. |
| 2018/0336509 | A1* | 11/2018 | Guttmann ........... G06F 21/6218 |
| 2019/0050639 | A1 | 2/2019 | Ast |
| 2019/0080207 | A1 | 3/2019 | Chang |
| 2019/0171900 | A1 | 6/2019 | Thrasher et al. |
| 2019/0244020 | A1 | 8/2019 | Yoshino et al. |
| 2019/0272360 | A1* | 9/2019 | Kursun ................. H04L 67/306 |
| 2019/0325211 | A1 | 10/2019 | Ordonez et al. |
| 2019/0332662 | A1 | 10/2019 | Middendorf et al. |
| 2019/0354818 | A1 | 11/2019 | Reisswig et al. |
| 2020/0097718 | A1 | 3/2020 | Schäfer |
| 2020/0142856 | A1 | 5/2020 | Neelamana |
| 2020/0151444 | A1 | 5/2020 | Price et al. |
| 2020/0151902 | A1 | 5/2020 | Almazán |
| 2020/0175267 | A1 | 6/2020 | Schäfer et al. |
| 2020/0249803 | A1 | 8/2020 | Sobel et al. |
| 2020/0279107 | A1 | 9/2020 | Staar |
| 2020/0401798 | A1 | 12/2020 | Foncubierta Rodriguez et al. |
| 2020/0410231 | A1 | 12/2020 | Chua et al. |
| 2021/0004880 | A1 | 1/2021 | Benkreira et al. |
| 2021/0009163 | A1 | 1/2021 | Urtasun |
| 2021/0019287 | A1 | 1/2021 | Prasad et al. |
| 2021/0034856 | A1 | 2/2021 | Torres et al. |
| 2021/0090694 | A1 | 3/2021 | Colley et al. |
| 2021/0117665 | A1 | 4/2021 | Simantov et al. |
| 2021/0117668 | A1 | 4/2021 | Zhong et al. |
| 2021/0142092 | A1 | 5/2021 | Zhao et al. |
| 2021/0149926 | A1 | 5/2021 | Komninos et al. |
| 2021/0158038 | A1 | 5/2021 | Shanmuganathan et al. |
| 2021/0216765 | A1 | 7/2021 | Xu |
| 2021/0248420 | A1 | 8/2021 | Zhong et al. |
| 2021/0295101 | A1 | 9/2021 | Tang et al. |
| 2021/0319217 | A1 | 10/2021 | Wang et al. |
| 2021/0334737 | A1 | 10/2021 | Balaji |
| 2021/0343030 | A1 | 11/2021 | Sagonas et al. |
| 2021/0357710 | A1 | 11/2021 | Zhang et al. |
| 2021/0406533 | A1 | 12/2021 | Arroyo et al. |
| 2022/0004756 | A1 | 1/2022 | Jennings |
| 2022/0114821 | A1 | 4/2022 | Arroyo et al. |
| 2022/0189190 | A1 | 6/2022 | Arroyo et al. |
| 2022/0350946 | A1* | 11/2022 | Hjerrild ................. G06F 18/23 |
| 2022/0383651 | A1 | 12/2022 | Shanmuganathan et al. |
| 2022/0397809 | A1 | 12/2022 | Talpade et al. |
| 2022/0414630 | A1 | 12/2022 | Yebes Torres et al. |
| 2023/0004748 | A1 | 1/2023 | Rodriguez et al. |
| 2023/0005286 | A1 | 1/2023 | Yebes Torres et al. |

(56) References Cited

U.S. PATENT DOCUMENTS

| | | | |
|---|---|---|---|
| 2023/0008198 | A1 | 1/2023 | Gadde et al. |
| 2023/0196806 | A1 | 6/2023 | Ramalingam et al. |
| 2023/0214899 | A1 | 7/2023 | Martínez Cebrián et al. |
| 2024/0013562 | A1* | 1/2024 | Montero .......... G06V 30/19187 |

FOREIGN PATENT DOCUMENTS

| | | |
|---|---|---|
| CN | 104866849 A | 8/2015 |
| CN | 108229397 A | 6/2018 |
| CN | 108829397 A | 11/2018 |
| CN | 109389124 A | 2/2019 |
| CN | 112446351 A | 3/2021 |
| CN | 112560862 A | 3/2021 |
| DE | 202013005144 U1 | 10/2013 |
| GB | 2595412 A | 11/2021 |
| JP | H0749529 A | 2/1995 |
| JP | 2008021850 A | 1/2008 |
| JP | 2008210850 A | 9/2008 |
| JP | 2008211850 A | 9/2008 |
| JP | 2019139737 A | 8/2019 |
| JP | 7049529 B2 | 4/2022 |
| KR | 101831204 B1 | 2/2018 |
| TW | 200821850 A | 5/2008 |
| WO | 2013044145 A1 | 3/2013 |
| WO | 2018054326 A1 | 3/2018 |
| WO | 2018201423 A1 | 11/2018 |
| WO | 2020194004 A1 | 10/2020 |
| WO | 2022006295 A1 | 1/2022 |
| WO | 2022123199 A1 | 6/2022 |
| WO | 2013041145 A1 | 3/2023 |

OTHER PUBLICATIONS

Zhong et al., "PubLayNet: largest dataset ever for document layout analysis," In International Conference on Document Analysis and Recognition (ICDAR), dated Aug. 16, 2019, 8 pages.

Guillaume et al., "FUNSD: A Dataset for Form Understanding in Noisy Scanned Documents," International Conference on Document Analysis and Recognition (ICDAR), Sep. 20, 2019, 6 pages.

Yadati et al., "HyperGCN: Hypergraph Convolutional Networks for Semi-Supervised Classification," Proceedings of the 33rd International Conference on Neural Information Processing Systems, Dec. 2019, 18 pages.

Hwang et al., "Cost-Effective End-to-end Information Extraction for Semi-structured Document Images," Empirical Methods in Natural Language Processing (EMNLP), 2021, 9 pages.

Github, "Tesseract OCR," Tesseract Repository on GitHub, retrieved from: https://github.com/tesseract-ocr/, dated 2020, 3 pages.

Wang et al., "DocStruct: A Multimodal Method to Extract Hierarchy Structure in Document for General Form Understanding," 2020 Conference Empirical Methods in Natural Language Processing (EMNLP), Nov. 16-20, 2020, 11 pages.

Bandyopadhyay et al., "Hypergraph Attention Isomorphism Network by Learning Line Graph Expansion," 2020 IEEE International Conference on Big Data (Big Data) (2020): 669-678, 10 pages.

Dong et al. "HNHN: Hypergraph Networks with Hyperedge Neurons," ArXiv abs/2006.12278, dated 2020, 11 pages.

Carbonell et al., "Named Entity Recognition and Relation Extraction with Graph Neural Networks in Semi Structured Documents," 2020 International Conference on Pattern Recognition (ICPR), Jan. 10, 2021, 6 pages.

Zacharias et al., "Image Processing Based Scene-Text Detection and Recognition with Tesseract," arXiv (CoRR), 2020, 6 pages. [retrieved from: https://arxiv.org/pdf/2004.08079.pdf].

Xu et al., "LayoutLM: Pre-training of Text and Layout for Document Image Understanding," in International Conference on Knowledge Discovery & Data Mining (SIGKDD), Jun. 16, 2020, 9 pages. [retrieved from: https://arxiv.org/pdf/1912.13318.pdf].

Yu et al., "PICK: Processing Key Information Extraction from Documents using Improved Graph Learning-Convolutional Networks," in International Conference on Pattern Recognition (ICPR), dated Jul. 18, 2020, 8 pages. [retrieved from: https://arxiv.org/pdf/2004.07464.pdf].

Chen et al., "HGMF: Heterogeneous Graph-Based Fusion for Multimodal Data with Incompleteness," Proceedings of the 26th ACM SIGKDD International Conference on Knowledge Discovery & Data Mining, dated Aug. 20, 2020, 11 pages.

Zhu et al., "Heterogeneous Mini-Graph Neural Network and Its Application to Fraud Invitation Detection," 2020 IEEE International Conference on Data Mining (ICDM), Nov. 17, 2020, 9 pages.

Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), Dec. 12, 2020, 10 pages.

DeepDive, "Distant Supervision," Online available on Stanford University website, retrieved on Apr. 1, 2022, 2 pages, [retrieved from: http://deepdive.stanford.edu/distant supervision].

Garncarek et al., "LAMBERT: Layout-Aware Language Modeling for Information Extraction," ICDAR, 2021, 16 pages.

Ma et al., "Graph Attention Networks with Positional Embeddings," ArXiv abs/2105.04037, 2021, 13 pages.

Xu et al., "LayoutLMv2: Multi-modal Pre-training for Visually-rich Document Understanding," ACL, dated 2021, 13 pages.

Nguyen et al., "End-to-End Hierarchical Relation Extraction for Generic Form Understanding," in International Conference on Pattern Recognition (ICPR), pp. 5238-5245, 2021, 8 pages.

Xu et al., "LayoutXLM: Multimodal Pre-training for Multilingual Visually-rich Document Understanding," arXiv, 2021, 10 pages.

Villota et al., "Text Classification Models for Form Entity Linking," arXiv, 2021, 10 pages.

Huang et al., "UniGNN: a Unified Framework for Graph and Hypergraph Neural Networks," IUCAI, 2021, 9 pages.

Kim et al., "OCR: Document Understanding Transformer," arXiv, dated 2021, 29 pages.

Tang et al., "MatchVIE: Exploiting Match Relevancy between Entities for Visual Information Extraction," in International Joint Conference on Artificial Intelligence (IJCAI), pp. 1039-1045, 2021, 7 pages.

Powalski et al., "Going Full-TILT Boogie on Document Understanding with Text-Image-Layout Transformer," International Conference on Document Analysis and Recognition, Sep. 5, 2021, 17 pages.

Davis et al., "Visual FUDGE: Form Understanding via Dynamic Graph Editing," International Conference on Document Analysis and Recognition (ICDAR), Sep. 5, 2021, 16 pages.

Li et al., "StructuralLM: Structural Pre-training for Form Understanding," ArXiv abs/2105.11210 (2021), 10 pages.

Wang et al., "LiLT: A Simple yet Effective Language-Independent Layout Transformer for Structured Document Understanding," in Annual Meeting of the Association for Computational Linguistics (ACL), 2022, 11 pages.

Gu et al., "UniDoc: Unified Pretraining Framework for Document Understanding," Neural Information Processing Systems (NeurIPS), Dec. 6, 2021, 12 pages.

United States Patent and Trademark Office, "Non-Final Office Action," issued in connection with U.S. Appl. No. 16/692,797, dated Mar. 16, 2021, 12 pages.

Google, "Detect Text in Images," Mar. 29, 2021, 16 pages. Retrieved from http://cloud.google.com/vision/docs/ocr.

Chen et al., "TextPolar: irregular scene text detection using polar representation," International Journal on Document Analysis and Recognition (IJDAR), May 23, 2021, 9 pages.

Li et al. "SelfDoc: Self-Supervised Document Representation Learning," 2021 IEEE/CVF Conference on Computer Vision and Pattern Recognition (CVPR), Jun. 20, 2021, 10 pages.

Hwang et al., "Spatial Dependency Parsing for Semi-Structured Document Information Extraction," In International Joint Conference on Natural Language Processing (IJCNLP), 2021, 14 pages. [retrieved from: https://arxiv.org/pdf/2005.00642.pdf].

Qian et al., "A Region-Based Hypergraph Network for Joint Entity-Relation Extraction," Knowledge-Based Systems. vol. 228, Sep. 2021, 8 pages.

(56) References Cited

OTHER PUBLICATIONS

Prabhu et al., "MTL-FoUn: A Multi-Task Learning Approach to Form Understanding," 2021 International Conference on Document Analysis and Recognition (ICDAR), Sep. 5, 2021, 5 pages.

Shen et al., "LayoutParser: A Unified Toolkit for Deep Learning Based Document Image Analysis," in International Conference on Document Analysis and Recognition (ICDAR), Sep. 5, 2021, 16 pages. [retrieved from: https://arxiv.org/pdf/2103.15348.pdf].

Hong et al., "BROS: A Pre-trained Language Model Focusing on Text and Layout for Better Key Information Extraction from Documents," arXiv (CoRR), Sep. 10, 2021, 13 pages. [retrieved from: https://arxiv.org/pdf/2108.04539.pdf].

Appalaraju et al., "DocFormer: End-to-End Transformer for Document Understanding," arXiv (CoRR), Sep. 20, 2021, 22 pages. [retrieved from: https://arxiv.org/pdf/2106.11539.pdf].

International Searching Authority, "International Preliminary Report on Patentability," mailed in connection With International Patent Application No. PCT/IB2019/000299, issued on Sep. 28, 2021, 5 pages.

Li et al., "StrucTexT: Structured Text Understanding with Multi-Modal Transformers," ACM International Conference on Multimedia (ACM Multimedia), Oct. 2021, 9 pages.

United States Patent and Trademark Office, "Final Office Action," issued in connection with U.S. Appl. No. 16/692,797, dated Oct. 27, 2021, 14 pages.

Zhang et al., "Entity Relation Extraction as Dependency Parsing in Visually Rich Documents," Empirical Methods in Natural Language Processing (EMNLP), Nov. 7, 2021, 10 pages.

European Patent Office, "Communication pursuant to Rules 161(2) and 162 EPC," in connection with European Patent Application No. 19921870.2, issued Nov. 5, 2021, 3 pages.

International Searching Authority, "Search Report," in connection with with International Patent Application No. PCT/US2022/034570, issued Oct. 20, 2022, 3 pages.

International Searching Authority, Written Opinion, in connection with with International Patent Application No. PCT/US2022/034570, issued Oct. 20, 2022, 5 pages.

International Searching Authority, "Search Report," issued in connection with International Patent Application No. PCT/US2023/011859, mailed on Jun. 1, 2023, 3 pages.

International Searching Authority, "Written Opinion," issued in connection with International Patent Application No. PCT/US2023/011859, mailed on Jun. 1, 2023, 4 pages.

United Kingdom Intellectual Property Office, "Notification of Grant," issued in connection with United Kingdom Patent Application No. 2112299.9, dated Aug. 29, 2023, 2 pages.

Amazon, "Intelligent Document Processing," Amazon Web Services, https://aws.amazon.com/machine-learning/ml-use-cases/document-processing/fintech/, retrieved on Sep. 8, 2023, 6 pages.

United States Patent and Trademark Office, "Corrected Notice of Allowability," issued in connection with U.S. Appl. No. 17/075,675, dated Oct. 10, 2023, 2 pages.

United States Patent and Trademark Office, "Non-Final Office Action," issued in connection with U.S. Appl. No. 17/710,538, dated Oct. 26, 2023, 6 Pages.

European Patent Office, "Extended European Search Report," issued in connection with European Patent Application No. 20891012.5, dated Nov. 17, 2023, 12 pages.

European Patent Office, "Communication pursuant to Rules 70(2) and 70a(2) EPC," issued in connection with European Patent Application No. 20891012.5, dated Dec. 5, 2023, 1 page.

United States Patent and Trademark Office, "Non-Final Office Action" issued in connection with U.S. Appl. No. 17/598,792, dated Dec. 29, 2023, 17 pages.

International Searching Authority, "International Preliminary Report on Patentability," issued in connection with International Patent Application No. PCT/US2022/034570, dated Jan. 4, 2024, 7 pages.

International Searching Authority, "Search Report," issued in connection with PCT application No. PCT/IB2019/000299, dated Dec. 23, 2019, 5 pages.

International Searching Authority, "Written Opinion," issued in connection with PCT application No. PCT/IB2019/000299, dated Dec. 23, 2019, 4 pages.

International Searching Authority, "International Search Report," issued in connection with PCT No. PCT/US2020/061269, dated Mar. 11, 2021, 3 pages.

International Searching Authority, "Written Opinion," issued in connection with PCT No. PCT/US2020/061269, dated Mar. 11, 2021, 4 pages.

International Searching Authority, "Search Report ," issued in connection with Application No. PCT/US2021/039931, dated Nov. 4, 2021, 3 pages.

International Searching Authority, "Written Opinion," issued in connection with Application No. PCT/US2021/039931, dated Nov. 4, 2021, 4 pages.

United States Patent and Trademark Office, "Non-Final Office Action," issued in connection with U.S. Appl. No. 18/191,642, dated Feb. 7, 2024, 18 pages.

United States and Patent and Trademark Office, "Non-Final Office Action," issued in connection with U.S. Appl. No. 17/566,135, dated Mar. 27, 2024, 13 pages.

United States Patent and Trademark Office, "Non-Final Office Action," issued in connection with U.S. Appl. No. 18/476,978, dated Apr. 18, 2024, 20 pages.

United States Patent and Trademark Office, "Notice of Allowance and Fee(s) Due," issued in connection with U.S. Appl. No. 17/710,538, dated Apr. 19, 2024, 8 pages.

Leicester et al., "Using Scanner Technology to Collect Expenditure Data," Fiscal Studies, vol. 30, Issue 3-4, 2009, 29 pages.

European Patent Office, "Communication pursuant to Article 94(3) EPC," issued in connection with European Patent Application No. 19 921 870.2-1207, on Apr. 9, 2024, 7 pages.

Canadian Intellectual Property Office, "Office Action," issued in connection with Canadian Patent Application No. 3,182,471, dated May 28, 2024, 5 pages.

United States Patent and Trademark Office, "Non-Final Office Action," issued in connection with U.S. Appl. No. 17/710,660, on May 28, 2024, 9 pages.

United States Patent and Trademark Office, "Notice of Allowance and Fee(s) Due," issued in connection with U.S. Appl. No. 17/598,792, dated Jun. 17, 2024, 9 pages.

United States Patent and Trademark Office, "Notice of Allowance and Fee(s) Due," issued in connection with U.S. Appl. No. 18/191,642, dated Jun. 17, 2024, 9 pages.

Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966, 4 pages.

Smith et al., "Identification of Common Molecular Subsequences," Reprinted Journal of Molecular Biology, Academic Press Inc. (London) Ltd., pp. 195-197, dated 1981, 3 pages.

Govindan et al., "Character Recognition—A Review," Pattern Recognition, vol. 23, No. 7, pp. 671-683, published Jul. 20, 1990, 13 pages.

Poulovassilis et al. "A nested-graph model for the representation and manipulation of complex objects." ACM Trans. Inf. Syst. 12 (1994): 34 pages.

Hochreiter et al. "Long Short-Term Memory." Neural Computation 9 (1997): 1735-1780, 46 pages.

Ng et al., "On Spectral Clustering: Analysis and an Algorithm," NIPS'01: Proceedings of the 14th International Conference on Neural Information Processing Systems: Natural and Synthetic, Jan. 2001, 8 pages.

Crandall et al., "Extraction of special effects caption text events from digital video," IJDAR, Department of Computer Science and Engineering, The Pennsylvania State University, 202 Pond Laboratory, University Park, PA, accepted Sep. 13, 2022, pp. 138-157, 20 pages.

Lowe, "Distinctive Image Features from Scale-Invariant Key points," International Journal of Computer Vision (HCV), published Jan. 5, 2004, 20 pages.

Marinai, "Introduction to Document Analysis and Recognition," Machine Learning in Document Analysis and Recognition, published 2008, 20 pages.

(56) References Cited

OTHER PUBLICATIONS

Vogel et al., "Parallel Implementations of Word Alignment Tool," Software Engineering, Testing, and Quality Assurance for Natural Language Processing, nn. 49-57, Jun. 2008, 10 pages.
O'Gorman et al., "Document Image Analysis," IEEE Computer Society Executive Briefings, dated 2009, 125 pages.
Oliveira et al., "A New Method for Text-Line Segmentation for Warped Documents," International Conference Image Analysis and Recognition, Jun. 21, 2010, 11 pages.
Krizhevsky et al., "ImageNet Classification with Deep Convolutional Neural Networks," In International Conference on Neural Information Processing Systems (NIPS), published 2012, 9 pages.
Chung et al. "Empirical Evaluation of Gated Recurrent Neural Networks on Sequence Modeling," ArXiv abs/1412.3555, dated 2014, 9 pages.
Nshuti, "Mobile Scanner and OCR (A First Step Towards Receipt to Spreadsheet)," published 2015, 3 pages.
Ronneberger et al., "U-Net: Convolutional Networks for Biomedical Image Segmentation," Medical Image Computing and Computer-Assisted Intervention (MICCAI), dated May 18, 2015, 8 pages.
Lecun et al., "Deep Learning," Nature, vol. 521, pp. 436-444, dated May 28, 2015, 9 pages.
Genereux et al., "NLP Challenges in Dealing with OCR-ed Documents of Derogated Quality," Workshop on Replicability and Reproducibility in Natural Language Processing, IJCAI 2015, dated Jul. 2015, 6 pages.
Ren et al., "Faster R-CNN: Towards Real-Time Object Detection with Region Proposal Networks," In International Conference on Neural Information Processing Systems (NIPS), pp. 91-99, dated Dec. 7, 2015, 14 pages.
Kim et al., "Character-Aware Neural Language Models," Proceedings of the Thirtieth AAAI Conference on Artificial Intelligence (AAAI'IO), pp. 2741-2749, 2016, 9 pages.
Redmon et al., "You Only Look Once: Unified, Real-Time Object Detection," In Conference on Computer Vision and Pattern Recognition (CVPR), dated May 9, 2016, 10 pages.
Osindero et al., "Recursive Recurrent Nets with Attention Modeling for OCR in the Wild," in Conference on Computer Vision and Pattern Recognition (CVPR), dated Jun. 27, 2016, 10 pages.
Joulin et al., "Bag of Tricks for Efficient Text Classification," In Proceedings of the 15th Conference of the European Chapter of the Association for Computational Linguistics, dated Aug. 9, 2016, 5 pages.
Konda et al., "Magellan: Toward Building Entity Matching Management Systems Over Data Science Stacks," Proceedings of the VLDB Endowment, vol. 9, No. 13, pp. 1581-1584, dated 2016, 4 pages.
Kipf et al., "Semi-Supervised Classification with Graph Convolutional Networks," 5th International Conference on Learning Representations, Apr. 24, 2017, 14 Pages.
Bojanowski et al., "Enriching Word Vectors with Subword Information," In Journal Transactions of the Association for Computational Linwstics, 2017, vol. 5, pp. 135-146, dated Jun. 2017, 12 pages.
Ozhiganov et al., "Deep Dive Into OCR for Receipt Recognition," DZone, dated Jun. 21, 2017, 18 pages.
Bartz et at, "STN-OCT: A Single Neural Network for Text Detection and Text Recognition," Computer Vision and Pattern Recognition, dated Jul. 27, 2017, 9 pages.
Vaswani et al., "Attention is all you need," In Advances in Neural Information Processing Systems,31st Conference on Neural Information Processing Systems (NIPS 2017), Long Beach, CA, last revised Dec. 6, 2017, 15 pages.
Follmann et al., "MVTec D2S: Densely Segmented Supermarket Dataset," In European Conference on Computer Vision (ECCV), dated 2018, 17 pages.
Velickovic et al. "Graph Attention Networks," ArXiv abs/1710. 10903, 2018, 12 pages.
Hui, "mAP (mean Average Precision) for Object Detection," Mar. 6, 2018, 2 pages. Retrieved from [https://medium.eom/@jonathan hui/map-mean-average-precision-for-object-detection-45cl21a311731 on May 11, 2020, 2 pages.
Mudgal et al., "Deep learning for entity matching: A design space exploration," in Proceedings of the 2018 International Conference on Management of Data, dated Jun. 10-15, 2018, 16 pages.
Wick et al., "Calamari—A High-Performance Tensorflow-based Deep Learning Package for Optical Character Recognition," Digital Humanities Quarterly, Jul. 5, 2018, 12 pages. [retrieved from:https://arxiv.org/ftp/arxiv/papers/1807/1807.02004.pdf].
Akbik et al., "Contextual String Embeddings for Sequence Labeling," In Proceedings of the 27th International Conference on Computational Linguistics (COLING), dated Aug. 2018, 12 pages.
Ray et al., "U-PC: Unsupervised Planogram Compliance," in European Conference on Computer Vision (ECCV), 2018, 15 pages. [retrieved from:http://openaccess.thecvf.com/content_ECCV_2018/papers/Archan_Ray_U-PC_Unsupervised Planogram ECCV 2018 paper.pdf].
Li et al., "Extracting Figures and Captions from Scientific Publications," Short Paper, CIKM18, Oct. 22-26, 2018, Torino, Italy, 4 pages.
Elfwing et al. "Sigmoid-Weighted Linear Units for Neural Network Function Approximation in Reinforcement Learning," Neural Networks: Journal of the International Neural Network Society, vol. 107, Nov. 2018, 18 pages.
Huang et al., "Mask R-CNN with Pyramid Attention Network for Scene Text Detection", arXiv:1811.09058v1, pp. 1-9, https://arxiv.org/abs/1811.09058, Nov. 22, 2018, 9 pages.
Wikipedia, "Precision & Recall," Dec. 17, 2018 revision, 12 pages.
Hu et al., "Semi-supervised Node Classification via Hierarchical Graph Convolutional Networks." ArXiv abs/1902.06667, 2019, 8 Pages.
Loshchilov et al., "Decoupled Weight Decay Regularization," 2019 International Conference on Learning Representations, May 6, 2019, 19 pages.
Artificial Intelligence & Image Analysis, "Intelligent Automation Eliminates Manual Data Entry From Complex Documents," White Paper, accessed on Jan. 30, 2019, 3 pages.
Artificial Intelligence & Image Analysis, "Historic Document Conversion," Industry Paper, accessed on Jan. 30, 2019, 4 pages.
Nathancy, "How do I make masks to set all of image background, except the text, to white?", stakoverflow.com, https://stackoverflow.com/questions/56465359/how-do-i-make-masks-to-set-all-of-image-background-except-the-text-to-white, Jun. 5, 2019, 5 pages.
Devlin et al., "BERT: Pre-training of Deep Bidirectional Transformers for Language Understanding," In Conference of the North American Chapter of the Association for ComputationalLinguistics (NAACL-HLT), dated Jun. 24, 2019, 16 pages.
Qasim et al., "Rethinking Table Recognition using Graph Neural Networks," In Inernational Conference on Document Analysis and Recognition (ICDAR), dated Jul. 3, 2019, 6 pages.
Liu et al. "RoBERTa: A Robustly Optimized BERT Pretraining Approach." ArXiv abs/1907.11692, Jul. 26, 2019, 13 pages.
Feng et al., "Computer vision algorithms and hardware implementations: A survey," Integration: the VLSI Journal, vol. 69, pp. 309-320, dated Jul. 27, 2019, 12 pages.
Park et al., "CORD: A Consolidated Receipt Dataset for Post-OCR Parsing," In Workshop on Document Intelligence, at NeurIPS 2019, 4 pages.
Huang et al., "LayoutLMv3: Pre-training for Document AI with Unified Text and Image Masking," 30th ACM International Conference on Multimedia, 2022, 10 pages.
United States Patent and Trademark Office, "Advisory Action," issued in connection with U.S. Appl. No. 16/692,797, dated Feb. 16, 2022, 2 pages.
United States Patent and Trademark Office, "Corrected Notice of Allowability," issued in connection with U.S. Appl. No. 17/883,309, dated Aug. 17, 2023, 2 Pages.
NielsenIQ Brandbank, "Nielsen Brandbank Product Library," Online Available. Retrieved on Apr. 1, 2022. 5 pages. [retrieved from: https://www.brandbank.com/us/product-library/].

(56) References Cited

OTHER PUBLICATIONS

Datasetlist, "Annotation tools for building datasets," Labeling tools—List of labeling tools, Datasetlist.com, updated Dec. 2021, downloaded on Apr. 1, 2022, 14 pages. [retrieved from: https://www.datasetlist.com/tools/].

Github, "FIAT tool—Fast Image Data Annotation Tool," Github.com, downloaded on Apr. 1, 2022, 30 pages. [retrieved from: https://github.com/christopher5106/FastAimotation Tool1.

United States Patent and Trademark Office, "Notice of Allowance and Fee(s) Due," issued in connection with U.S. Appl. No. 16/692,797, dated Apr. 5, 2022, 10 pages.

Github, "Doccano tool," Github.com, downloaded on Apr. 11, 2022, 12 pages. [retrieved from:https://github.com/doccano/doccano].

United States Patent and Trademark Office, "Corrected Notice of Allowability," issued in connection with U.S. Appl. No. 16/692,797, dated Apr. 22, 2022, 3 pages.

International Searching Authority, "International Preliminary Report on Patentability Chapter I," issued in connection with International Patent Application No. PCT/US2020/061269, dated May 17, 2022, 6 Pages.

Zhangxuan et al.,"XYLayoutLM: Towards Layout-Aware Multimodal Networks For Visually-Rich Document Understanding," Conference on Computer Vision and Pattern Recognition (CVPR), Jun. 18, 2022, 10 pages.

European Patent Office, "Communication pursuant to Rules 161(2) and 162 EPC," issued in connection with European Patent Application No. 20891012.5-1218, dated Jun. 29, 2022, 3 pages.

Datasetlist, "A tool using OpenCV to annotate images for image classification, optical character reading, . . . ," Datasetlist.com, dated Jul. 13, 2022, 30 pages.

United States Patent and Trademark Office, "Non-Final Office Action," issued in connection with U.S. Appl. No. 17/345,940, dated Aug. 18, 2022, 8 pages.

United States Patent and Trademark Office, "Non-Final Office Action," issued in connection with U.S. Appl. No. 17/075,675, issued Sep. 22, 2022, 12 Pages.

Zhang et al.,"Multimodal Pre-training Based on Graph Attention Network for Document Understanding," IEEE Transactions on Multimedia, vol. 25, Oct. 2022, 13 pages.

European Patent Office, "Extended European Search Report," issued in connection with European Patent Application No. 19921870.2, dated Oct. 12, 2022, 11 pages.

Canadian Intellectual Property Office, "Examiner's Report," issued in connection with Canadian Patent Application No. 3,124,868, dated Aug. 10, 2023, 5 pages.

Instituto Mexicano De La Propiedad Industrial, "Representation of the Promotion Sent Through the Online Patent System," in connection with Mexican Patent Application No. MX/a/2022/008170, issued Oct. 27, 2022, 35 pages.

Zhong et al., "Hierarchical Message-Passing Graph Neural Networks," Data Mining and Knowledge Discovery, Nov. 17, 2022, 29 pages.

European Patent Office, "Communication pursuant to Rules 70(2) and 70a(2) EPC," issued in connection with Application No. 19921870.2, dated Nov. 2, 2022, 1 page.

United States Patent and Trademark Office, "Notice of Allowance and Fee(s) Due," issued in connection with U.S. Appl. No. 17/364,419, dated Nov. 4, 2022, 10 pages.

Canadian Patent Office, "Examiner's Report," issued in connection with Canadian Patent Application No. 3, 124,868, mailed on Nov. 10, 2022, 4 pages.

United States Patent and Trademark Office, "Corrected Notice of Allowability," issued in connection with U.S. Appl. No. 17/364,419, dated Nov. 15, 2022, 2 pages.

European Patent Office, "Extended Search Report," in connection with European Patent Application No. 22180113.7, issued Nov. 22, 2022, 7 pages.

Dwivedi et al., "Benchmarking Graph Neural Networks," Journal of Machine Learning Research, Dec. 2022, 49 pages.

United States Patent and Trademark Office, "Non-Final Office Action," issued in connection with U.S. Appl. No. 17/379,280, dated Dec. 2, 2022, 14 Pages.

International Searching Authority, "International Preliminary Report on Patentability," issued in connection with PCT Application No. PCT/US2021/039931, dated Dec. 13, 2022, 6 pages.

United States Patent and Trademark Office, "Corrected Notice of Allowability," issued in connection with U.S. Appl. No. 17/364,419, dated Jan. 4, 2023, 2 pages.

European Patent Office, "Communication Pursuant to Rule 69 EPC," issued in connection with European Patent Application No. 22180113.7, dated Jan. 10, 2023. 2 pages.

United States Patent and Trademark Office, "Non-Final Office Action," issued in connection with U.S. Appl. No. 17/883,309, dated Jan. 20, 2023, 14 pages.

European Patent Office, "Communication pursuant to Rule 69 EPC," in connection with European Patent Application No. 22184405.3, issued Jan. 23, 2023, 2 pages.

United States Patent and Trademark Office, "Corrected Notice of Allowability," issued in connection with U.S. Appl. No. 17/364,419, filed Feb. 15, 2023, 2 pages.

United Kingdom Patent Office, "Examination Report under section 18(3)," issued in connection with GB Application No. 2112299.9, dated Feb. 17, 2023, 2 pages.

United States Patent and Trademark Office, "Final Office Action," issued in connection with U.S. Appl. No. 17/075,675, dated Mar. 7, 2023, 11 pages.

United States Patent and Trademark Office, "Non-Final Office Action," issued in connection with U.S. Appl. No. 17/345,940, dated Mar. 16, 2023, 13 pages.

United States Patent and Trademark Office, "Final Office Action," issued in connection with U.S. Appl. No. 17/379,280, dated May 5, 2023, 17 pages.

United States Patent and Trademark Office, "Corrected Notice of Allowance and Fee(s) Due," issued in connection with U.S. Appl. No. 17/883,309, dated May 11, 2023, 9 pages.

European Patent Office, "Extended European Search Report," issued in connection with European Patent Application No. 22214553.4, dated May 17, 2023, 9 pages.

United States Patent and Trademark Office, "Advisory Action," issued in connection with U.S. Appl. No. 17/075,675, dated May 30, 2023, 3 pages.

United States Patent and Trademark Office, "Corrected Notice of Allowability," issued in connection with U.S. Appl. No. 17/345,940, dated Jul. 20, 2023, 3 pages.

United States Patent and Trademark Office, "Corrected Notice of Allowability," issued in connection with U.S. Appl. No. 17/075,675, dated Jun. 26, 2023, 3 pages.

United States Patent and Trademark Office, "Notice of Allowance and Fee(s) Due," issued in connection with U.S. Appl. No. 17/345,940, dated Jul. 7, 2023, 8 pages.

United Kingdom Intellectual Property Office, "Intention to Grant under Section 18(4)," issued in connection with United Kingdom Patent Application No. 2112299.9, dated Jul. 13, 2023, 2 pages.

United States Patent and Trademark Office, "Advisory Action," issued in connection with U.S. Appl. No. 17/379,280, dated Jul. 18, 2023, 3 pages.

Gopal et al., "What is Intelligent Document Processing?," Nano Net Technologies, URL:[https://nanonets.com/blog/intelligent-document-processing/], Jul. 19, 2023, 21 pages.

United States Patent and Trademark Office, "Non-Final Office Action," issued in connection with U.S. Appl. No. 18/176,273, dated Apr. 24, 2025, 7 pages.

\* cited by examiner

METHODS, SYSTEMS, ARTICLES OF MANUFACTURE, AND APPARATUS TO DETERMINE RELATED CONTENT IN A DOCUMENT

RELATED APPLICATION

This patent claims the benefit of U.S. Provisional Patent Application No. 63/358,782, which was filed on Jul. 6, 2022. U.S. Provisional Patent Application No. 63/358,782 is hereby incorporated herein by reference in its entirety. Priority to U.S. Provisional Patent Application No. 63/358,782 is hereby claimed.

FIELD OF THE DISCLOSURE

This disclosure relates generally to computer-based image analysis and, more particularly, to methods, systems, articles of manufacture and apparatus to determine related content in a document.

BACKGROUND

Artificial intelligence (AI) leverages computers and machines to mimic problem solving and decision making challenges that typically require human intelligence. Machine learning (ML), computer Vision (CV), and Natural Language Processing (NLP) are powerful AI techniques that can be combined to process an image. For example, these AI techniques can be applied to an image of a purchase document to extract purchase data from which to generate actionable insights.

BRIEF DESCRIPTION OF THE DRAWINGS

In general, the same reference numbers will be used throughout the drawing(s) and accompanying written description to refer to the same or like parts. The figures are not to scale.

Figure 1:
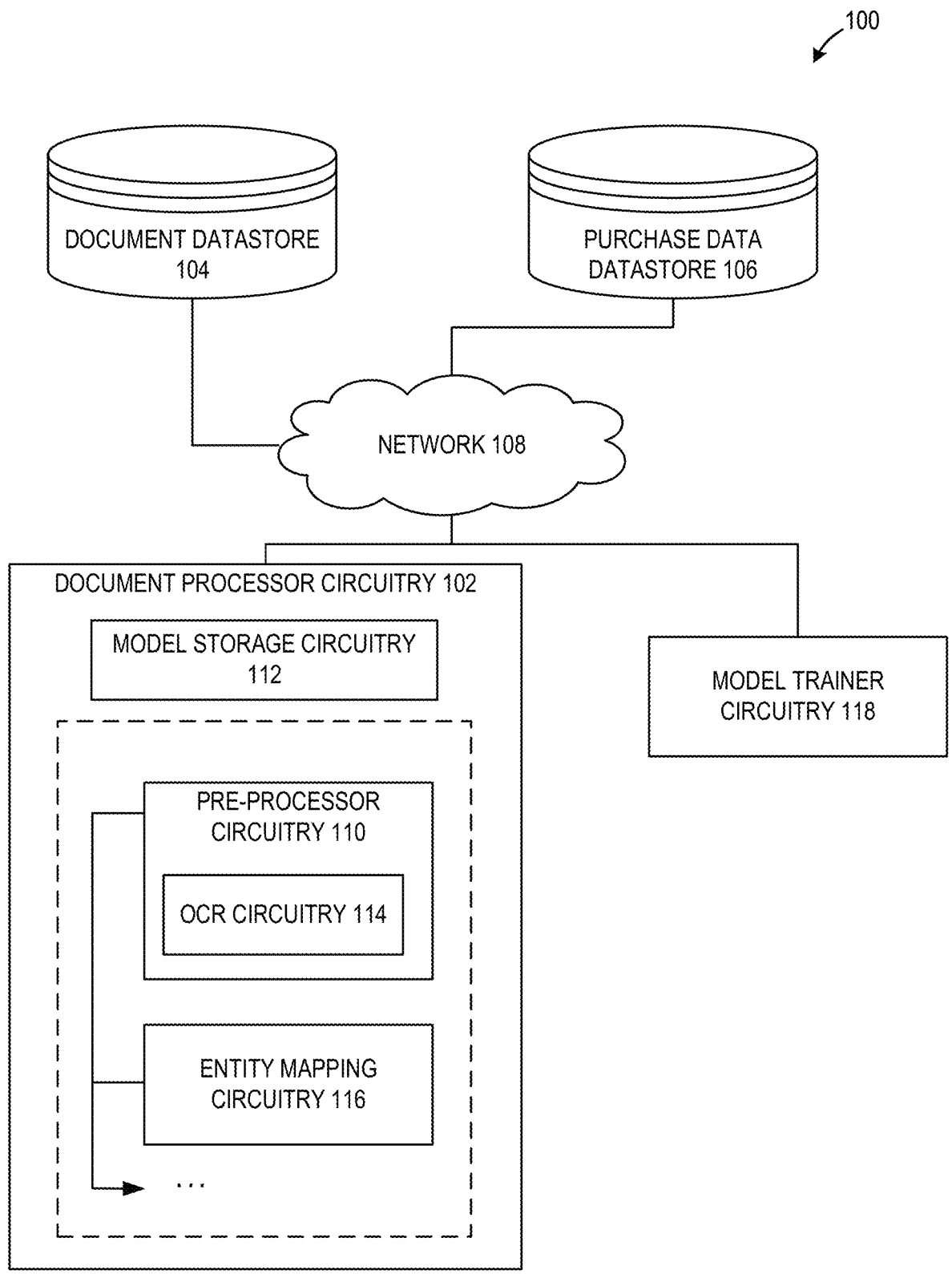
FIG. 1 is a block diagram of an example system for collecting purchase data constructed in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Market dynamics (e.g., forces that affect a market) have been evolving for several years, but it was dramatically accelerated by of the novel coronavirus (COVID-19) and its impact on shopping behaviors and channel composition. To help market participants (e.g., manufacturers, retailers, etc.) understand these forces, a market research entity (e.g., a market research company, etc.) can collect and analyze purchase data provided by members of consumer panels to extract actionable insights. Consumer panels are groups of individuals (e.g., panelists, panel members, etc.) who agree to provide their purchase data and/or other types of data (e.g., demographic data) to the market research entity. A panelist(s) typically represents at least one demographic (e.g., geographic location, household income, presence of children, etc.), enabling the marketing research entity to extract insights about consumer purchase behavior beyond just a sale of a product. Consequently, this data source can be particularly important for the market research entity.

A current technique for obtaining purchase data from panelists incudes the manual input of purchase information (e.g., to an application executing on an electronic device) for each product purchased during a transaction. For example, a panelist can use an electronic device (e.g., a smartphone, a tablet, etc.) to manually enter purchase information for the purchased products. However, such a collection method is time-consuming and often burdensome for the panelists. In some examples, these burdens diminish the panelists' willingness to collaborate with the market research entity long term, resulting in reduced data capture by the market research entity. In some examples, the collection method can result in lower-quality data due to panelist error during input of the purchase information and/or due to fraud.

Modernization of consumer panels is needed for market research entities to grow and stay relevant in data analysis markets. In particular, there is a need to automate the transcription and extraction of information from images of purchase documents. A purchase document, as disclosed herein, refers to a document (e.g., physical, digital, etc.) that memorializes a transaction between a consumer and a retailer and, thus, can be used to extract the purchase data. Facilitating the (e.g., automatic) extraction of information from such documents by a machine means that the market research entity can allow the panelists to upload images of receipts, resulting in reduced burden on the panelists and improved data quality. Advances in the artificial intelligence (AI) fields of natural language processing (NLP) and computer vision (CV) are making it possible to develop systems capable of outperforming humans at information extraction tasks. In some examples, such AI systems first extract machine-readable text segments from the document images (e.g., via an optical character recognition (OCR) engine) and then apply a layout extraction stage to identify more complex relationships among the text segments.

Example methods, systems, articles of manufacture, and apparatus are disclosed herein to group text segments detected within the unstructured documents (e.g., receipts) that belong to the same product. In some examples, initial groupings disclosed herein occur by semantic meaning (e.g., description, price, quantity, discount, etc.) and then by product identification (ID). An unstructured document(s), such as a receipt, is composed of a list of semantic entities that can be linked together attending to their semantic meaning to form entity groups. As disclosed herein, a semantic entity refers one or more words that are associated with specific purchase information (e.g., a purchase fact such as (but not limited to) description, price, quantity, etc.) for a single product. Thus, certain semantic entities can be divided into smaller text segments. As disclosed herein, a text segment (e.g., a segment, etc.) is a one or more characters (e.g., a string of characters) detected by an OCR engine, and specifically refers a lowest-level region(s) of text information output by the OCR engine. A type or level of segment (e.g., at word level, paragraph level, etc.) can depend on a specific use case and/or the OCR engine utilized during an information extraction process. Disclosed examples facilitate the processing of receipts and, thus, utilize word-level text segments. However, it is understood that other use cases can utilize text segments having other levels of granularity, such as character-level segments, sentence-level segments, paragraph-level segments, etc.

Enabling the (e.g., automatic) grouping of text segments by product using a machine is a challenging task. While one or more AI models can be combined to locate and parse the text segments, understand the document layout, and extract semantic information and relations between the text segments, these tasks are especially complex when dealing with unstructured documents (e.g., receipts) in which the layout of the documents can highly vary in layout (e.g., based on country, store, an amount of items purchased, etc.). Further, because the uploaded receipts are typically images of the receipts captured by the panelists, the documents tend to include issues with image quality, document defects (e.g., wrinkles, etc.), image perspective and/or viewpoint issues, etc. resulting in difficult or otherwise non-readable purchase documents. All this variation makes it difficult for AI models to effectively learn how to extract and relate semantic information from text segments. These challenges also decrease an effectiveness, efficiency, and accuracy of a traditional, manual decoding process.

To address the foregoing issues, the semantic information extraction from such complex receipt layouts can be divided into three tasks (e.g., stages, steps, etc.), including an example entity building task, an example entity linking task, and an example entity tagging task. Entity building (EB) refers to the task of connecting text segments that are semantically related and spatially close in the document (also known in the literature as word grouping). Entity linking (EL) refers to the task of connecting the semantic entities to form higher level semantic relations (e.g., a product description is connected to a quantity and a price, etc.). Entity tagging (ET) involves classifying each of the built entities and attending to (e.g., based on, in view of, etc.) their semantic meaning, (e.g., product description, store name, etc.)

These tasks include at least three levels of information containers. As disclosed herein, an information container refers to a set of information (e.g., data) retrievable from file, system, and/or application storage hierarchy. The levels of information container can pertain to different hierarchical levels of information (e.g., hierarchical levels of a multi-level graph). A first level concerns text segments, which are a lowest level of information, usually given by an OCR engine at the word level. A second level concerns an entity level, which is an intermediate level generated by grouping the text segments during the EB task. A third level concerns an entity group level, which is a highest level container that groups one or more entities resultant from the EL task.

Examples disclosed herein model the EB and EL tasks as a link prediction (e.g., an entity mapping) task, where at least one goal of the link prediction task is to determine if two segments (e.g., EB) or two entities (e.g., EL) that have some type of relation (semantic, spatial, etc.) should be linked together. In particular, examples disclosed herein map text segments to entities, and map the built entities to product lines. Examples disclosed herein solve the EB and EL tasks by generating or otherwise implementing an example entity mapping model based on a graph neural network (GNN, GraphNN, etc.). A GNN is a type of artificial neural network that can efficiently process data represented as a graph. Graph-based representations are flexible and capable of adapting to complex layouts, which makes them suitable for working with highly unstructured documents. Thus, examples entity mapping models disclosed herein operate on a graph-based representation(s) of a given document (e.g., receipt).

Example entity mapping models disclosed herein obtain a list of categorized text segments (e.g., semantic text segments). For each semantic text segment, the available information is represented as a string and a rotated bounding box generated by the OCR engine, and an entity category (e.g., generated in a previous step using a segment tagging model). Given the list of semantic text segments, at least one goal of entity mapping is to group the semantic text segments by their entity and then link together all the entities that belong to the same entity group (e.g., a purchased product). For a solution based purely on GNNs this leaves two options. The first option is trying to solve the entity mapping tasks using a single graph at text segment level. The second option is splitting the problem into two graphs corresponding to the types of nodes (e.g., vertices, etc.) involved in the tasks: one graph based on text segment nodes for performing the EB task, and another one including entity nodes for performing the EL task. Examples disclosed herein employ the second option because it works on extracting node-level relations only, which reduces the complexity of the problem, and not higher-level relations as in the first approach. Accordingly, examples disclosed herein improve the operation and/or efficiency of a computing device by extracting node-level relations, which reduces computational resource usage.

However, the multi-graph approach has more complexity regarding the architecture definition, as it requires also designing the way the output features of a segment-level graph are combined to generate entity node features. Thus, examples disclosed herein focus on improving this propagation of information between the two stages based on hypernodes, described in further detail below. In particular, example entity mapping models disclosed herein implement an example multi-level GNN-based model focused on solving the EB and EL tasks on highly unstructured documents (such as purchase receipts), starting from the text segments given by an OCR engine (at word level). Example entity mapping models disclosed herein operate first at the segment level (e.g., using a segment-level graph) to generate the entities, and then at the entity level (e.g., using a multi-level graph in which the segment-level graph is a base level of the multi-level graph) to group the formed entities. In other words, examples disclosed herein use the example entity mapping model to instantiate the EB and EL tasks in two stages (e.g., a segment-level stage and an entity-level stage) that are connected using the concept of hypernodes. As disclosed herein, a hypernode refers to a set of one or more nodes, which can contain other graphs at different levels.

To solve the EB task, example entity mapping models disclosed herein generate a graph-based representation of a given receipt by sampling segment edges among the text segments, which are to be represented by segment nodes, and generating segment node embeddings. Disclosed examples generate the segment node embeddings by concatenating certain features extracted from the semantic text segments. Information needed for computing message passing weights is related to the bounding box coordinates and the entity categories, which are already embedded in the segment node embeddings. As such, disclosed examples provide the segment node embeddings and sampled segment edges to a first example graph attention network (GAN)-based model (e.g., a segment model) in which the segment nodes iteratively update their representations by exchanging information with their neighbors.

A GAN is a GNN that includes Graph Attention Layers (GAT) for pairwise message passing, enabling the weights for the message passing to be computed directly inside the attention layer using input node features. The first GAN-based model generates example output segment features, which are segment node embeddings enriched (e.g., supplemented, augmented, modified, etc.) with information from their neighbors. The output segment features are used to group the text segments by entity and to perform feature propagation. For instance, example entity mapping models disclosed herein post-process the output segment features to generate clusters of segment nodes that represent entities. The entities are groups of words that represent a purchase fact (e.g., product description, price, quantity, etc.) for a specific product.

Examples disclosed herein propagate the information from the segment nodes to entity nodes, which are generated as hypernodes over the segment-level graph and connected to their child segment nodes using relation edges. In other words, disclosed example form a multi-level (e.g., hierarchical) graph in which the segment-level graph is a first hierarchical level and an entity-level graph is a next hierarchical level of the multi-level graph. The segment-level graph and the entity-level graph can be connected using the relation edges, which are unidirectional relation edges that are directed from the segment nodes to the entity nodes. Disclosed examples perform the feature propagation by applying a second GAN-based model (e.g., a feature propagation model) to an example sub-graph (e.g., relation graph) that results from considering only the relation edges. Thus, the information learnt by the segment nodes during the message passing of the first graph is used to generate optimal, improved and/or otherwise advantageous features for the entity nodes. In this manner, the example entity mapping model disclosed herein can learn how to combine the text segments in an advantageous way and to detect key segments of the entities. Example feature propagation models disclosed herein output example entity node embeddings.

To solve the EL task, example entity mapping models disclosed herein generate the entity-level graph by sampling edges among the entities, which are to be represented by hypernodes. As noted above, a hypernode refers to a set of one or more nodes in different graphs. Thus, examples disclosed herein represent the entities as hypernodes, which refers to a set of segment nodes forming the entity. Disclosed examples provide the entity hypernode embeddings and sampled edges to a third example GAN-based model in which the entity nodes iteratively update their representations by exchanging information with their neighbors. The output entity features are used to group the entities by product to provide an example entity linking output, which includes text segments grouped by entity, and then by product to form product lines in the receipt.

Examples disclosed herein facilitate a solution to transform the consumer data collection and retrieve relevant groupings of data from unstructured documents. In particular, examples disclosed herein transcribe receipts that improve operational efficiency in any data analysis pipeline. Efficiency benefits realized by examples disclosed herein include, but are not limited to reducing costs related to manual annotation and verification, increasing the quality of the data, correcting panelist errors, and detecting frauds. In some examples, efficiency benefits realized by example disclosed herein include reduced power consumption, computational waste, and computing resource usage. Further example entity mapping models disclosed herein generalize for different countries and banners, even when confronted with complex receipt layouts.

Examples disclosed herein enable the market research entity to generate improved insights from extracted purchase data. For example, reducing burdens on panelists can reduce the churn of panelists recruited to participate in consumer panels, enabling long-term data collection. Consumer panel data enables the market research entity to track consumer purchasing behavior to identify correlations between what consumers do (e.g., purchase a product at a physical store and/or an e-commerce store) and why (e.g., a promotion, advertisement, convenience, etc.) to diagnose trends and changes over time. Further, the consumer panel data enables tracking of individual and/or household purchasing behavior over time across all purchases (e.g., product-level granularity) and outlets (e.g., retailers, stores, etc.), including e-commerce, to provide a complete view of changing omnichannel behaviors and enable an understanding movements across categories, brands, and retailers. Thus, enabling long-term data collection increases an accuracy and confidence of insights generated from such data.

Disclosed examples overcome discretionary error typically caused by manual labor, which rely on heuristic rules that need to be carefully designed by country and by banner. For example, a traditional approach for obtaining purchase data from panelists includes a manual extraction process from receipt and/or other purchase documents. Technological examples disclosed herein provide for the automatic detection of related content from a receipt uploaded by the panelist, which reduces (e.g., minimizes) or otherwise eliminates erroneous human behaviors (e.g., by panelists during the inputting of purchase information and/or by humans during a manual extraction process). Further, automating the extraction of information from a receipt facilitates the collection of more information (e.g., more details of baskets of purchased goods and/or more baskets) by the market research entity with improved accuracy. A confidence level associated market predictions based on purchase data increases as an amount of available and accurate purchase data related to a market of interest and/or a product of interest increases. Thus, disclosed examples enable increases in the scale of data that can be processed by the market research entity, enabling higher quality data insights.

Disclosed examples outperform previous technological approaches used within the industry for line detection in terms of accuracy, processing time, and resource consumption. For example, certain previous techniques avoid using the OCR engine by operating directly over the receipt images (e.g., performing image detection and/or segmentation) and providing line-level polygon detections. However, these techniques are not valid for systems that require the information at word level for further analysis. Further, these previous techniques are computationally expensive because they require loading and preprocessing of receipt images as well as the inference of the image backbone for extracting a feature map. Other previous techniques are oriented towards tabulated formats, such as tables, and focus on finding relations over structured documents, where there are some constraints related to word spacing that can help the model with the task. As such, these techniques are inherently unsuitable for the processing of highly unstructured documents, such as receipts.

While examples disclosed herein are described in relation to processing receipts, examples disclosed herein can be applied to other use cases additionally or alternatively. For instance, examples disclosed herein can be applied to other types of purchase documents (e.g., invoices, purchase orders, etc.), other types of documents, etc. Additionally or alternatively, example line detection pipelines disclosed herein can be applied to product packaging images to detect lines for textual features such as ingredients, nutritional facts, pack size, etc. Further, line detection models enabled by examples disclosed herein can be combined with other (e.g., more complex) tasks to force the model to have a better understanding of the document layout and improve results for all tasks.

Referring now to the drawings, FIG. 1 is a block diagram of an example data collection system 100 constructed in accordance with teachings of this disclosure to process images of purchase documents. In some examples, the data collection system 100 implements an example data collection pipeline to collect purchase data. In some examples, the data collection system 100 is associated with a market research entity that collects data from which to generate actionable insights that can be used by businesses to make data-driven decisions. In particular, the market research entity can use the data collection system 100 to process purchase document images provided by consumer panelists to extract purchase data and remove the panelists' burdens of manually providing information for each product purchased in a basket (e.g., one or more items purchased in a single transaction).

In some examples, the data collection system 100 is implemented by one or more servers. For example, the data collection system 100 can correspond to a physical processing center including servers. In some examples, at least some functionality of the data collection system 100 is implemented via an example cloud and/or Edge network (e.g., AWS®, etc.). In some examples, at least some functionality of the data collection system 100 is implemented by different amounts and/or types of electronic devices.

The data collection system 100 of FIG. 1 includes example document processor circuitry 102, which is communicatively coupled to an example document datastore 104 and an example purchase data datastore 106 via an example network 108. The document processor circuitry 102 of FIG. 1 is structured to obtain an image of a purchase document stored in the document datastore 104, extract information from the purchase document, and to store the extracted information in the purchase data datastore 106. However, the document processor circuitry 102 can be structured in any manner that enables the data collection system 100 to collect purchase data from documents and/or images thereof from panelists.

The document datastore 104 is structured to store purchase documents such as invoices, receipts, purchase orders, cash slips, etc. and/or images thereof. In some examples, the document datastore 104 stores images of receipts that are uploaded by panelists (e.g., via an electronic device(s) and/or an application installed thereon). For example, a panelist may use an electronic device such as (but not limited to) a laptop, a smartphone, an electronic tablet, etc. to scan, capture, or otherwise obtain an image of a receipt and transmit the image to the document datastore 104 (e.g., via the network 108). In some examples, the document datastore 104 can include purchase document images from other sources, such as retailers, vendors, receipt collection entities, etc.

The purchase data datastore 106 is structured to store data generated by the document processor circuitry 102. In some examples, the purchase data datastore 106 is implemented as a platform that provides for agile cloud computing. For example, the purchase data datastore 106 can be used for storing datasets associated with the collected receipts and for serving models jointly with microservices. In some examples, the purchase data datastore 106 implements an example data system (e.g., a database management system, a reference data system, etc.).

In the illustrated example of FIG. 1, the document processor circuitry 102 includes or otherwise implements an example extraction pipeline (e.g., an information extraction pipeline, extraction system, etc.). For example, the document processor circuitry 102 can obtain (e.g., retrieve, receive, etc.) purchase document images from the document datastore 104 and pass the purchase document images through one or more stages of the extraction pipeline to identify product- and/or purchase-related data in the document. At least one such stage is a layout extraction stage that includes the mapping of entities to products.

In the illustrated example of FIG. 1, the document processor circuitry 102 (e.g., the extraction pipeline) includes example pre-processor circuitry 110, example model storage circuitry 112, and example OCR circuitry 114, and example entity mapping circuitry 116. The example pre-processor circuitry 110 is structured to pre-process an input receipt image to extract text (e.g., using the OCR circuitry 114) and to generate a list (e.g., array, sequence, etc.) of semantic text segments to be used during the entity building and entity linking tasks, which are herein referred to as an entity mapping task. The example entity mapping circuitry 116 is structured to obtain the list of semantic text segments and to perform the EB and EL tasks.

Figure 2:
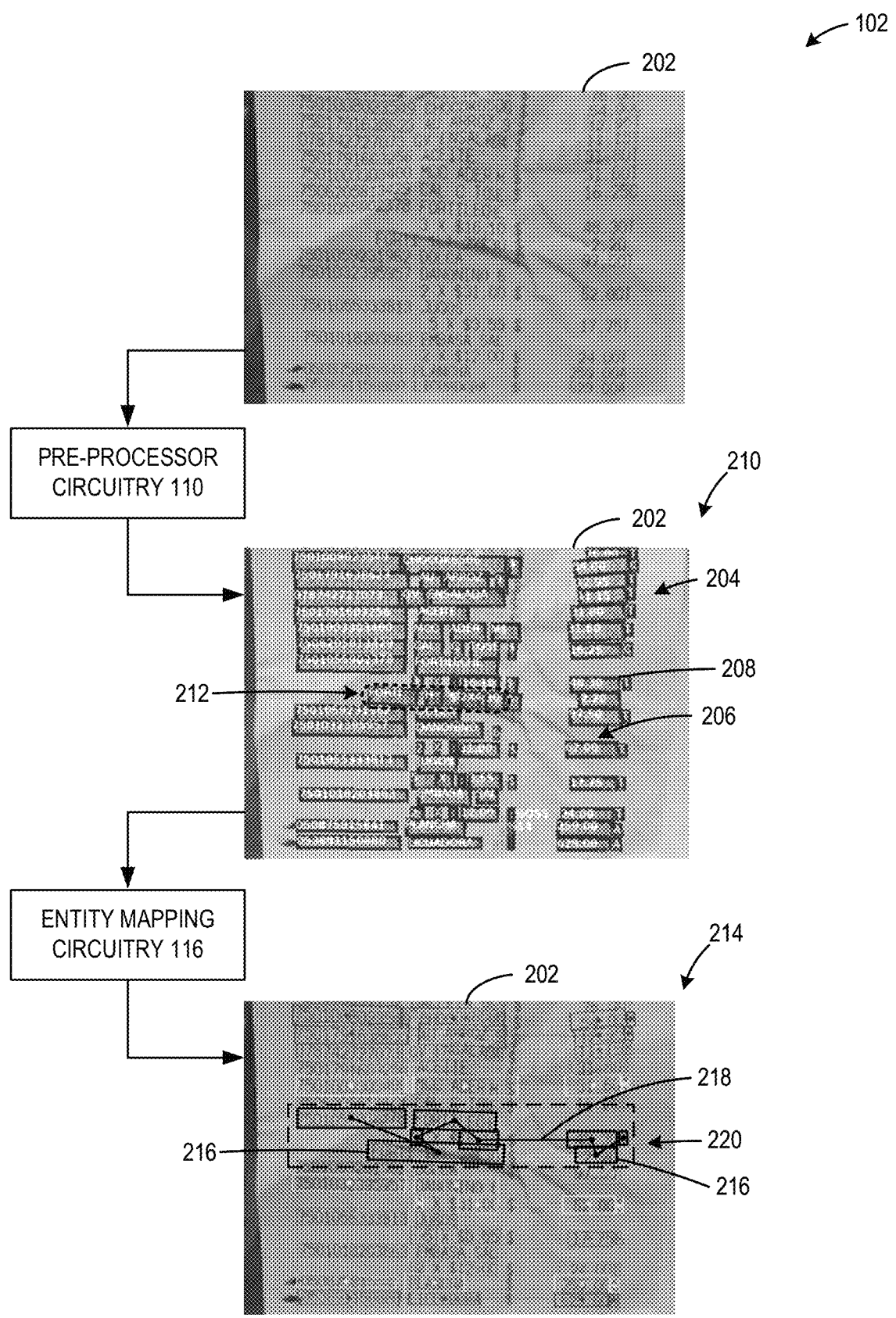
FIG. 2 is a block diagram of an example implementation of the example document processor circuitry of FIG. 1 in accordance with teachings of this disclosure.

FIG. 2 illustrates an example implementation of the document processor circuitry 102 of FIG. 1 in accordance with teachings of this disclosure. The pre-processor circuitry 110 obtains an example receipt image and pre-processes the receipt image. Receipt images uploaded by panelists often include clutter in a background of the image, such as irrelevant and/or unwanted text, visual texture, etc. that can contribute noise and/or undesired text detection during an OCR process. In some examples, the pre-processor circuitry 110 detects and/or segments out an example receipt region (e.g., receipt) 202 from the input image.

The receipt 202 is a raw, unstructured document that includes purchase data corresponding to a transaction between a consumer and a retailer. In some examples, to segment out the receipt 202, the pre-processor circuitry 110 applies an object detection model based on CV to the image to identify and crop the receipt 202 from the image. In some examples, segmenting out the receipt from the background clutter can strengthen (e.g., improve) the extraction process by focusing on a specific region of the image, which improves an accuracy of the extraction process by removing irrelevant information.

The pre-processor circuitry 110 includes or is otherwise communicatively coupled to the example OCR circuitry 114, which is structured to convert the receipt 202 into machine readable text. In some examples, the OCR circuitry 114 is implemented by a third party OCR engine (e.g., a third party web based OCR tool, etc.). In such examples, the OCR circuitry 114 is an application programming interface (API) that interfaces with the third party tool. The OCR circuitry 114 can apply an OCR algorithm to the receipt 202 to detect, extract, and localize text. For example, the OCR circuitry 114 applies an OCR-based algorithm over the receipt 202 to extract example text segments 204.

In some examples, each text segment 204 output by the OCR circuitry 114 is represented as or otherwise includes an example text string (e.g., a string of characters, transcribed characters, etc.) 206 and an example bounding box (e.g., text box) 208 that defines a location of corresponding text segments 204 within the receipt 202. As used herein, a "bounding box" represents characteristics (e.g., a group of coordinates, etc.) of a shape (e.g., a rectangle) enclosing a text string 206. In examples disclosed herein, the text segments 204 are at the word level and can include (but are not limited to) a word, a partial word, an abbreviation, a name, a number, a symbol, etc. For example, a text segment 204 can correspond to a price of a purchased product, a word in a product description, a number representing a quantity, etc. In some examples, an entity for a specific purchased product can include more than one text segment 204. For example, a product description for a product can include multiple text segments 204 that may span more than one line in the receipt 202.

While a standard out-of-the-box OCR engine (such as the OCR circuitry 114) can detect text, generate bounding boxes, and transcribe text, the OCR circuitry 114 cannot guarantee a strict top-to-bottom, left-to-right ordering in the list of words. Further, the output of the OCR circuitry 114 does not typically provide relations between the text segments 204. As a result, the output of the OCR circuitry 114 is not usefully organized for receipt analysis. For example, a bounding box(es) 208 associated with a product may not be correctly ordered next to another bounding box(es) 208 associated with corresponding price information.

As illustrated in FIG. 2, the receipt 202 in the image is wrinkled, resulting in imperfections and rotated text. Further, as can be seen by the human eye, some of the text is faded and/or otherwise difficult to read. These issues affect an output of the OCR circuitry 114. For example, the output of the OCR circuitry 114 often includes errors such as (but not limited to) typos in the detected text strings 206, noisy bounding boxes 208, inaccuracy in detected segment regions (e.g., offset or have the length, width, or angle incorrectly adjusted) and/or may include duplicated detections. For example, the OCR circuitry 114 may detect a single segment twice (e.g., totally, partially, etc.), resulting in a duplicated and overlapped detection that can include some shift. Accordingly, examples disclosed herein post-process the OCR output to extract a layout of the text segments 204 in the receipt 202.

The pre-processor circuitry 110 is structured to tag text segments (e.g., words) 204 detected by the OCR circuitry 114 that correspond to a category of interest. For example, the pre-processor circuitry 110 can apply an example segment tagging model based on CV and NLP techniques to the text segments 204 to detect and tag entity categories, such as (but not limited to) store name, store address, product description, price, quantity, etc. In some examples, the segment tagging model is stored in the model storage circuitry 112 of FIG. 1. In some examples, the segment tagging model can apply an architecture based on, for example, Named Entity Recognition (NER), DeepReader, Chargrid, and/or another category recognition model.

In some examples, the pre-processor circuitry 110 filters out text segments 204 that do not include an entity category tag related to a product. For example, the pre-processor circuitry 110 may filter out text segments 204 that include entity categories such as (but not limited to) a store name, a store address, a total price, etc. In some examples, the pre-processor circuitry 110 filters out text segments 204 that do not include product-related categories such as (but not limited to) unit type, value, discount value, code, unit price, tax, quantity, discount description, and product description.

In some examples, the pre-processor circuitry 110 outputs a (e.g., resultant) list of categorized (e.g., semantic) text segments 210 that correspond to products itemized in the receipt 202. In particular, the pre-processor circuitry 110 of FIGS. 1-2 outputs the list of semantic text segments 210 in which each text segment is represented by a bounding box, a text string, and an entity category related to a product.

The example entity mapping circuitry 116 is structured to obtain the list of semantic text segments 210 detected by the OCR circuitry 114 and tagged by the pre-processor circuitry 110 and to solve an entity mapping task that includes a first task/stage/step (e.g., an entity building task) and a second task/stage/step (e.g., an entity linking task). In particular, the entity mapping circuitry 116 is structured to first group text segments that are spatially and semantically related to form entities, and then to link together all the entities that belong to the same entity group (e.g., product). As discussed in further detail below, the entity mapping circuitry 116 can use information extracted during the first task to address the second task.

The receipt 202 can be interpreted as a multi-level graph that includes a base (e.g., a segment-level, first, etc.) graph and an entity-level (e.g., second) graph. The entity mapping circuitry 116 generates and operates on the segment-level graph to perform the entity building task. For example, the segment-level graph can include segment nodes representing the semantic text segments and segment-level edges connecting ones of the segment nodes. Using information gathered during the entity building task, the entity mapping circuitry 116 generates the entity-level graph over the segment-level by building hypernodes (e.g., entity nodes, entity hypernodes, etc.) representing the entities over the segment-level nodes and generating entity-level edges to connect ones of the hypernodes. As noted above, a hypernode refers to a set of segment nodes representing a respective entity.

The entity mapping circuitry 116 generates initial (e.g., input) segment node embeddings based on features extracted from the semantic text segments. The entity mapping circuitry 116 enriches the input segment node embeddings by performing pairwise messages passing to cause the segment nodes to learn (e.g., decide) contributions of each neighbor segment node. For example, the entity mapping circuitry 116 can pass the input segment node embeddings through a series of segment-level GAT layers to generate output segment node embeddings. The entity mapping circuitry 116 post-processes the output segment node embeddings to cluster the text segments by entity (e.g., to solve the EB task).

A number of text segments in a receipt can highly vary (e.g., from a couple to hundreds) depending on a retailer from which the receipt originated, a number of products purchased, etc. Thus, weight passing methods based on fixed input sizes (e.g., Fully Connected Neural Networks (FCNN)) are not suitable for this use case. Further, a number of connections that need to be evaluated can be limited based on the bounding box coordinates generated by the OCR circuitry 114 to accelerate the inference and reduce an amount of resources needed to perform the task. This rules out using methods based on Convolutional Neural Networks (CNN), because the evaluated connections depend on the order in which the nodes are stacked. Accordingly, example GNN-based model(s) utilized herein are more efficient than methods based on FCNNs to evaluate all possible connections. GNNs are found to be effective and efficient for memory and processing time because the GNN is not a fully-connected method.

To generate the multi-level graph, the example entity mapping circuitry 116 connects the segment nodes to their respective parent hypernodes using unidirectional relation edges (e.g., from segment nodes to entity nodes). To propagate features of the segment-level graph to the entity-level graph, the entity mapping circuitry 116 utilizes an example subgraph (e.g., a relation graph) of the multi-level graph that results when considering only the relation edges. As discussed in further detail below, the entity mapping circuitry 116 propagates the output segment node embeddings (e.g., using a series of GAT layers) to generate input entity node (e.g., hypernode) embeddings for the multi-level graph. Thus, the entity mapping circuitry 116 takes advantage of information gathered during the first stage of the model instead of having to generate the hypernode features from scratch.

The entity mapping circuitry 116 is structured to pass the multi-level graph, including the input entity node embeddings and entity-level edges, through entity-level GAT layers. In doing so, the entity mapping circuitry 116 enriches the entity node embeddings for the entity nodes using the information from their neighbor entity nodes to generate output entity node embeddings. The entity mapping circuitry 116 post-processes the output entity node embeddings to cluster the entities by product (e.g., to solve the EL task). In some examples, the EL output is formed product lines.

As an example, FIG. 2 illustrates a series (e.g., sequence) of text segments 212 output by the pre-processor circuitry 110 that are in a same line. FIG. 2 also illustrates an example output 214 of the entity mapping circuitry 116. As illustrated, the entity mapping circuitry 116 grouped together the series of text segments 212 (e.g., output by the pre-processor circuitry 110) to form an example first entity 216A (e.g., illustrated in the output 214 of the entity mapping circuitry 116). Further, the entity mapping circuitry 116 grouped the first entity 216A and other example entities 216 (e.g., via example links 218) that correspond to a product. In some examples, the grouped entities 216, 216A form an example product line 220 representing a purchased product. That is, a group of entities 216, 216A corresponding to a product forms a product line 220 of the receipt 202. The entity mapping circuitry 116 is discussed in further detail in relation to FIGS. 3 and 4.

Referring again to FIG. 1, the example document processor circuitry 102 may implement at least a portion of a document decode service (DDS). For example, the entity mapping circuitry 116 and/or the document processor circuitry 102 can provide the grouped entities (e.g., entity clusters) representing product lines to one or more downstream components that perform additional operations of the receipt image and/or information extracted therefrom. The entity clusters may be used in downstream tasks, such as entity tagging, receipt field extraction, and/or database cross-coding. In other words, the entity mapping circuitry 116 can be part of a larger end-to-end system for unstructured document understanding. In some examples, the entity mapping circuitry 116 implements a fast and accurate entity mapping model that uses limited resource consumption at least in part by not operating over an image. In some examples, the entity mapping circuitry 116 implements a fast and light (0.3 million parameters) entity mapping model.

The document processor circuitry 102 of FIG. 1 is communicatively coupled to the example model trainer circuitry 118, which is structured to train example models that can be utilized by the document processor circuitry 102 and/or components thereof. For example, the example entity mapping model as implemented by the example entity mapping circuitry 116. In some examples, the model trainer circuitry 118 is instantiated by processor circuitry executing model trainer instructions and/or configured to perform operations such as those represented by the flowcharts of FIG. 12.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a graph neural network (GNN) based model is used. Using a GNN-based model enables the entity mapping circuitry 116 to solve entity mapping task as a two-stage problem in which the receipt is structured as a multi-level graph. In general, machine learning models/architectures that are suitable to use in the example approaches disclosed herein will be a graph attention network that includes a series of graph attentions layers. However, other types of machine learning models could additionally or alternatively be used such as a multi-layer perceptron, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed for 100 epochs using a batch of 4 graphs on each iteration, which improves the results over using just a single graph. In examples disclosed herein, training is performed using the model trainer circuitry 118, but can be trained elsewhere in additional or alternative examples. Training is performed using hyperparameters that control how the learning is performed (e.g., a learning rate, a number of layers to be used in the machine learning model, etc.). In some examples, the selected optimizer is Adam, with an initial learning rate of 0.001 and a reduction factor of 0.1 in epochs 70 and 90.

In some examples, the model trainer circuitry 118 uses binary cross entropy as the loss function (e.g., for computing the loss for the two tasks). In some such examples, the model trainer circuitry 118 sums both losses before applying the optimizer. In some examples re-training may be performed.

Training is performed using training data. In examples disclosed herein, the training data originates from a private dataset of collected receipts from different countries. In some examples, the training receipts include varying height, densities, and image qualities. In some examples, the training receipts may include rotation and all kinds of wrinkles. In some examples, the training data can include a large amount of different receipt layouts and/or the layouts of the receipts can vary greatly from one receipt to another.

Because supervised training is used, the training data is labeled. Labeling is applied to the annotated all the text segments related to purchased products. In some examples, information available for each annotated text segment includes a rotated bounding box, a text string, an entity category, and a product ID. The labeled data can include the product ID as labels for the entity linking task. In some examples, labels for the entity building task are generated manually by generating unique entity IDs shared by the text segments that have the same entity category and product ID. In some examples, the training data is pre-processed by, for example, cropping the receipt images, filtering segments that are outside the receipt, and shifting the coordinates of the remaining segments. In some examples, the training data is sub-divided into training, validation and test sets using a ratio of 70/20/10.

In some examples, the training process for the entity mapping model disclosed herein is a two-step training process, including a first training step and a second (e.g., fine-tuning) training step. In other words, the model trainer circuitry 118 can be structured to fine-tune a trained entity mapping model. The first training step includes training the entity tagging model using the ground truth annotations. To accelerate the training, ground truth segment clusters are used to generate the entity nodes rather than having to train the EB task and using resulting entity predictions (e.g., to finish the first task) to generate the entity level of the graph. Following this strategy accelerates the convergency of the model, as it reduces the dependency of the EL task and the EB task and allows optimizing the parameters for both tasks in parallel.

The second step of the training process include the fine-tuning step. Once the model is trained, the model trainer circuitry 118 fine-tunes the entity mapping model using entity predictions generated by the model rather than the ground truth entity annotations. In other words, only during the first training stage are the entities for the EL stage constructed using the ground truth (GT) segment clusters. Thus, the EL stage of the entity mapping model is adapted to expect the input from the EB stage. In some examples, the entity mapping model is fine-tuned for 10 epochs, with an initial learning rate of 0.0002, being reduced to 0.00002 at epoch 7.

Once training is complete, the model is deployed for use as an executable construct that processes an input and provides an output based on the network of nodes and connections defined in the model. The model is stored at example model storage circuitry 112 and/or in respective components. The model may then be executed by the entity mapping circuitry 116 and/or components thereof.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

While an example manner of implementing the document processor circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example pre-processor circuitry 110, the example model storage circuitry 112, the example OCR circuitry 114, the example entity mapping circuitry 116, the example model trainer circuitry 118, and/or, more generally, the example document processor circuitry 102 of FIG. 1, may be implemented by hardware alone or by hardware in combination with software and/or firmware. Thus, for example, any of the example pre-processor circuitry 110, the example model storage circuitry 112, the example OCR circuitry 114, the example entity mapping circuitry 116, the example model trainer circuitry 118, and/or, more generally, the example document processor circuitry 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example document processor circuitry 102 of FIG. 1 may include one or more elements, processes, and/or devices in addition to, or instead of, those illustrated in FIG. 2, and/or may include more than one of any or all of the illustrated elements, processes and devices.

Figure 3:
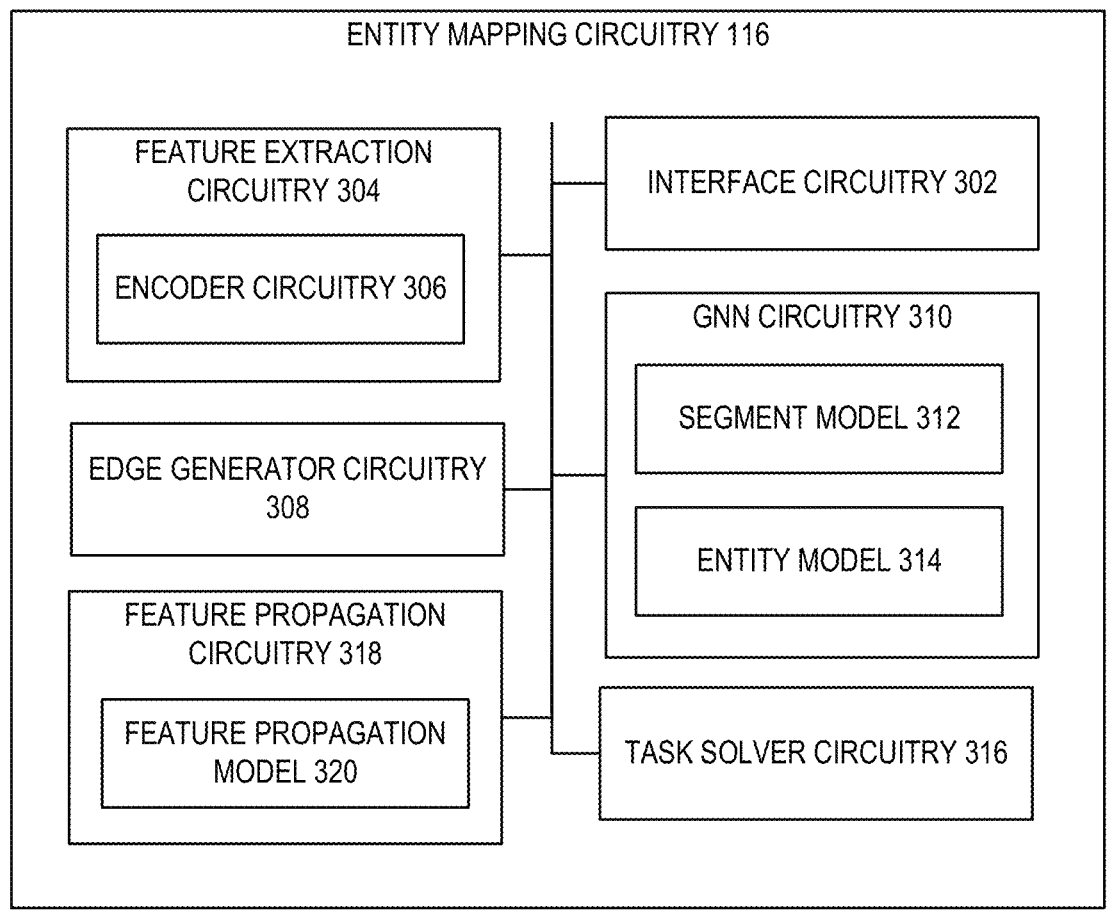
FIG. 3 is a block diagram of the example entity mapping circuitry of FIGS. 1 and 2 constructed in accordance with teachings of this disclosure to determine related content in a document.

FIG. 3 is a block diagram of the entity mapping circuitry 116 of FIG. 1 structured in accordance with teachings of this disclosure for determining related content in a document. The entity mapping circuitry 116 of FIG. 3 may be instantiated (e.g., creating an instance of, bring into being for any length of time, materialize, implement, etc.) by processor circuitry such as a central processing unit executing instructions. Additionally or alternatively, the entity mapping circuitry 116 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

In some examples, the entity mapping circuitry 116 implements an example entity mapping (e.g., a link prediction) model. In some such examples, the components of the entity mapping circuitry 116 (discussed below) define an architecture or otherwise implement a framework of the entity mapping model. In some examples, the entity mapping circuitry 116 implements an example entity mapping pipeline. The entity mapping circuitry 116 of FIG. 3 includes example interface circuitry 302, which is structured to retrieve, receive, and/or otherwise obtain an example list of semantic text segments (e.g., from the pre-processor circuitry 110) for processing by the entity mapping circuitry 116. In other words, the semantic text segments (e.g., segments) are an input to the entity mapping circuitry 116.

The entity mapping circuitry 116 includes example feature extraction circuitry 304, which is structured to generate example segment node embeddings (e.g., segment node feature embeddings, input segment node embeddings, feature embeddings for the segment nodes, etc.) by extracting and concatenating certain features from the semantic text segments. In particular, the feature extraction circuitry 304 includes a first stage of a pipeline to extract node features from any number of text segments. In some examples, the feature extraction circuitry 304 is instantiated by processor circuitry executing feature extraction instructions and/or configured to perform operations such as those represented by the flowcharts of FIGS. 13-15. The feature extraction circuitry 304 generates a segment node embedding for each semantic text segment related to a product. The segment node embeddings are dense numerical feature representations of the semantic text segments. The segment node embeddings include a series of floating point values, a number of which specify a length of a segment embedding.

Figure 4A:
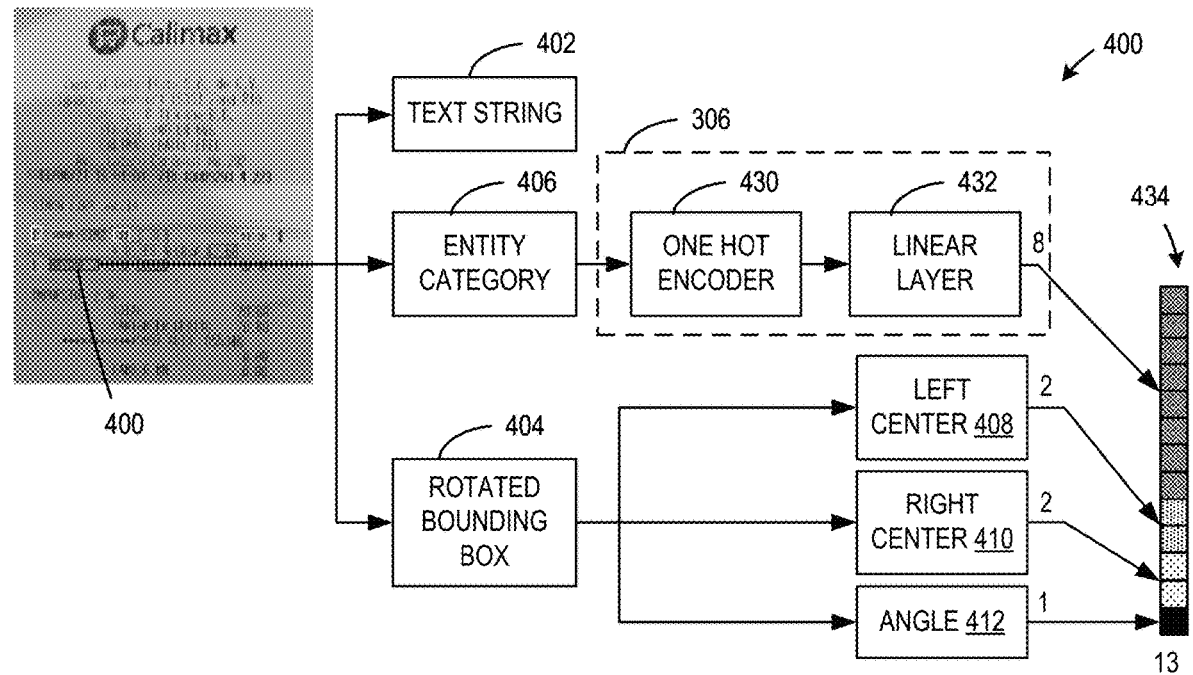
FIG. 4A illustrates an example implementation of example feature extraction circuitry of the example entity mapping circuitry of FIGS. 1-3 in accordance with teachings of this disclosure.

FIG. 4A illustrates an example implementation of the feature extraction circuitry 304 of FIG. 3. As illustrated in FIG. 3, an example semantic text segment 400 of a receipt is represented by three sources of information: an example text string 402, an example rotated bounding box 404, and an example entity category 406. The feature extraction circuitry 304 discards the text string 402 because relevant semantic information to be inferred from the text is already contained in the entity category 406. As such, examples disclosed herein remove the impact of the text errors coming from the OCR circuitry 114, which are very common, and the entity mapping model is distilled to the most relevant cues for the task, making the model more efficient in computation.

Figure 4B:
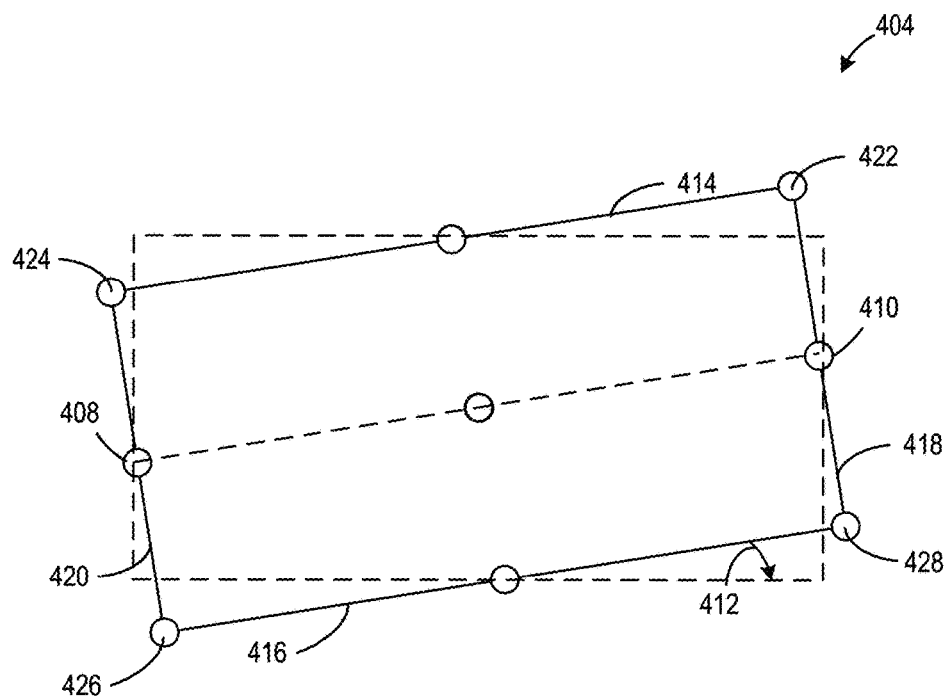
FIG. 4B illustrates an example bounding box that may be output by an optical character recognition engine.

The feature extraction circuitry 304 extracts particular geometric features from the bounding box 404. In particular, the feature extraction circuitry 304 extracts an example left center coordinate 408, an example right center coordinate 410, and an example angle 412. FIG. 4B illustrates the bounding box 404 from which the feature extraction circuitry 304 extracts the geometric features for the text segment 400. The bounding box 404 includes an example top side 414, an example bottom side 416, an example first lateral (e.g., right) side 418, and an example second lateral (e.g., left) side 420. The bounding box 404 includes four corner vertices: an example top-right vertex 422, an example top-left vertex 424, an example bottom-left vertex 426, and an example bottom-right vertex 428.

The bounding box 404 includes the example left center coordinate 408, which is a middle point between the top-left vertex 424 and the bottom-left vertex 426 of the bounding box 404. The bounding box 404 also includes the example right center coordinate 410, which is a middle point between the top-right vertex 422 and the bottom-right vertex 428 of the bounding box 404. The bounding box 404 includes the example angle (e.g., bounding box rotation, rotation angle,) 412, which is an angle of the bounding box 404 (in radians, between $-\pi/2$ and $\pi/2$). By utilizing the left and right center coordinates 408, 410, the feature extraction circuitry 304 ignores information related to a height of the bounding box 404. In particular, this omission is performed by design because instances of overfitting may otherwise occur. Further, the height of the text segment 400 is not a crucial feature for this task, as it might vary across text segments of the same text line, and it does not contain reliable information about the distance between different lines.

The example feature extraction circuitry 304 normalizes the left and right center coordinates 408, 410 using a width of the receipt, as it is the most stable dimension. In particular, because documents may be unstructured, the number of lines and the height of the document can highly vary. Thus, normalizing left and right center coordinates 408, 410 relative to the width provides stability.

To extract information from the entity category, the feature extraction circuitry 304 includes example encoder circuitry 306 (illustrated in FIG. 3). The encoder circuitry 306 generates or otherwise extracts category features for the categories. AI models typically need input variables to be numeric. Thus, the encoder circuitry 306 transforms (e.g., converts) the non-numeric categories to numerical representations. The encoder circuitry 306 employs an example one-hot encoder 430 (e.g., to extract the features), followed by an example linear layer 432 to adapt the features and map them to an embedding of, for example, length 8. A one-hot refers to a group of bits that includes a single high bit (e.g., 1) and all other low bits (e.g., 0). In some examples, each entity category 406 can be associated with a binary variable. The encoder circuitry 306 can associate a text segment with a respective binary variable. Based on the binary variable, the linear layer 432 can generate an embedding for the text segment 400. Thus, the encoder circuitry 306 can take an entity category 406 of a text segment and convert it to a binarized vector representing the category of the text segment.

The feature extraction circuitry 304 concatenates the category embedding with bounding box features to generate an example segment node embedding 434 (e.g., with 13 float values). In particular, the feature extraction circuitry 304 concatenates a normalized left center coordinate 408 (2 floats), a normalized right center coordinate 410 (2 floats), and a rotation angle 412 (1 float) from a bounding box 404 with an output of the linear layer 432 (8 floats) to generate the segment node embedding 434 for a text segment 400. As such, the feature extraction circuitry 304 converts the text segment 400 into an array of numbers that represent the text segment. In some examples, the entity mapping circuitry 116 transmits the feature embeddings for the text segments (the segment nodes) to example GNN circuitry 310.

Referring again to FIG. 3, the feature extraction circuitry 304 operates only on the semantic text segments, and not on subsequently formed entities. Rather, as discussed in further detail below, the features extracted from the semantic text segments are first enriched with information from their neighbor text segments and then propagated using a multi-level graph to generate entity node embeddings.

The entity mapping circuitry 116 includes example edge generator circuitry 308, which is structured to sample edges among nodes of a graph. In particular, the entity mapping circuitry 116 samples segment-level edges among the segment nodes of the segment-level graph during the EB task. Further, the entity mapping circuitry 116 samples entity-level edges among the hypernodes of the entity-level graph during the EL task. In some examples, the entity mapping circuitry 116 applies similar operations to sample the segment-level edges and to sample the entity-level.

The edge generator circuitry 308 does not utilize the features extracted by the feature extraction circuitry 304 and, thus, can operate in parallel (e.g., concurrently) with the feature extraction circuitry 304. However, the edge generator circuitry 308 and the feature extraction circuitry 304 can additionally or alternatively operate irrelative of one another. In some examples, the edge generator circuitry 308 is instantiated by processor circuitry executing edge sample instructions and/or configured to perform operations such as those represented by the flowchart of FIGS. 12-14.

During the EB stage, the edge generator circuitry 308 of FIG. 3 generates the structure of a segment-level graph on which the entity building task is performed. For example, the edge generator circuitry 308 obtains the list of semantic text segments and determines which neighbor text segment(s) can interact with a given text segment (e.g., during message passing) based on a proximity of the neighbors text segment(s) to the given text segment. The edges sampled by the edge generator circuitry 308 are used by the GNN circuitry 310 to perform message passing and by example task solver circuitry 316 to generate confidence scores for the sampled segment edges. In some instances, if there is a missing segment-level edge between two text segments that belong to the same entity, traditional models will not be able to connect them, no matter how well they perform. While other edge sampling techniques can be used additionally or alternatively, such as k-nearest neighbor or beta-skeleton, these techniques are prone to miss important connections, especially in highly unstructured document in which two segments that should be connected are at opposite ends of a line, which can reduce an accuracy of the model. Hence, examples disclosed herein utilize a novel edge sampling strategy (e.g., technique or function, which is represented as an example equation (1) below) that covers any possible true positive (e.g., connects all possible segments within the same line).

$$\text{Edge}_{A-B} = (|C_A^y - C_B^y| < H_A \times K) \quad \text{Equation (1)}$$

As indicated in equation (1), an edge from a first text segment (e.g., segment A) to a second text segment (e.g., segment B) is created if a vertical distance between their centers (C) is less than a height (H) of segment A (or segment B) multiplied by a constant (K). In other words, when equation (1) is true, segment A and segment B are linked by a segment-level edge. In some examples, the constant (K) is 2 (e.g., K=2) because the constant of 2 enables the edge generator circuitry 308 to sample edges between the segments and also between the segments of adjacent (e.g., previous and next) lines, and to consider the possible rotation of the document. However, the constant can be higher (which may increase resource consumption, but raise accuracy) or lower (which may lower accuracy, but reduce resource consumption). The edge generator circuitry 308 transmits the sampled edges, which define the structure of the graph) to the GNN circuitry 310.

The edge generator circuitry 308 of FIG. 3 uses the novel sampling function of equation (1) to generate the entity edges for the entity-level graph. For example, an output of the EB task includes clustered text segments representing entities that correspond to purchased products. The entities are to be represented by the entity hypernodes (e.g., an entity node formed of segment nodes), which can be connected by the entity-level edges to form an entity-level graph. Thus, the edge generator circuitry 308 can apply the same operations of the entity hypernodes as on the semantic text segments to form the entity edges.

The entity mapping circuitry 116 includes the example GNN circuitry 310, which is structured to apply GAT layers of a GAN-based model to graphic representations of a receipt to enrich (e.g., augment, supplement, etc.) input feature embeddings. For example, the GNN circuitry 310 can enrich feature embeddings for the segment nodes with information from their neighbor text segments and can enrich feature embeddings for the entity hypernodes with information from their neighbor entities. Thus, the entity mapping circuitry 116 includes an example segment model 312 and an example entity model 314. The GAT layers use features of the nodes (e.g., the segment nodes and/or the hypernodes) to compute weights for the contribution of each node to update the feature of a node. In some examples, the GNN circuitry 310 is instantiated by processor circuitry executing GNN instructions and/or configured to perform operations such as those represented by the flowchart of FIGS. 12-14 and 18.

In other example techniques, GNN layer implementations require an additional scores vector for performing a weighted message passing to facilitate deciding the contribution of each neighbor node. While this approach may suggest adding additional complexity to the design of the network to compute the weights (e.g., by selecting a set of features for each pair of nodes and processing them with a Multi-Layer Perceptron (MLP)), examples disclosed herein focus on bounding boxes and the entity category for weight passing. In particular, the information needed for computing the message passing weights is related to the bounding box coordinates and the entity category, which is information already embedded in the segment node features. Taking advantage of this, Graph Attention Layers (GAT) are utilized in examples disclosed herein. In the GAT layers, the weights for the message passing are computed directly inside the layer using the input segment node features. To avoid 0-in-degree errors (disconnected nodes) while using the GAT layers, a self-loop is added for each node, which means adding an edge that connects the node with itself.

During the EB stage, the GNN circuitry 310 obtains the segment level-graph with the segment nodes connected by the sampled segment-level edges (e.g., from the edge generator circuitry 308) and the input segment node embeddings (e.g., generated by the feature extraction circuitry 304). The GNN circuitry 310 inputs the segment-level graph into the segment model 312, which applies a message passing stage in which the segment nodes iteratively update their representations by exchanging information with their neighbors. The segment model 312 of the GNN circuitry 310 structures a GNN architecture for the segment-level graph using two GAT layers, each of which is followed by a sigmoid linear unit function (SiLU activation) except for the last one.

During the EL stage, the GNN circuitry 310 obtains a multi-level graph (e.g., the segment-level graph connected to an entity-level graph via relation edges) and entity hypernode features generated by example feature propagation circuitry (e.g., feature propagation circuitry 318, discussed in further detail below). The GNN circuitry 310 inputs the multi-level graph into the entity model 314, which applies a message passing stage in which the entity hypernodes iteratively update their representations by exchanging information with their neighbors. The entity model 314 of the GNN circuitry 310 structures the GNN architecture for the entity-level graph using four GAT layers, each of which is followed by a sigmoid linear unit function (SiLU activation) except for the last one. However, the entity model 314 can include a different architecture in additional or alternative examples. For example, the entity model 314 can include more or less GAT layers, etc. The entity model 314 includes the additional two GAT layers because the relations between the entities are more complex than the relations among the text segments. In some examples, the SiLU activations are used because they tend to work better for this use case than a rectified linear unit function (ReLU activation) and/or variants thereof. In some examples, residual connections are added in all the layers to accelerate the convergence of the model(s).

The GNN circuitry 310 of FIG. 3 also applies a global document node enhancement during execution of both the segment model 312 and the entity model 314. That is, the GNN circuitry 310 uses one global node per graph level. The global node is connected bidirectionally to the rest of the level nodes (e.g., the segments nodes or the entity hypernodes). The example GNN circuitry 310 computes the global node's feature embedding by averaging all the input node feature embeddings (e.g., segment node features embeddings or entity node feature embeddings), which accomplishes at least two tasks. First, it provides some context information to the nodes by gathering information from the whole graph. That is, the global node assists each node to capture the global information of the receipt. Second, it acts as a regularization term for the GAT layer weights, as it is not a real neighbor node. The global nodes are only considered during the message passing and are discarded once the GNN stage is finished.

For each graph level, the GNN circuitry 310 passes the respective node features through the layers and activations to be enriched with the information from the neighbor nodes. Thus, the graph structure extracted from the receipt is injected to an attention mechanism to help each input node fully understand the receipt from both a local and a global perspective. The global node is attended to by each input node to assist the model to understand documents in a global aspect. The GNN circuitry 310 outputs the enriched node features, which are transmitted to example task solver circuitry 316 (e.g., for the segment node embeddings and the entity hypernode embeddings).

The entity mapping circuitry 116 includes the example task solver circuitry 316. After each GNN level, the example task solver circuitry 316 solves the corresponding task. For example, the task solver circuitry 316 solves the EB in the segment level and solves the EL task in the entity level. The goal for both tasks is the same: for each pair of nodes (e.g., segment nodes or entity nodes) that are connected by an edge (e.g., a segment-level edge or an entity-level edge), the example task solver circuitry 316 extracts the confidence that they belong to the same higher-level container. In some examples, task solver circuitry 316 is instantiated by processor circuitry executing edge prediction instructions and/or configured to perform operations such as those represented by the flowchart of FIGS. 12-14, 16, and 18-19.

The task solver circuitry 316, for both tasks, first applies an example edge prediction head that includes concatenating the output features of the pair of nodes and processing the resultant embedding with an example multi-layer perceptron (MLP) to obtain confidence scores for the sampled edges, which are in the form of an example adjacency matrix. To generate final clusters, the task solver circuitry 316 applies a post-processing function to the adjacency matrix. In some examples, the post-processing functions are different for the EB task than for the EL task. For example, the task solver circuitry 316 can apply a Connected Components (CC) algorithm to a first adjacency matrix during the EB and an example graph clustering method to a second adjacency matrix during the EL task. However, it is understood that the post-processing functions applied during the EB task and the EL task can be the same in additional or alternative examples. For example, the task solver circuitry 316 can apply the example graph clustering method during both the EB task and the EL task in additional or alternative examples. The graph clustering method is discussed in further detail below in relation to FIG. 5.

During the entity building task, the task solver circuitry 316 of FIG. 3 obtains the adjacency matrix of confidence scores for the segment-level edges and applies a Connected Components (CC) algorithm to the adjacency matrix. The CC algorithm, represented as an example equation (2) (wherein $c_i$ is a class probability for node $v_i$) below, is a simple yet effective algorithm based on the following statement: two nodes belong to the same connected component when there exists a path between them. The CC algorithm includes a prior binarizing step of the adjacency matrix (A in equation (2)), which binary classifies edges to predict the existence or absence of links between nodes. Thus, to generate text segment clusters, the task solver circuitry 316 keeps the sampled segment-level edges whose confidence scores are greater than the threshold, th. The resulting connected components define the entities.

$$c_i = CC(A > th) \qquad \text{Equation (2)}$$

However, due to its simplicity, the CC algorithm can suffer from any link error and usually struggles when dealing with complex data distributions. In addition, the CC algorithm requires the prior binarizing step of the adjacency matrix (A in equation (2)), and hence, it depends on a threshold parameter, which might be biased to the dataset. Thus, in additional or alternative examples, the post-processing function can be an example graph clustering method, which is discussed in further detail below in relation to clustering of the entities.

The task solver circuitry 316 outputs text segment clusters representing built entities. In some examples, the task solver circuitry 316 forms entity bounding boxes around the entities. For example, the task solver circuitry 316 generates coordinates for the entity bounding boxes by enclosing the text segment bounding boxes clustered to form the entity. In other words, the task solver circuitry 316 can determine the bounds of the entity bounding boxes by determining the outermost bounds of the segment bounding boxes forming the entity.

In some examples, the entities formed during a first (segment-level) stage of the task solver circuitry 316 are obtained by the edge generator circuitry 308. As discussed above, the edge generator circuitry 308 can sample entity-level edges among the entities using equation (1).

The entity mapping circuitry 116 includes the example feature propagation circuitry 318, which is structured to perform feature propagation to define connections between two or more stages of the model and to define how features of the entity nodes are generated. The feature propagation circuitry 318 of FIG. 3 obtains the output segment node embeddings (e.g., from the GNN circuitry 310), which have been enriched with information of their neighbor nodes, as well as the entities formed during a first (segment-level) stage of the task solver circuitry 316. The feature propagation circuitry 318 connects the segment nodes to their entity nodes, which are built as entity hypernodes on top of the segment-level graph, using unidirectional relation edges (from segments to entities). Thus, the feature propagation circuitry 318 generates an example relation graph in which the segment nodes are connected to the hypernodes via the relation edges.

Traditional approaches to feature propagation includes aggregating features of the nodes that belong to the same entity by summing the features and processing the resulting embedding using a linear layer with the same input and output size. However, this strategy is not optimal for at least two reasons. First, as the number of nodes that include an entity varies, summing their features will lead to variable magnitude embeddings, which might impact on the stability of a corresponding model. This could be mitigated by using a mean aggregation instead of sum. Second, with this aggregation approach, it is assumed that all the segment nodes contribute equally to the entity, which may turn out to be an erroneous assumption, as there might be key segments (those which are bigger, or which have a strategic position within the receipt) that should contribute more to the entity features.

For at least the foregoing reasons, the feature propagation circuitry 318 builds as hypernodes on top of the segment level graph and connects to their child segment nodes using unidirectional relation edges (from segments to entities). The feature propagation circuitry 318 propagates the output segment node feature embeddings from the segment model 312 of the GNN circuitry 310, which are provided to the entity hypernodes. Doing so helps prevent a loss of information that will impact the EL accuracy. To propagate the features, applies an example feature propagation model 320 that includes a series of GAT layers that operate on the relation graph. As such, the feature propagation model 320 learns how to combine the segments in an optimal way and to detect the key segments of the entities. In some examples, the GAN model includes two GAT layers with a SiLU activation between them. In this case residual connections are not used to enable maximization of the information shared by the segment nodes (and entity features are initialized with zeros). An output of the feature propagation circuitry 318 is provided to the GNN circuitry 310 to be used for message passing via the entity model 314.

As noted above, the task solver circuitry 316 obtains output entity node embeddings from the GNN circuitry 310. For each pair of entities that are connected by a sampled entity-level edge, the task solver circuitry 316 is structured to extract a confidence score (e.g., value, etc.) that the entities of the pair belong to the product. To do so, the task solver circuitry 316 concatenates the enriched features of both entities and processes them with the example multi-layer perceptron (MLP). The task solver circuitry 316 generates an example sparse adjacency matrix of confidence values corresponding to the sampled entity-level edges.

Using the entity-level adjacency matrix, the task solver circuitry 316 can group (e.g., cluster) the entities by product. For example, the task solver circuitry 316 can apply a post-processing function based on an example graph clustering method to the adjacency matrix to generate the final entity clusters. The graph clustering method includes two steps. An example first step includes determining a number of clusters to generate. An example second step includes grouping the entities into the determined number of clusters. An example implementation of the graph clustering method is discussed in further detail below in relation to FIG. 5.

In some examples, the entity mapping circuitry 116 includes means for generating feature embeddings for nodes. For example, the means for generating the feature embeddings may be implemented by the example feature extraction circuitry 304. In some examples, the entity mapping circuitry 116 includes means for generating a graph. For example, the means for generating the graph may be implemented by the example edge generator circuitry 308 and/or the feature propagating circuitry 318. In some examples, the entity mapping circuitry 116 includes means for generating second feature embeddings. For example, the means for generating the second feature embeddings may be implemented by the example feature propagation circuitry 318. In some examples, the entity mapping circuitry 116 includes means for updating embeddings. For example, the means for updating the embeddings may be implemented by the example GNN circuitry 310. In some examples, the entity mapping circuitry 116 includes means for clustering. For example, the means for clustering may be implemented by the example task solver circuitry 316.

Figure 20:
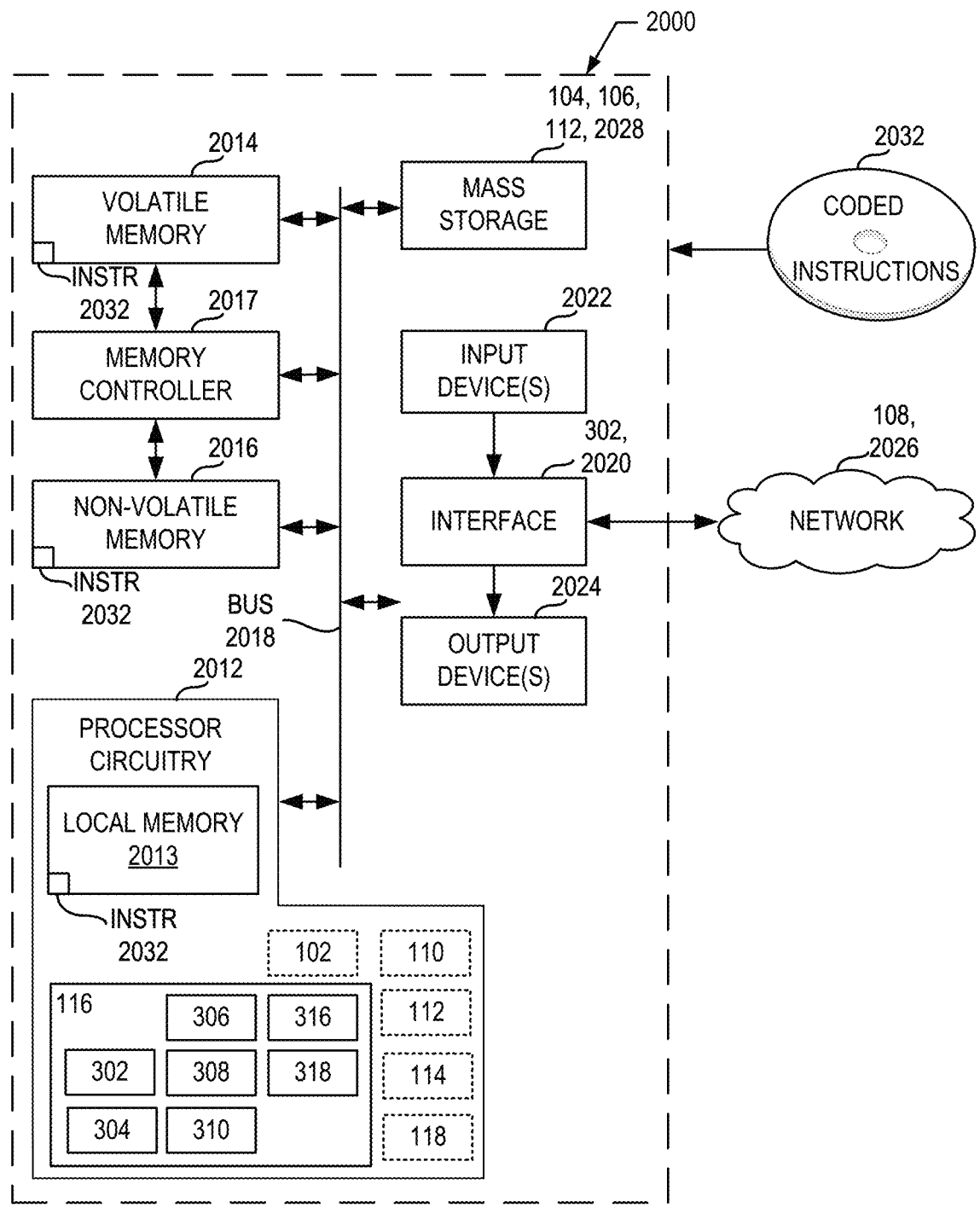
FIG. 20 is a block diagram of an example processing platform including processor circuitry structured to execute the example machine readable instructions and/or the example operations of FIGS. 12-19 to implement the document processor circuitry 102 and/or, more generally, the entity mapping circuitry of FIGS. 1-9.

In some examples, the feature extraction circuitry 304, the edge generator circuitry 308, the GNN circuitry 310, the task solver circuitry 316, and/or the feature propagation circuitry 318 may be instantiated by processor circuitry such as the example processor circuitry 2012 of FIG. 20. For instance, the feature extraction circuitry 304, the edge generator circuitry 308, the GNN circuitry 310, the task solver circuitry 316, and/or the feature propagation circuitry 318 may be instantiated by the example microprocessor 2100 of FIG. 21 executing machine executable instructions such as those implemented by at least blocks 1200, 1300 of FIGS. 12-16. In some examples, the feature extraction circuitry 304, the edge generator circuitry 308, the GNN circuitry 310, the task solver circuitry 316, and/or the feature propagation circuitry 318 may be instantiated by hardware logic circuitry, which may be implemented by an ASIC, XPU, or the FPGA circuitry 2200 of FIG. 22 structured to perform operations corresponding to the machine readable instructions. Additionally or alternatively, the feature extraction circuitry 304, the edge generator circuitry 308, the GNN circuitry 310, the task solver circuitry 316, and/or the feature propagation circuitry 318 may be instantiated by any other combination of hardware, software, and/or firmware. For example, the feature extraction circuitry 304, the edge generator circuitry 308, the GNN circuitry 310, the task solver circuitry 316, and/or the feature propagation circuitry 318, may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 5:
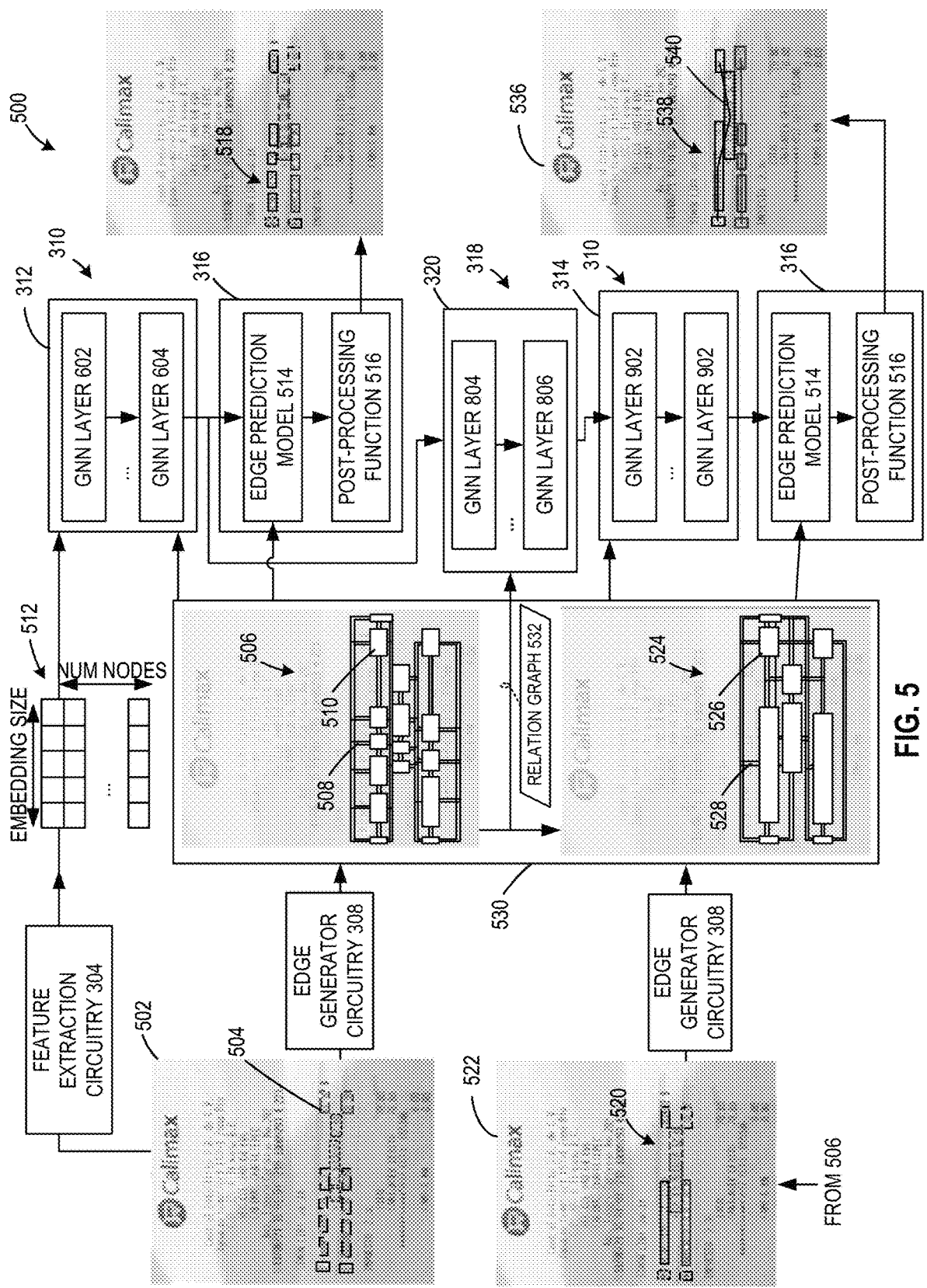
FIG. 5 illustrates an example implementation of the entity mapping circuitry of FIGS. 1-3 in accordance with teachings of this disclosure.

FIG. 5 illustrates an example implementation 500 of the entity mapping circuitry of FIGS. 1-3 in accordance with teachings of this disclosure. The entity mapping circuitry 116 obtains (via the interface circuitry 302) an example receipt 502 that includes example text segments 504 detected by an OCR engine (e.g., the OCR circuitry 114 of FIG. 1) and categorized by a segment tagging model (e.g., applied by the pre-processor circuitry 110 of FIG. 1). Each of the text segments 504 is represented by a bounding box that represents a group of coordinates defining a text string, the text string, and an entity category related to a product.

As illustrated in FIG. 5, the edge generator circuitry 308 obtains the text segments 504 of the receipt 502 and generates an example segment-level graph (e.g., graph structure) 506 for the receipt 502. For example, the edge generator circuitry 308 generates the segment-level graph 506 by sampling example segment-level edges 508 among the text segments 504, which are represented by example nodes 510 of the segment-level graph 506. In some examples, the edge generator circuitry 308 samples the segment-level edges by applying equation (1), above, to each pair of text segments 504 in the receipt 502. For a pair of segments (e.g., Segment A and Segment B), the edge generator circuitry 308 determines whether to create a segment-level edge 508 from segment A to segment B if a vertical distance between their centers (C) is less than a height (H) of segment A multiplied by a constant (K) (2 in this use case). The segment-level edges 508 are utilized by and/or provided to the GNN circuitry 310 to perform the message passing and the task solver circuitry 316 to extract confidence scores for the segment-level edges 508 and solve the EB task.

The example feature extraction circuitry 304 of FIG. 5 obtains the text segments 504 of the receipt 502 and generates example input segment node embeddings 512 for the segment nodes 510 representing the text segments 504. For example, the feature extraction circuitry 304 can obtain a list of the text segments 504 based on a top to bottom and then left to right order of the bounding boxes. In some examples, the feature extraction circuitry 304 iterates sequentially through the text segments 504 in the list to generate an ordered array of the input segment node embeddings 512. For example, the feature extraction circuitry 304 of FIG. 3 can iteratively extract a category embedding using a one-hot encoder and linear layer (e.g., via the encoder circuitry 306) as well as extract a left center coordinate, a right center coordinate, and a bounding box rotation (e.g., angle of the bounding box in radians) from each of the text segments 504. It is understood, however, that the feature extraction circuitry 304 can operate on the text segments 504 in different orders in additional or alternative examples. In some examples, the feature extraction circuitry 304 normalizes the left and right center coordinates using the width of the receipt 502.

To generate the input segment node embeddings 512, the feature extraction circuitry 304 concatenates the extracted features together. In some examples, an amount of the input segment node embeddings 512 corresponds to a number of the nodes 510 of the segment-level graph 506 representing the receipt 502. In some examples, the number of nodes corresponds to a number of the text segments 504 in the array. In some such examples, each input segment node embeddings 512 corresponds to a respective text segment 504 (e.g., a node). However, in additional or alternative examples, the feature extraction circuitry 304 may be structured to generate additional or alternative input embeddings, such as a global node embedding.

In some examples, an embedding size of input segment node embeddings 512 is based on the features in the embeddings. For example, the features of each input segment node embeddings 512 of FIG. 5 include the normalized left center coordinate, which includes 2 float values (e.g., an x coordinate and a y coordinate), the normalized right center coordinate, which includes 2 float values (e.g., an x coordinate and a y coordinate), the rotation angle, which includes 1 float value (e.g., the rotation angle R, in radians), and the category embeddings, which includes 8 float values. Thus, the embedding size is 13 float values. However, it is understood that the embedding size can be larger or smaller in additional or alternative examples (e.g., depending on the features extracted, etc.). The input segment node embeddings 512 are provided as an input to the example GNN circuitry 310.

The GNN circuitry 310 obtains the input segment node embeddings 512 and the segment-level graph 506 with the sampled segment-level edges 508. The GNN circuitry 310 generates another feature embedding for a global node by averaging all the input segment node embeddings 512. The global node is connected bidirectionally to the rest of the nodes 510. The GNN circuitry 310 applies an example segment model 312 to the input segment node embeddings 512, the segment-level edges 508, and the global node. The segment model 312 is used to compute hidden representations of each node in the segment-level graph 506 by attending over its neighbors nodes (e.g., a local aspect) and the global node, which causes the segment model 312 to learn contextualized information in the document from both local and global aspects.

Figure 6:
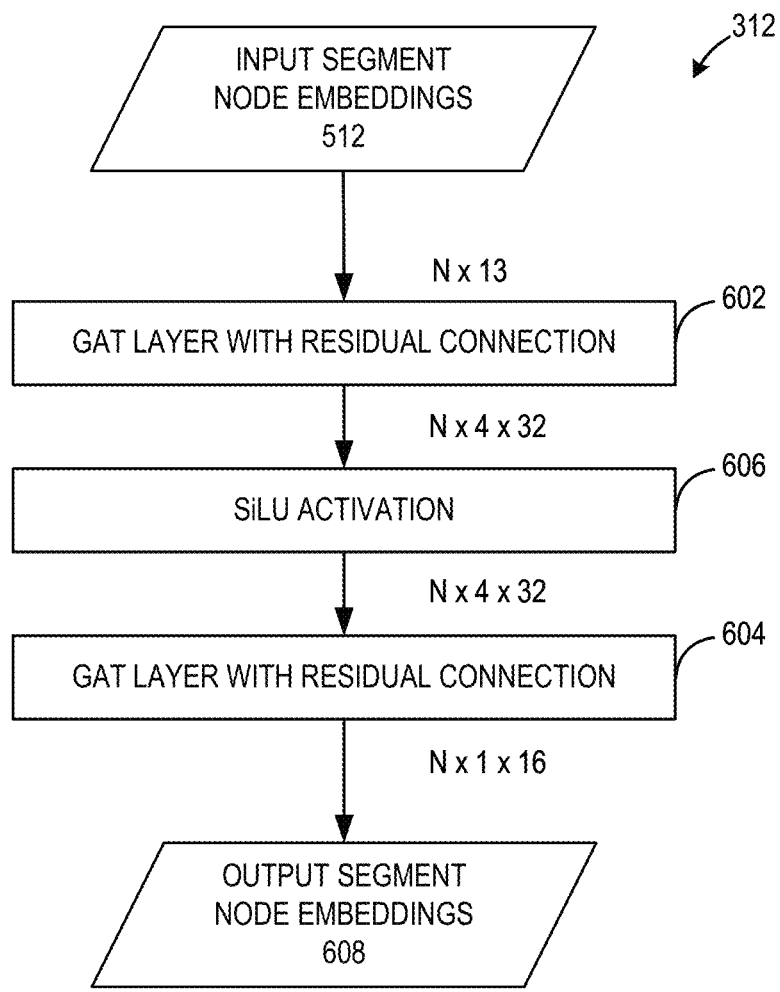
FIG. 6 illustrates an example architecture of an example segment model based on graph attention network structured in accordance with teachings of this disclosure for augmenting input segment node features.

FIG. 6 illustrates an architecture of the example segment model 312, which is GAN-based model structured in accordance with teachings of this disclosure for enriching node feature embeddings. As illustrated in FIG. 6, the segment model 312 includes series of stacked layers. In particular, the segment model 312 includes two example graph attention (GAT) layers (e.g., an example first GAT layer 602 and an example second GAT layer 604), the first of which is followed by an example SiLu activation layer 606. The GAT layers 602, 604 compute the weights for the message passing directly inside each layer using example equations (3)-(6), wherein l is a specifical layer, W is a weight matrix, $h_i$ is an embedding for the $i^{th}$ node, $e_{ij}^{(l)}$ is an attention coefficient indicating the importance of node j's features to node i (where $.^T$ represents transposition and $\|$ is the concatenation operation), $a^{(l)^T}$ is an attention mechanism, $\alpha_{ij}^{(l)}$ represents a normalized attention coefficient, and $$z_i^{(l)} = W^{(l)} h_i^{(l)} \qquad \text{Equation (3)}$$

$$e_{ij}^{(l)} = LeakyReLU\left(a^{(l)^T}\left(z_i^l \| z_j^l\right)\right) \qquad \text{Equation (4)}$$

$$\alpha_{ij}^{(l)} = \frac{\exp\left(e_{ij}^l\right)}{\sum_{k \in N(i)} \exp\left(e_{ik}^l\right)} \qquad \text{Equation (5)}$$

$$h_i^l = \sigma\left(\sum_{j \in N(i)} \alpha_{ij}^{(l)} z_j^{(l)}\right) \qquad \text{Equation (6)}$$

The segment-level graph 506 and the input segment node embeddings 512 are provided to the GAT layers 602,604 which cause the segment nodes 510 to determine contributions of each neighbor affecting features of the segment nodes 510 (e.g., determine weights). That is, the segment-level graph 506 is input into a masked attention mechanism that determines $e_{ij}^{(l)}$ for nodes $j \in N(i)$, where N(i) is some neighborhood of node i in the segment-level graph 506. Once obtained, the normalized attention coefficients are used to compute a linear combination of the features corresponding to them, to serve as the final output features for every node. The SiLu activation layer 606 update the segment nodes 510 based on the modified feature embeddings. The last GAT layer 604 generates example output segment node embeddings 608, which are augmented (e.g., enriched, modified, etc.) versions of the input segment node embeddings 512. The output segment node embeddings 608 represent updated features of the segment nodes 510.

Referring again to FIG. 5, the GNN circuitry 310 provides the output segment node embeddings 608 to the task solver circuitry 316 and to the feature propagation circuitry 318. The task solver circuitry 316 also obtains the segment-level graph 506 from the edge generator circuitry 308 and applies an edge prediction head implemented by an example edge prediction model 514. The task solver circuitry 316 applies the edge prediction model 514 to the segment-level graph 506, which includes the segment-level edges 508 and the segment nodes 510 represented by the output segment node embeddings 608, to determine first (e.g., segment-level) confidence scores. In some examples, the first confidence scores include a confidence score for each sampled segment-level edge 508. In some examples, the edge prediction model 514 is implemented as an example multilayer perception (MLP) based model. However, the edge prediction model 514 can implement another architecture in additional or alternative examples.

Figure 7:
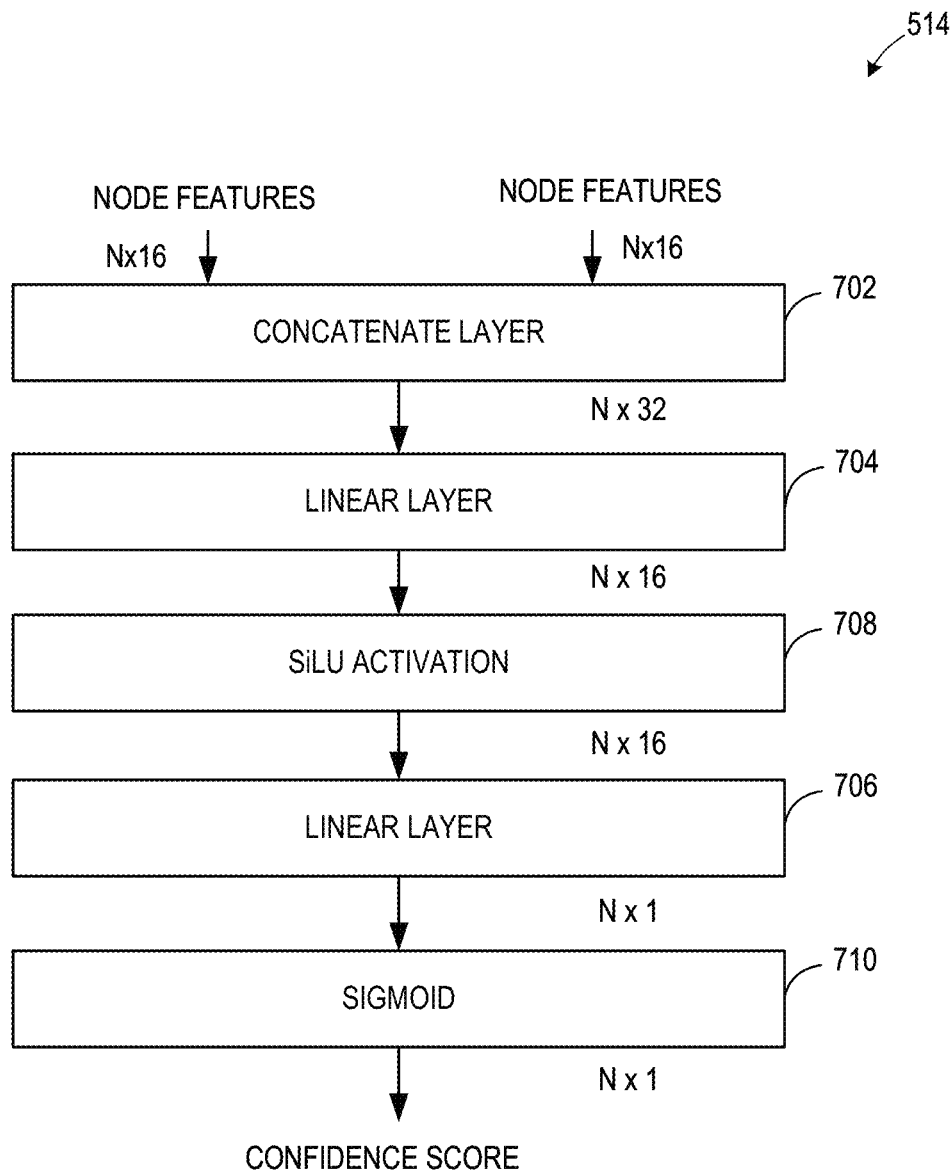
FIG. 7 illustrates an example architecture of an example edge prediction model based on a multilayer perceptron structured in accordance with teachings of this disclosure for determining confidence scores of sampled edges.

FIG. 7 illustrates an architecture of the example edge prediction model 514 structured in accordance with teachings of this disclosure for determining linking confidence scores for sampled edges. The edge prediction model 514 includes an example concatenate layer 702 (e.g., with an output size of 32), which concatenates features of two nodes of a pair of nodes connected by a segment-level edge 508. The edge prediction model 514 also includes two example linear layers (e.g., an example first linear layer 704 and an example second linear layer 706) with an output size of, for example, 16 and 1, respectively. The edge prediction model 514 includes an example SiLU activation layer 708 between the first linear layer 704 and the second linear layer 706. The edge prediction model 514 includes an example sigmoid layer 710 after the second linear layer 706. The sigmoid layer 710 is to apply an example sigmoid function to output logits from the last linear layer 706 to generate the first confidence scores for the sampled segment-level edge 508.

Referring again to FIG. 5, the task solver circuitry 316 is structured to pass each sampled segment-level edge 508 through the edge prediction model 514. In doing so, the task solver circuitry 316 can determine a confidence score for each of the sampled segment-level edges 508. In the example of FIG. 5, the task solver circuitry 316 outputs an example first adjacency matrix of confidence scores. In some examples, the sigmoid layer 710 outputs an example sparse adjacency matrix of confidence scores for the sampled segment-level edges 508, referred to herein as a segment-level adjacency matrix.

The task solver circuitry 316 applies an example post-processing function 516, such as a CC algorithm, to the segment-level adjacency matrix to determine which of the sampled segment-level edges 508 are to be maintained. In doing so, the task solver circuitry 316 of FIG. 5 can group the text segments 504 into example segment clusters 518 (illustrated with different line types). Further, the task solver circuitry 316 utilizes the segment clusters 518 to form example entities 520, illustrated in an example output 522 of the task solver circuitry 316. For example, the task solver circuitry 316 can form the entities 520 by generating a bound (e.g., an entity bounding box) around outer bounds of the text segments 504 defining the entity 520. Thus, the task solver circuitry 316 solves the EB task by building the entities 520, which are formed of text segments 504 grouped into the segment clusters 518.

The entity mapping circuitry 116 transmits the output 522 of the task solver circuitry 316 to the edge generator circuitry 308, which is structured to generate an example entity-level graph (e.g., graph structure) 524 for the receipt 502. For example, the edge generator circuitry 308 generates example entity nodes (e.g., hypernodes, entity hypernodes, etc.) 526 to represent the entities 520 as over the segment-level graph 506. The edge generator circuitry 308 can generate the entity-level graph 524 by sampling example entity-level edges 528 among the entities 520 represented by the hypernodes 526. In some examples, the edge generator circuitry 308 samples the entity-level edges 528 by applying equation (1), above, to pairs of entities 520 in the receipt 502. For a pair of entities (e.g., Entity A and Entity B), for example, the edge generator circuitry 308 determines to create an entity-level edge 528 from Entity A to Entity B if a vertical distance between their centers (C) is less than a height (H) of Entity A multiplied by a constant (K) (2 in this use case). The entity-level edges 528 are utilized by and/or provided to the GNN circuitry 310 to perform the message passing and the task solver circuitry 316 to extract confidence scores for the entity-level edges 528 and solve the EL task.

By generating the entity-level graph 524 over the segment-level graph 506, the edge generator circuitry 308 generates an example multi-level graph 530. In some examples, the edge generator circuitry 308 connects the segment nodes 510 of the segment-level graph 506 to their respective parent hypernodes 526 using a unidirectional relation edge (e.g., relation edge 802 of FIG. 8). In some examples, the feature propagation can be structured to connect the segment-level and entity-level graphs 506, 524 via the relation edges 802.

The feature propagation circuitry 318 obtains or otherwise generates an example feature propagation sub-graph (e.g., a relation graph) 532 of the multi-level graph 530 that includes the segment nodes 510, the hypernodes 526, and the relation edges 802. That is, the relation graph 532 considers only the relation edges 802 as connecting the segment nodes 510 and hypernodes 526. The feature propagation circuitry 318 also obtains the output segment node embeddings 608 (e.g., from the GNN circuitry 310), which are enriched with information from neighbor segments. The feature propagation circuitry 318 applies an example feature propagation model 320 to the relation graph 532 having the output segment node embeddings 608.

Figure 8:
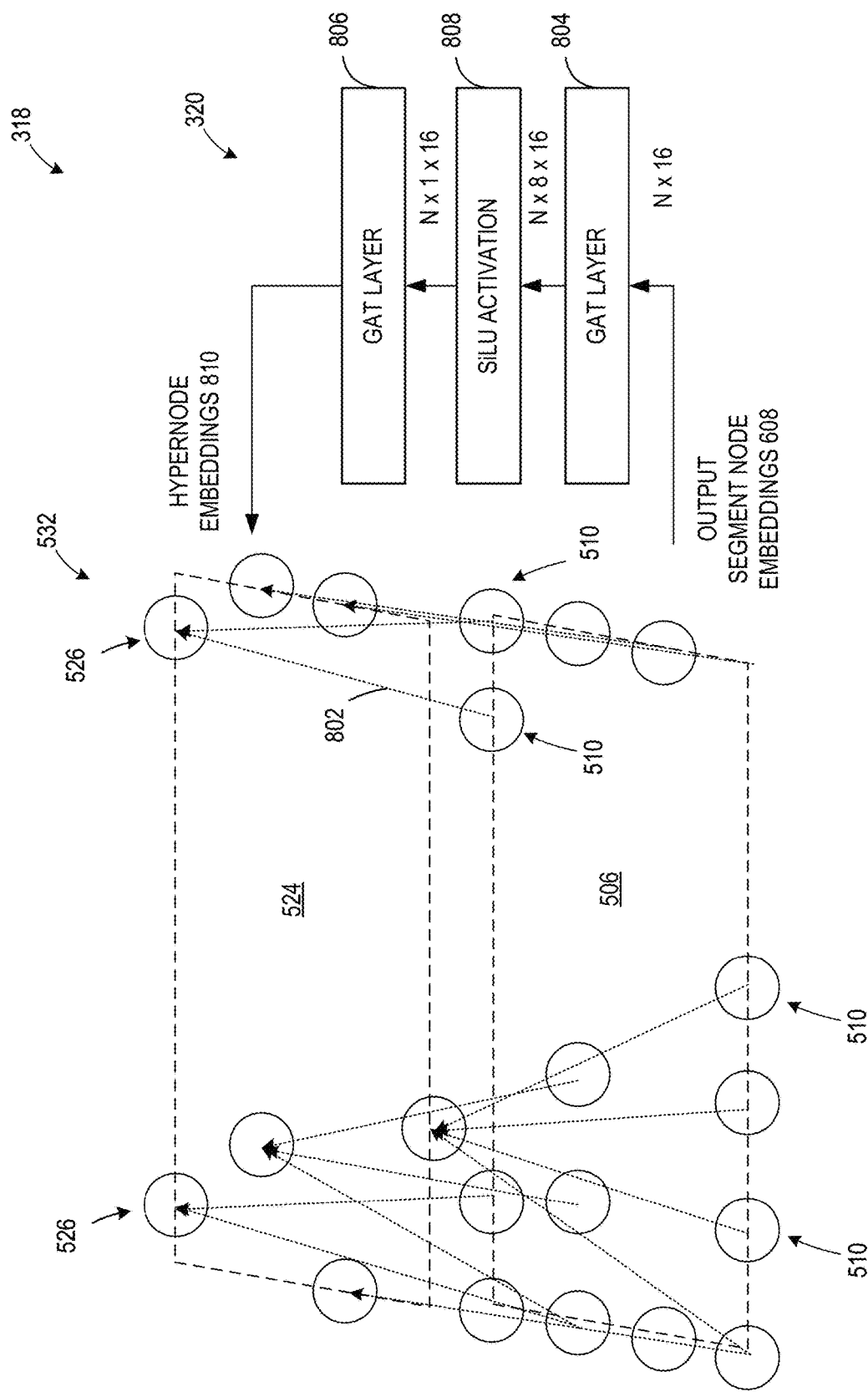
FIG. 8 illustrates an example implementation of example feature propagation model including an example feature propagation model based on a graph attention network constructed in accordance with teachings of this disclosure for propagating features of segment-level nodes to entity-level nodes of a multi-level graph.

FIG. 8 illustrates an example implementation of the feature propagation circuitry 318, including the example feature propagation model 320. As illustrated in FIG. 8, the relation graph 532, which is a sub-graph of the multi-level graph, includes the segment nodes 510 (of the segment-level graph 506), which are unidirectionally connected to their respective parent hypernodes 526 (of the entity level graph 524) via the example relation edges 802. In other words, the segment nodes correspond to a first hierarchical level and are connected unidirectionally to the entity hypernodes, which correspond to a second hierarchical level. This way, the feature propagation model 320 can learn how to combine the segments nodes 510 in an optimal way and to detect key text segments 504 of the entities 520. The segment nodes 510 are associated with the output segment node embeddings 608.

The feature propagation model 320 is a GAN-based model that includes an example first GAT layer 804, an example second GAT layer 806, and an example SiLU activation layer 808 positioned therebetween. The feature propagation model 320 receives as input the output segment node embeddings 608. The feature propagation model 320 does not includes residual connections so that the model can maximize or otherwise expands the information shared by the segment nodes 510. The feature propagation model 320 initializes feature embeddings for the hypernodes 526 with zeros. Thus, features of the segment nodes 510 that come out from the segment model 312 are provided to the hypernodes 526.

The feature propagation circuitry 318 performs feature propagation by applying the feature propagation model 320 to the relation graph 532. At the end, the feature propagation model 320 learns which of the text segments 504 that compose an entity 520 are more important, how to gather information from text segments 504, and how to mix this information to generate entity hypernode features. The feature propagation circuitry 318 outputs example hypernode embeddings 810 for the hypernodes 526, which are input hypernode embeddings 810 for the GNN circuitry 310.

The GNN circuitry 310 obtains the multi-level graph 530 with the sampled entity-level edges 528 (e.g., from the edge generator circuitry 308) and the input hypernode embeddings 810 from the feature propagation circuitry 318. The GNN circuitry 310 generates another feature embedding for a global node by averaging all the input hypernode embeddings 810. The global node is connected bidirectionally to the rest of the nodes 510, 526. The GNN circuitry 310 applies an example entity model 314 to the multi-level graph 530 and the global node. The entity model 314 is used to compute hidden representations of each node in the multi-level graph 530 by attending over its neighbors nodes (e.g., a local aspect) and the global node, which causes the entity model 314 to learn contextualized information in the document from both local and global aspects.

Figure 9:
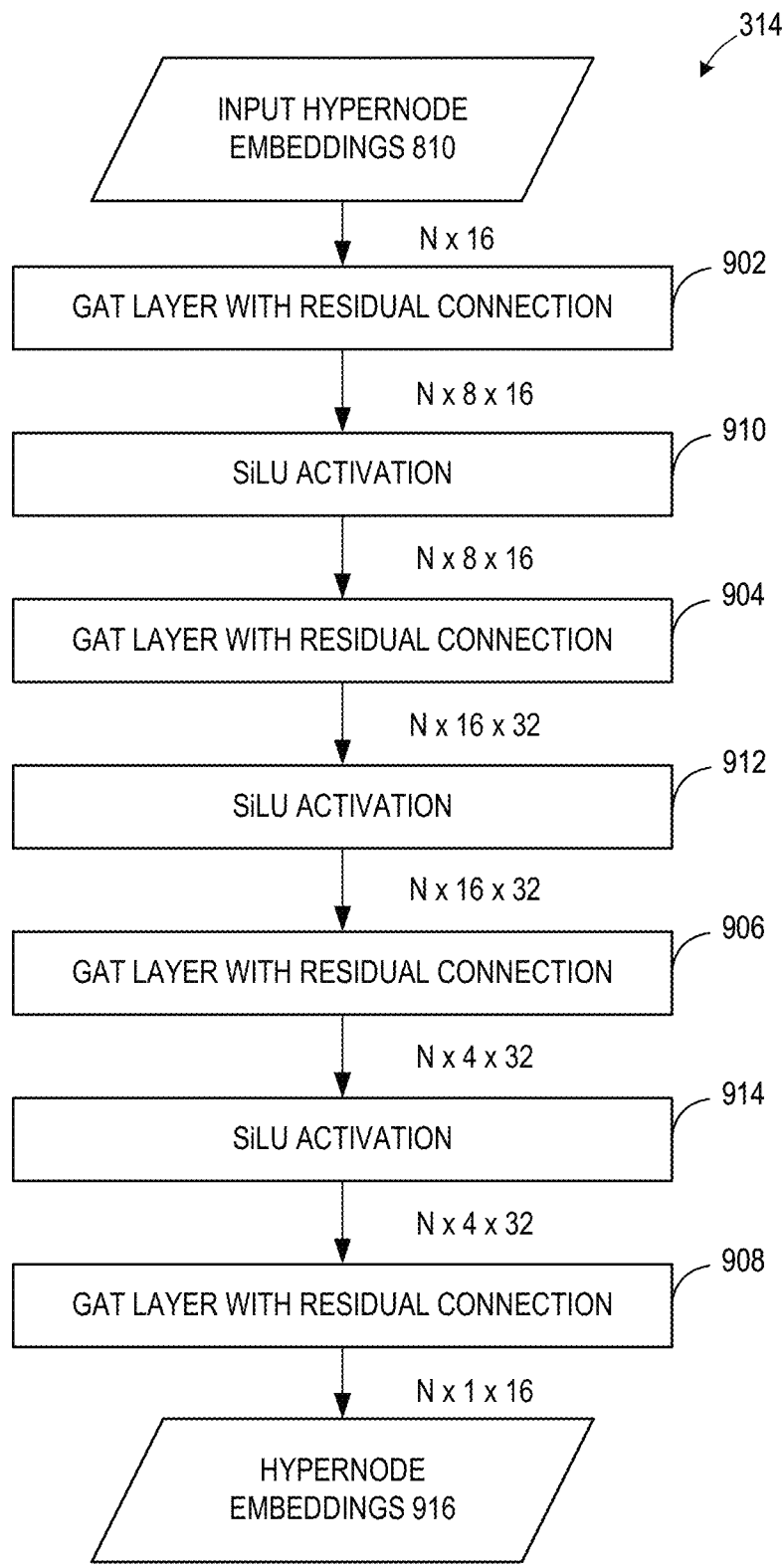
FIG. 9 illustrates another example architecture of an example entity model based on a graph attention network structured in accordance with teachings of this disclosure for augmenting input hypernode features.

FIG. 9 illustrates an architecture of the example entity model 314, which is GAN-based model structured in accordance with teachings of this disclosure for enriching node feature embeddings. As illustrated in FIG. 9, the entity model 314 includes series of stacked layers. In particular, the entity model 314 includes four example graph attention (GAT) layers 902, 904, 906, 908. The first three GAT layers 902, 904, 906 are followed example SiLu activation layers 910, 912, 914. The GAT layers 902, 904, 906, 908 compute the weights for the message passing directly inside each layer using, for example, equations (3)-(6) above.

The multi-level graph 530 and the input hypernode embeddings 810 are provided to the GAT layers 902, 904, 906, 908, which cause the hypernodes 526 to determine contributions of each neighbor affecting features of the hypernodes 526 (e.g., determine weights) in a manner similar to the segment-level graph 506. The last GAT layer 908 generates example output hypernode embeddings 916, which are augmented (e.g., enriched, modified, etc.) versions of the input hypernode embeddings 810. The output hypernode embeddings 916 represent updated features of the hypernodes 526.

Referring again to FIG. 5, the GNN circuitry 310 provides the output hypernode embeddings 916 to the task solver circuitry 316. The task solver circuitry 316 also obtains the multi-level graph 530 from the edge generator circuitry 308 and applies the edge prediction head as implemented by the example edge prediction model 514. The task solver circuitry 316 applies the edge prediction model 514 to generate predictions of the entity-level edges 528 to decide which hypernodes 526 that are connected by an entity-level edge 528 should be finally linked together (e.g., because they belong to the same product). The task solver circuitry 316 passes pairs of the hypernodes 526 that are connected by the entity-level edges 528 through the edge prediction model 514 (e.g., illustrated in FIG. 7). In doing so, the task solver circuitry 316 can determine a confidence score for each of the sampled entity-level edges 528. In the example of FIG. 5, the task solver circuitry 316 outputs an example sparse adjacency matrix of confidence scores for the sampled entity-level edges 528, referred to herein as an entity-level adjacency matrix. In some examples, the confidence scores of the entity-level adjacency matrix represent similarities between pairs of the hypernodes 526. In other words, the entity-level adjacency matrix represents how the hypernodes 526 relate to one another.

The task solver circuitry 316 applies the example post-processing function 516 to the entity-level adjacency matrix (A) to determine which of the sampled entity-level edges 528 are to be maintained. In doing so, the task solver circuitry 316 of FIG. 5 can group the entities 520 into example entity clusters 538 (illustrated with different line types). The post-processing function 516 of FIG. 5 is an example graph clustering method. Further, the task solver circuitry 316 can connect the entities 520 of the entity clusters 538 via example links 540 to form an example output 542 that solves the EL task.

In some examples, the graph clustering method includes two steps: (i) a cluster estimating step and (ii) a node grouping step. The cluster estimating step is based on spectral graph theory. The cluster estimating step includes determining a number or amount of clusters to form based on an example equation (7), below. The cluster estimating step is based on eigenvalues of a normalized graph Laplacian matrix computed from the entity-level adjacency matrix (A).

$$e, \lambda = \text{Eigen}(\text{NormedGraphLaplacian}(A))$$

$$\lambda_s = \text{ascending}_\lambda(\lambda)$$

$$n_c = \arg\max(D_1(\lambda_s)) + 1 \qquad \text{Equation (7)}$$

Thus, the task solver circuitry 316 begins by generating a normed graph Laplacian matrix (L) based on the entity-level adjacency matrix (A) by determining eigenvalues of the graph Laplacian. The eigenvalues of L contain information about the structure of the multi-level graph 530 and thus are telling of relevant parts of the words in the connection space. The task solver circuitry 316 then sorts the eigenvalues (e.g., in ascending order). To determine the number of clusters to form, $n_c$, the task solver circuitry 316 determines first differences (D1) of the sorted eigenvalues and identifies a maximum gap plus one. In some examples, $n_c$ represents how many products are representing in a receipt. For example, if three purchased products are represented in the receipt 502, the cluster estimating step is to output three clusters. In some examples, $n_c$ thus represents an amount of products in the receipt 502.

Based on the number of cluster, $n_c$, the node grouping step includes recursively merging pairs of the entities 520. In some examples, the task solver circuitry 316 merges the entities 520 based on an example linkage criteria, defined by an example equation (8) below. For example, the linkage criteria can be determined based on an average of the distances (e.g., an inverse of adjacency matrix), which can be a highly efficient method.

$$c_i = \text{FeatureAgglomeration}(\text{avg}(1-A), n_c) \qquad \text{Equation (8)}$$

The foregoing graph clustering method is as efficient and accurate as the CC approach. Further, the graph clustering method is beneficial because there is no need for the task solver circuitry 316 to optimize any parameter, avoiding concept drift impact in estimating the number of clusters dynamically for each new data distribution. Further, using the graph clustering method means there is no need to manually generate heuristics.

Figure 11:
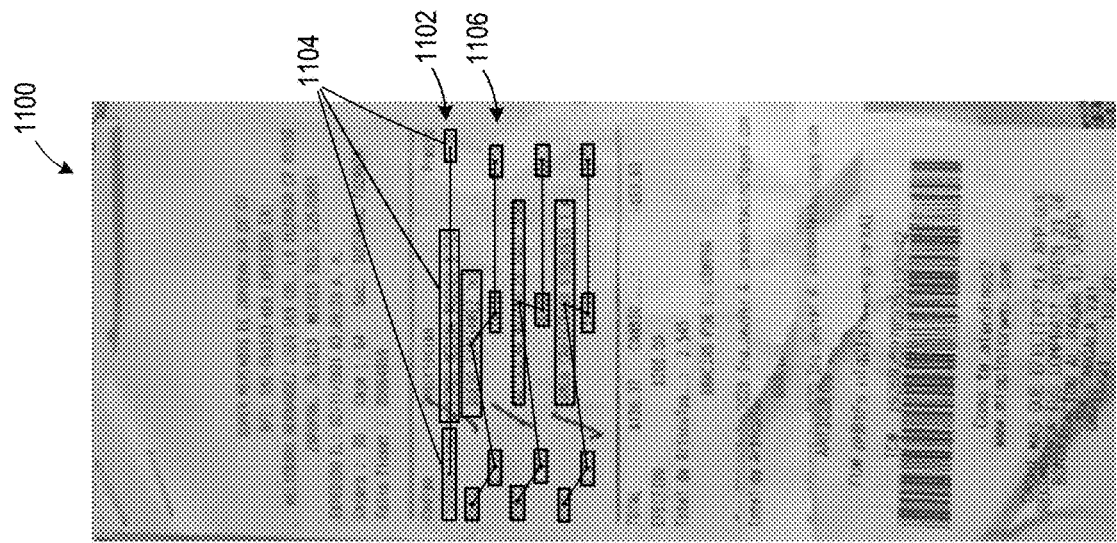
FIG. 11 illustrates another example output of the example entity mapping circuitry of FIGS. 1-9 in accordance with teachings of this disclosure.
Figure 10:
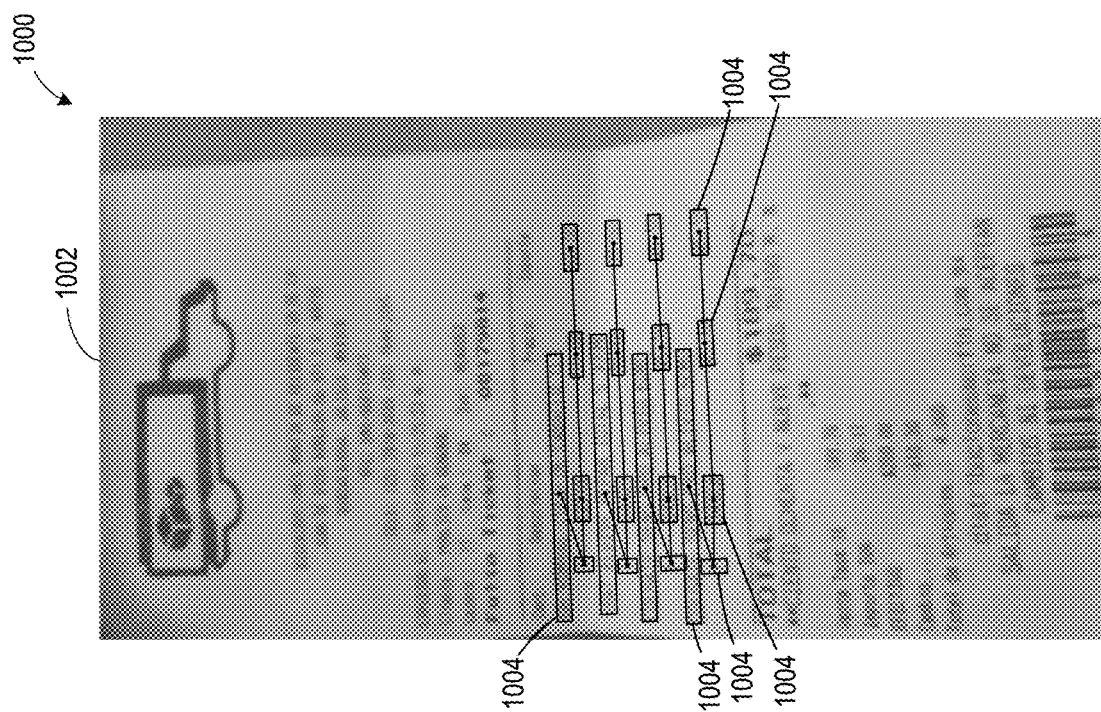
FIG. 10 illustrates an example output of the example entity mapping circuitry of FIGS. 1-9 in accordance with teachings of this disclosure.

FIGS. 10 and 11 illustrate an example outputs of the example entity mapping circuitry 116 of FIGS. 1-9 in accordance with teachings of this disclosure. Specifically, FIG. 10 illustrates a first example output 1000 of the entity mapping circuitry 116 as applied to an example receipt 1002. As illustrated in FIG. 10, the entity mapping circuitry 116 generated example entities 1004 to solve the EB task. The entity mapping circuitry 116 also clustered and linked the example entities 1106 belonging to example product lines 1108. Each of the entities 1106 belongs to a respective line 1108.

While an example manner of implementing the entity mapping circuitry 116 of FIG. 1 is illustrated in FIG. 3, one or more of the elements, processes, and/or devices illustrated in FIG. 3 may be combined, divided, re-arranged, omitted, eliminated, and/or implemented in any other way. Further, the example interface circuitry 302, the example feature extraction circuitry 304, the example encoder circuitry 306, the example edge generator circuitry 308, the example GNN circuitry 310, the example task solver circuitry 316, and/or, more generally, the example entity mapping circuitry 116 may be implemented by hardware alone or by hardware in combination with software and/or firmware. Thus, for example, any of the example interface circuitry 302, the example feature extraction circuitry 304, the example encoder circuitry 306, the example edge generator circuitry 308, the example GNN circuitry 310, the example task solver circuitry 316, and/or, more generally, the example entity mapping circuitry 116, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example entity mapping circuitry 116 of FIG. 1 may include one or more elements, processes, and/or devices in addition to, or instead of, those illustrated in FIG. 3, and/or may include more than one of any or all of the illustrated elements, processes and devices.

Flowcharts representative of example machine readable instructions, which may be executed to configure processor circuitry to implement the example document processor circuitry 102 of FIG. 102 and/or more specifically, the example entity mapping circuitry 116 of FIGS. 1-9, are shown in FIGS. 12-19. The machine readable instructions may be one or more executable programs or portion(s) of an executable program for execution by processor circuitry, such as the processor circuitry 2012 shown in the example processor platform 2000 discussed below in connection with FIG. 20 and/or the example processor circuitry discussed below in connection with FIGS. 21 and/or 22. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 12-19, many other methods of implementing the example entity mapping circuitry 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transmit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 12-19 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 12:
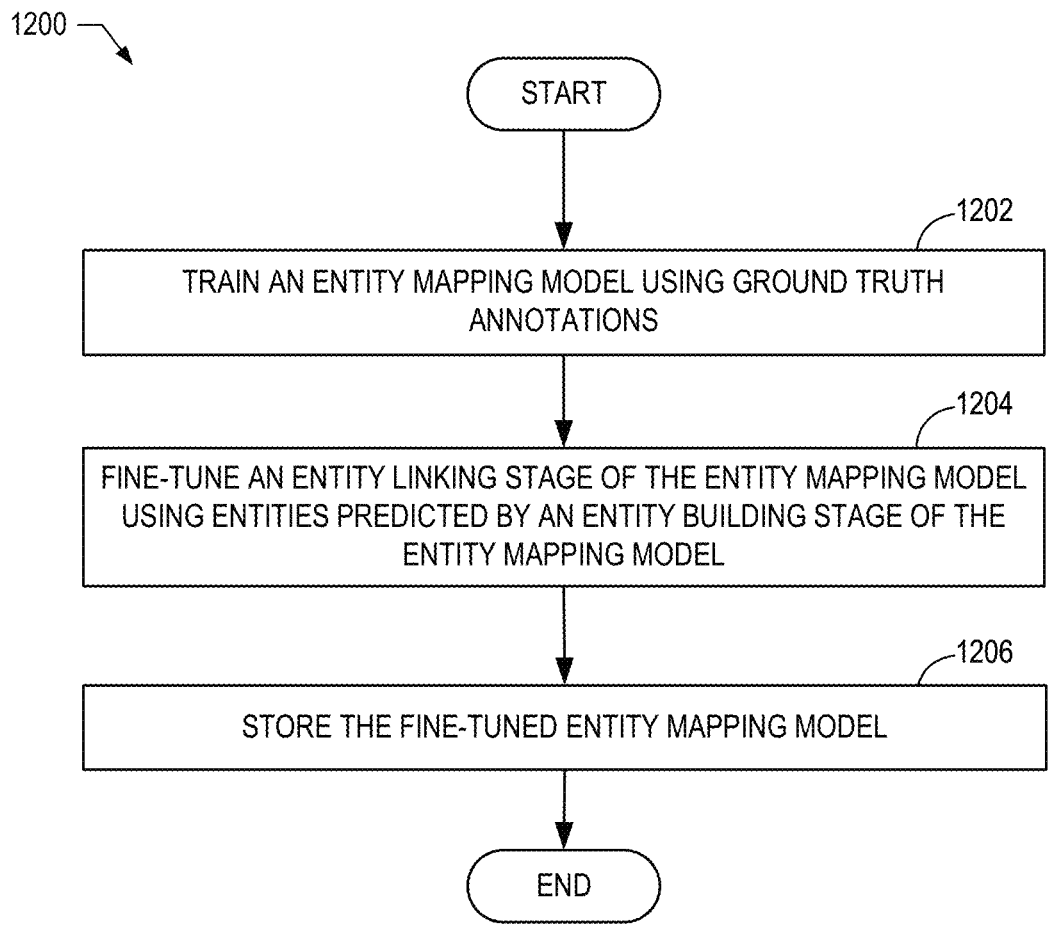
FIGS. 12-19 are flowcharts representative of example machine readable instructions and/or example operations that may be executed by example processor circuitry to implement the document processor circuitry 102 and/or, more generally, the entity mapping circuitry of FIGS. 1-9.

FIG. 12 is a flowchart representative of example machine readable instructions and/or example operations 1200 that may be executed and/or instantiated by processor circuitry to train an example entity mapping model (e.g., as implemented by the example entity mapping circuitry 116 of FIGS. 1-9). The machine readable instructions and/or the operations 1200 of FIG. 12 begin at block 1202, at which the example model trainer circuitry 118 trains an entity mapping model using ground truth annotations. For example, the model trainer circuitry 118 can train an example entity link stage (e.g., a segment model 312) and an example entity linking stage (e.g., an entity model 314) of the entity mapping model using labeled receipts. In some examples, the model trainer circuitry 118 trains an example feature propagation stage (e.g., a feature propagation circuitry 318) of the entity mapping model.

At block 1204, the model trainer circuitry 118 fine-tunes the entity model 314 (e.g., the EL task) using predictions from the segment model 312 (e.g., the EB task) entity. For example, the model trainer circuitry 118 can execute the trained segment model 312 of the entity mapping model and fine-tune the trained entity model 314 using an output of the trained segment model 312.

At block 1206, the model trainer circuitry 118 stores the fine-tune entity mapping model. For example, the model trainer circuitry 118 can store the entity mapping model in the entity mapping circuitry 116 and/or in example model storage circuitry 112.

Figure 13:
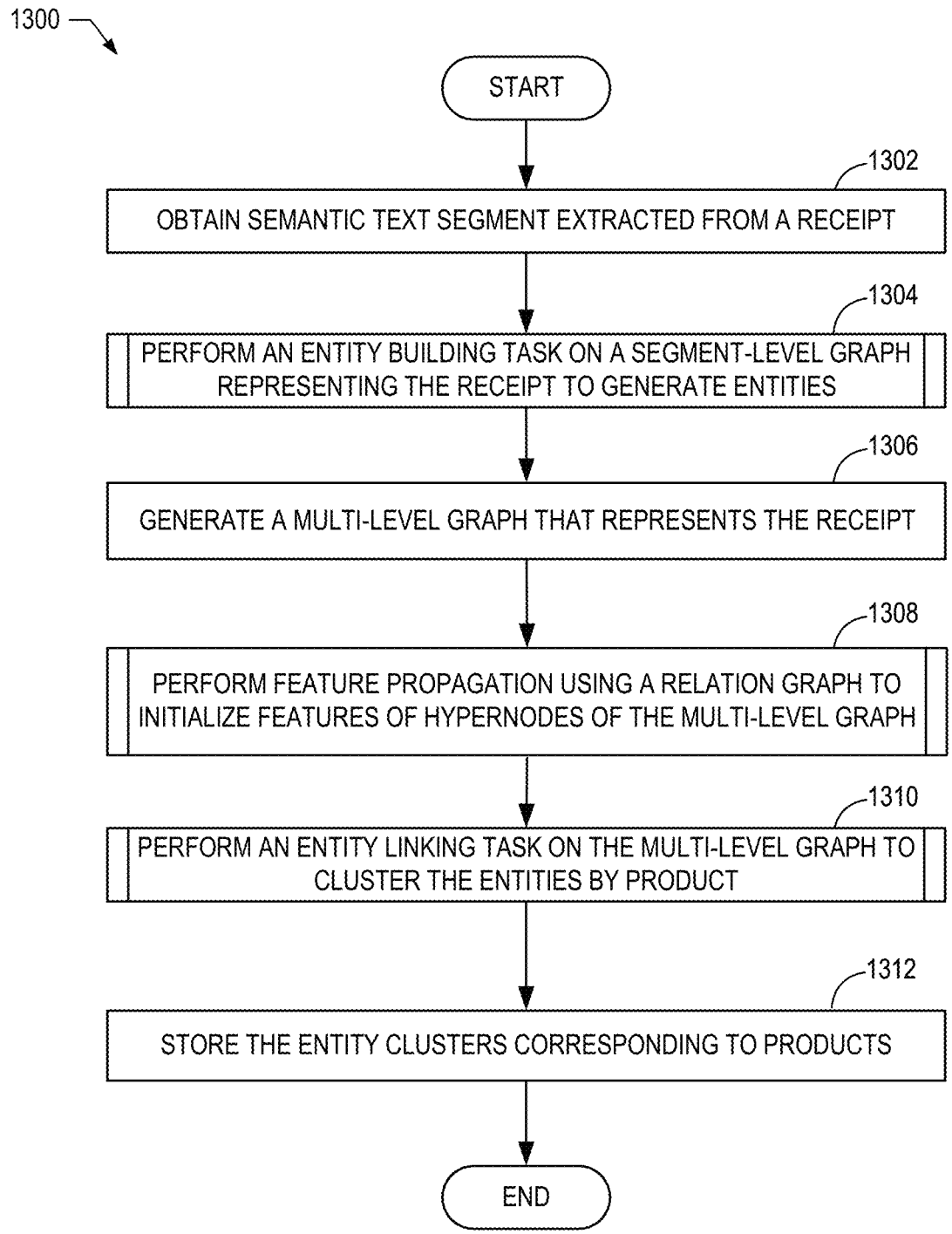

FIG. 13 is a flowchart representative of example machine readable instructions and/or example operations 1300 that may be executed and/or instantiated by processor circuitry to determine related content in an image of a purchase document, such as a receipt. In some examples, the machine readable instructions and/or example operations 1300 implement an example entity mapping task and/or an example entity mapping model. An input receipt is first processed in a previous stage by example pre-processor circuitry 110 to detect and generate text segments (e.g., via example OCR circuitry 114 of FIG. 1) and to categorize the text segments (e.g., via a segment tagging). A resultant list of semantic text segments is provided to example entity mapping circuitry 116.

The machine readable instructions and/or the operations 1300 of FIG. 13 begin at block 1302, at which the example entity mapping circuitry 116 obtains the list of semantic text segments extracted from the receipt (e.g., via the example interface circuitry 302). Each of the semantic text segments is represented by a bounding box, a text string, and an entity category.

At block 1304, the entity mapping circuitry 116 performs an entity building task on a segment-level graph representing the receipt to generate (e.g., build) entities. For example, the entity mapping circuitry 116 applies a segment-level graph in which the text segments are represented by segment nodes and connected by sampled segment-level edges. During the entity building task, the entity mapping circuitry 116 groups together text segments (e.g., words) that belong to a same entity (e.g., product description, code, price, etc.) for a same product. For example, one or more text segments can correspond to a first product description for a first product.

The entity building task includes grouping together those text segments to form a first product description entity for the first product. Using the segment-level graph, the entity mapping circuitry 116 forms text segment clusters to build the entities, which are to be represented as hypernodes in a multi-level graph.

At block 1306, the entity mapping circuitry 116 builds a multi-level graph that includes the segment-level graph. For example, the entity mapping circuitry 116 can build an entity-level graph over the segment-level graph by building entity nodes as hypernodes over the segment nodes of the segment-level graph. To form a structure of the entity-level graph, example edge generator circuitry 308 can sample entity-level edges among the hypernodes using a novel edge sampling algorithm. For example, the edge generator circuitry 308 can identify a pair of entities, and identify an edge between the entities of the pair if a vertical distance between their centers (C) is less than a height (H) of a first entity of the pair multiplied by a constant (K) (e.g., 2). If the foregoing is not true, no edge is generated. Thus, the entity-level graph includes hypernodes corresponding to the entities and the sampled entity-level edges among the entities, and the multi-level graph can include the segment-level graph and the entity-level graph.

At block 1308, the entity mapping circuitry 116 performs feature propagation using a relation graph to initialize features of hypernodes of the multi-level graph. Rather than continuing to work with the segment-level graph at the word level, the entity mapping circuitry 116 generates generators or otherwise obtains the relation graph by connecting the segment nodes (e.g., base nodes) to their respective hypernodes using unidirectional relation edges (e.g., from segment nodes to hypernodes). The relation edges connecting the segment nodes and the entity nodes together form the relation graph. The entity mapping circuitry 116 performs feature propagation using an example GAN-based model that operates on the relation graph to generate input entity node embeddings.

At block 1310, the entity mapping circuitry 116 performs an entity linking task on the multi-level graph to cluster the entities by product. During the entity linking task, the entity mapping circuitry 116 groups together entities (e.g., grouped text segments) that belong to the same product. For example, one or more text entities can correspond to a first product. The entity linking task includes grouping together those entities to form the first product.

At block 1312, the entity mapping circuitry 116 stores the entity clusters corresponding to products. For example, the entity mapping circuitry 116 can store the grouped entity clusters in the example purchase data datastore 106. In some examples, the entity mapping circuitry 116 transmits the grouped entity clusters to downstream components for further processing.

Figure 14:
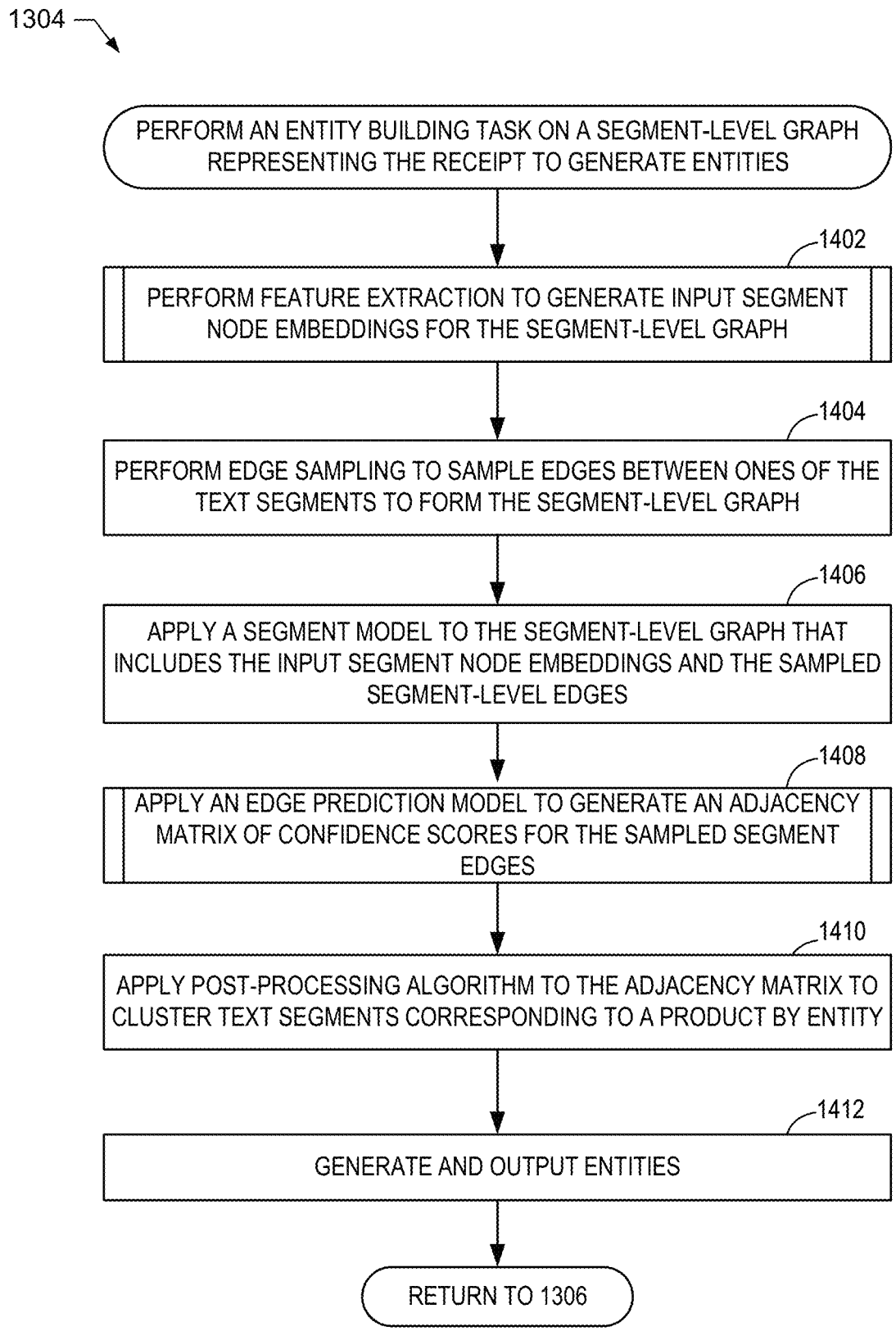

FIG. 14 is a flowchart representative of example machine readable instructions and/or example operations 1304 that may be executed and/or instantiated by processor circuitry to perform the entity building task on the segment-level graph representing the receipt to generate the entities. The machine readable instructions and/or the operations 1304 of FIG. 14 begin at block 1402, at which the example feature extraction circuitry 304 performs feature extraction to generate segment node embeddings for the segment-level graph. For example, the feature extraction circuitry 304 can extract features from the semantic text segments and convert the extracted features into input segment node embeddings (described further in relation to FIG. 15).

At block 1404, the example edge generator circuitry 308 performs edge sampling to sample segment-level edges between ones of the text segments to form the segment-level graph. For example, the edge generator circuitry 308 can identify a pair of text segments, and identify a segment-level edge between the text segments of the pair if a vertical distance between their centers (C) is less than a height (H) of a first text segment of the pair multiplied by a constant (K) (e.g., 2). If the foregoing is not true, no segment-level edge is generated. Thus, the segment-level graph includes the segment nodes corresponding to the text segments, which are represented by the input segment node embeddings, and the sampled segment-level edges among the text segments.

At block 1406, the example GNN circuitry 310 applies an example segment model 312 to the segment-level graph that includes the segment node embeddings and the sampled segment-level edges. For example, the example GNN circuitry 310 applies the segment model 312, which is a GAN-based model that includes a series of GAT layers, to enrich the segment features with information from neighbor text segments. In some examples, the GNN circuitry 310 generates an example global node (e.g., by averaging the input segment node embeddings) to provide a global perspective. In some examples, the GNN circuitry 310 adds self-loops to reduce error (e.g., to avoid 0-in-degree errors while using GAT layers). For example, the GNN circuitry 310 can add a self-loop for each segment node, which means adding another edge that connects the segment node with itself. In some examples, the GNN circuitry 310 inputs the input segment node embeddings, the global node, the self-loops, and the segment-level graph to the segment model 312, which performs message passing of weights, and outputs enriched (e.g., output) segment node embeddings. In some examples, the GNN circuitry 310 discards the global node.

At block 1408, the example task solver circuitry 316 applies an edge prediction model 514 to the output segment node features to generate an example entity-level adjacency matrix of confidence scores for the sampled segment-level edges. For example, the edge prediction model 514 can be an MLP based model having a series of liner layers designed to extract confidence values of the sampled segment-level edges (described further in relation to FIG. 16). Further, the task solver circuitry 316 can structure the output confidence scores into the adjacency matrix.

At block 1410, the task solver circuitry 316 applies a post-processing algorithm to the adjacency matrix to cluster the text segments corresponding by entity. For example, the task solver circuitry 316 can apply a connected components algorithm to the segment-level adjacency matrix to cluster the text segments. In some examples, the task solver circuitry 316 can apply a graph clustering method (e.g., described in relation to FIG. 19) to the segment-level adjacency matrix to generate the text segment clusters.

At block 1412, the task solver circuitry 316 generates and outputs the example entities. For example, the task solver circuitry 316 can generate the entities by forming entity bounding boxes around the text segments of a cluster. For example, the task solver circuitry 316 can generate coordinates for the entity bounding boxes by enclosing the text segment bounding boxes clustered to form the entity. In other words, the task solver circuitry 316 can determine the bounds of the entity bounding boxes by determining the outermost bounds of the segment bounding boxes forming the entity. The task solver circuitry 316 can output the entities to another component (e.g., for storage and/or for a downstream task, etc.).

Figure 15:
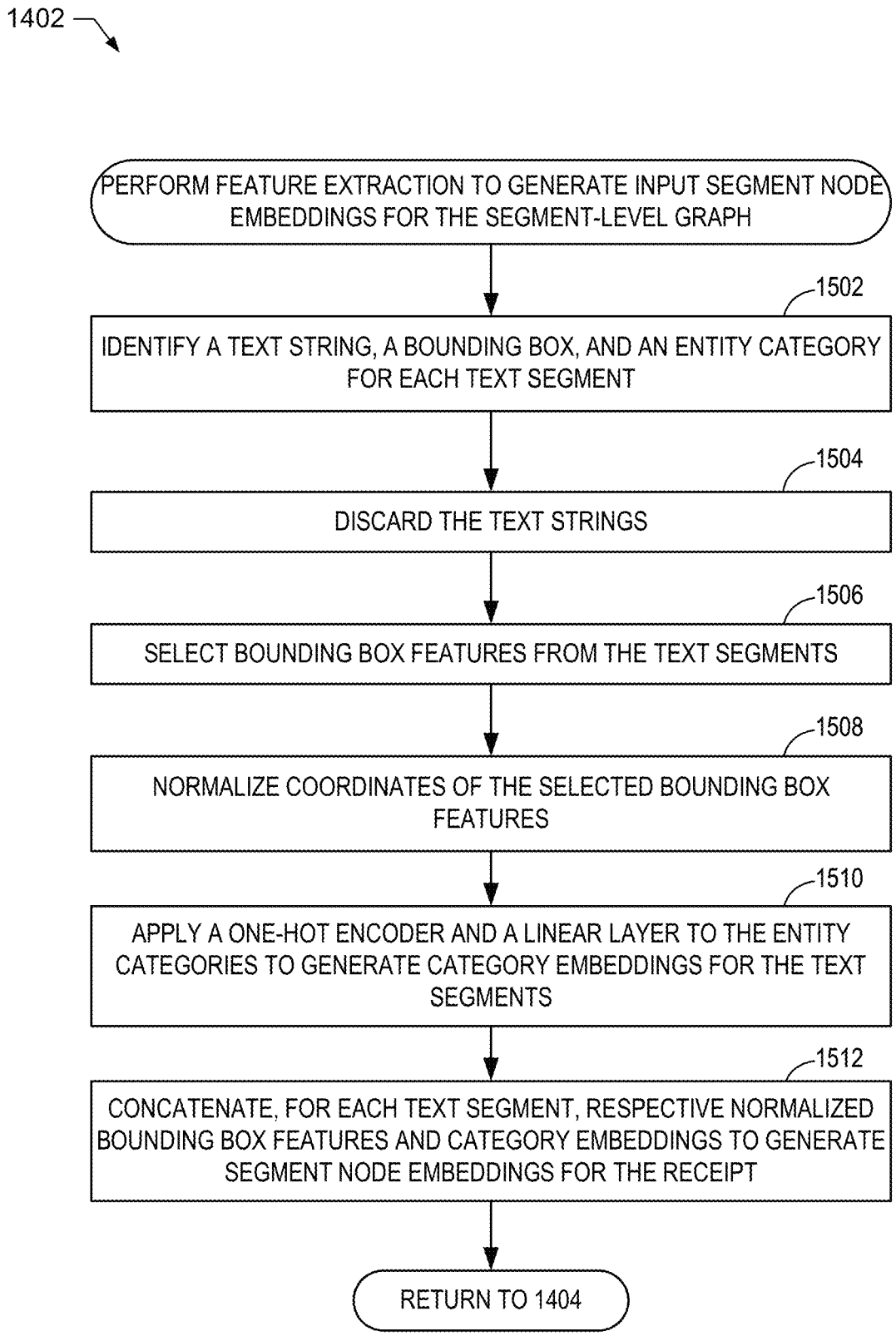

FIG. 15 is a flowchart representative of example machine readable instructions and/or example operations 1402 that may be executed and/or instantiated by processor circuitry to perform feature extraction to generate segment node embeddings for the segment-level graph. The machine readable instructions and/or the operations 1402 of FIG. 15 begin at block 1502, at which the example feature extraction circuitry 304 identifies a text string, a bounding box, and an entity category for each semantic text segment.

At block 1504, the feature extraction circuitry 304 discards the text strings. For example, the feature extraction circuitry 304 identifies the text strings in the list of semantic text segments and removes the strings from the list.

At block 1506, the feature extraction circuitry 304 selects bounding box features from the text segments. For example, the feature extraction circuitry 304 can extract, from each text segment, a left center coordinate, a right center coordinate, and a rotation of the bounding box (e.g., the rotation angle).

At block 1508, the feature extraction circuitry 304 normalizes the coordinates of the selected bounding box features. For example, the feature extraction circuitry 304 can normalize the left and right center coordinates extracted from the bounding boxes relative to a width of the document. In some examples, the width is utilized because it is a more stable dimension than a length for unstructured documents such as receipts.

At block 1510, example encoder circuitry 306 applies a one-hot encoder and a linear layer to the entity categories to generate category embeddings for the text segments. For example, the encoder circuitry 306 can employ an example one-hot encoder 430 (e.g., to extract the features), followed by an example linear layer 432 to adapt the features and map them to an embedding of, for example, length 8. Thus, the encoder circuitry 306 can take an entity category of a text segment and convert it to a binarized vector representing the category of the text segment. Doing so provides a numeric representation of the entity category that is usable by an AI model At block 1512, the feature extraction circuitry 304 concatenates, for each text segment, respective normalized bounding box features and category embeddings to generate segment node embeddings for the receipt. In particular, the feature extraction circuitry 304 concatenates, for each of the text segments, a normalized left center coordinate (2 floats), a normalized right center coordinate (2 floats), and a rotation angle (1 float) from a bounding box and a respective category embedding (8 floats) from the text segment to generate the segment node embedding having a total embedding size of 13 floats. Thus, the feature extraction circuitry 304 converts the text segments into arrays of numbers that represent the text segments. Control then advances to block 1404 of FIG. 14 at which the GNN circuitry 310 enriches the segment node embeddings with information from their neighbor nodes to generate the output segment node features.

Figure 16:
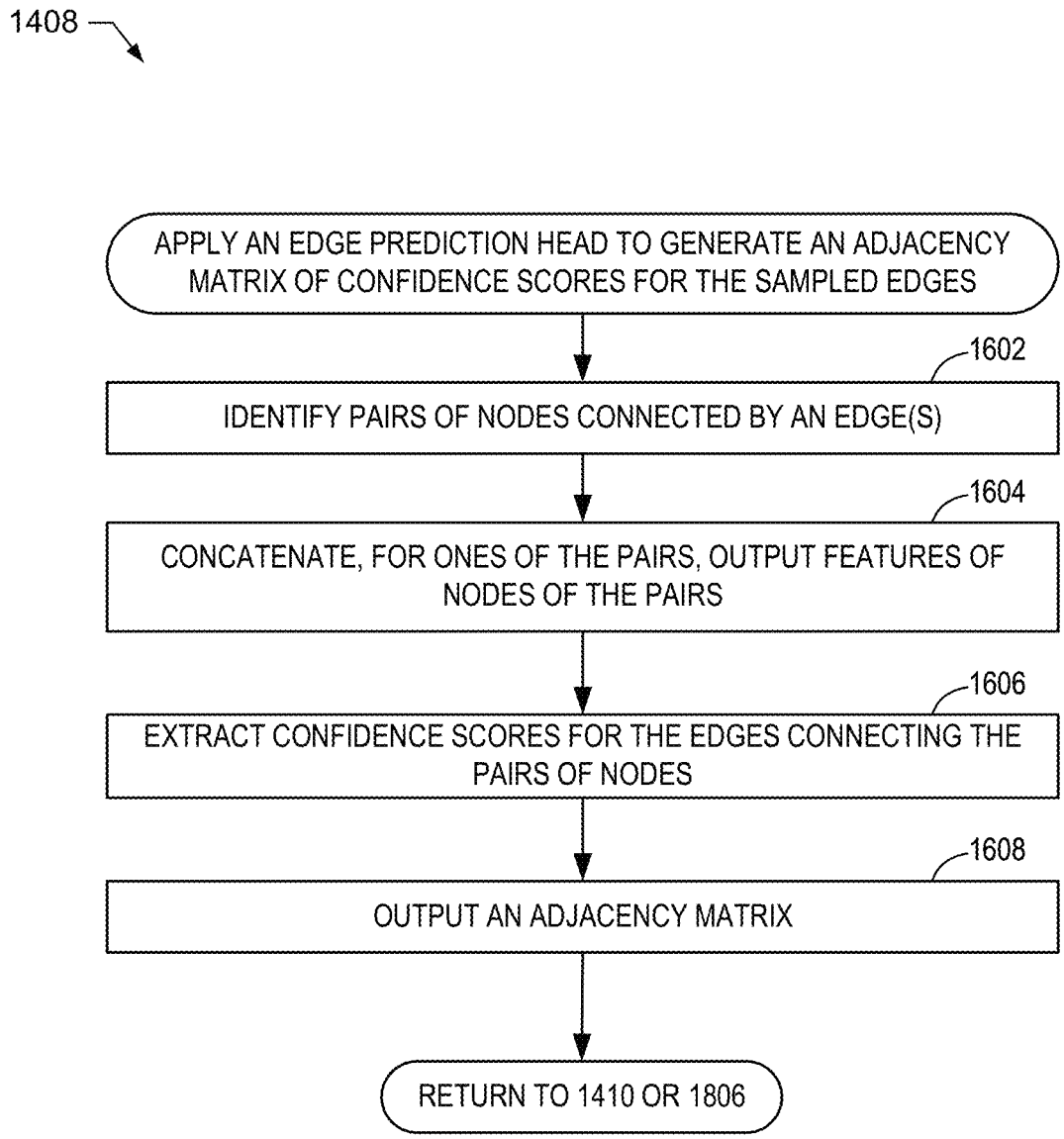

FIG. 16 is a flowchart representative of example machine readable instructions and/or example operations 1408 that may be executed and/or instantiated by processor circuitry to apply the edge prediction model 514 to (a) the output segment node features to generate the segment-level adjacency matrix of confidence scores for the sampled segment-level edges and/or (b) output hypernode features to generate an example entity-level adjacency matrix of confidence scores for the sampled entity-level edges. The machine readable instructions and/or the operations 1408 of FIG. 16 begin at block 1602, at which the task solver circuitry 316 identifies a pair of nodes connected by an edge. For example, during the EB task, the nodes can be segment nodes of the segment-level graph and the edges can be segment-level edges linking the segment nodes. Similarly, during the EL task, the nodes can be hypernodes of the multi-level graph and the edges can be entity-level edges linking the hypernodes.

At block 1604, the task solver circuitry 316 concatenates respective output features of the nodes. For example, the task solver circuitry 316 can identify the enriched node features for the text segments as generated by the GNN circuitry 310 and concatenate the enriched node features. For example, during the EB task, the task solver circuitry 316 can identify the enriched segment node embeddings for the respective segment nodes as generated by the GNN circuitry 310 and concatenate the enriched segment node embeddings. Similarly, during the EL task, the task solver circuitry 316 can identify the enriched hypernode embeddings for the respective hypernodes as generated by the GNN circuitry 310 and concatenate the enriched hypernode embeddings.

At block 1606, the task solver circuitry 316 extracts an example confidence score for the edge connecting the nodes. For example, during the EB task, the task solver circuitry 316 can pass the concatenated segment node embeddings through the edge prediction model 514, which includes two linear layers, a SiLU activation layer therebetween, and a sigmoid function. The edge prediction model 514 can output first confidence scores for the segment-level edges based on the sigmoid function. Similarly, during the EL task, the task solver circuitry 316 can pass the concatenated hypernode embeddings through the edge prediction model 514, can output second confidence scores for the entity-level edges based on the sigmoid function.

At block 1608, the task solver circuitry 316 outputs an adjacency matrix. For example, the task solver circuitry 316 outputs the segment-level adjacency matrix during the EB task and the entity-level adjacency matrix during the EL task. Control then advances to block 1410 of FIG. 14 (e.g., during the EB task) or to block 1806 of FIG. 18 (e.g., during the EL task).

Figure 17:
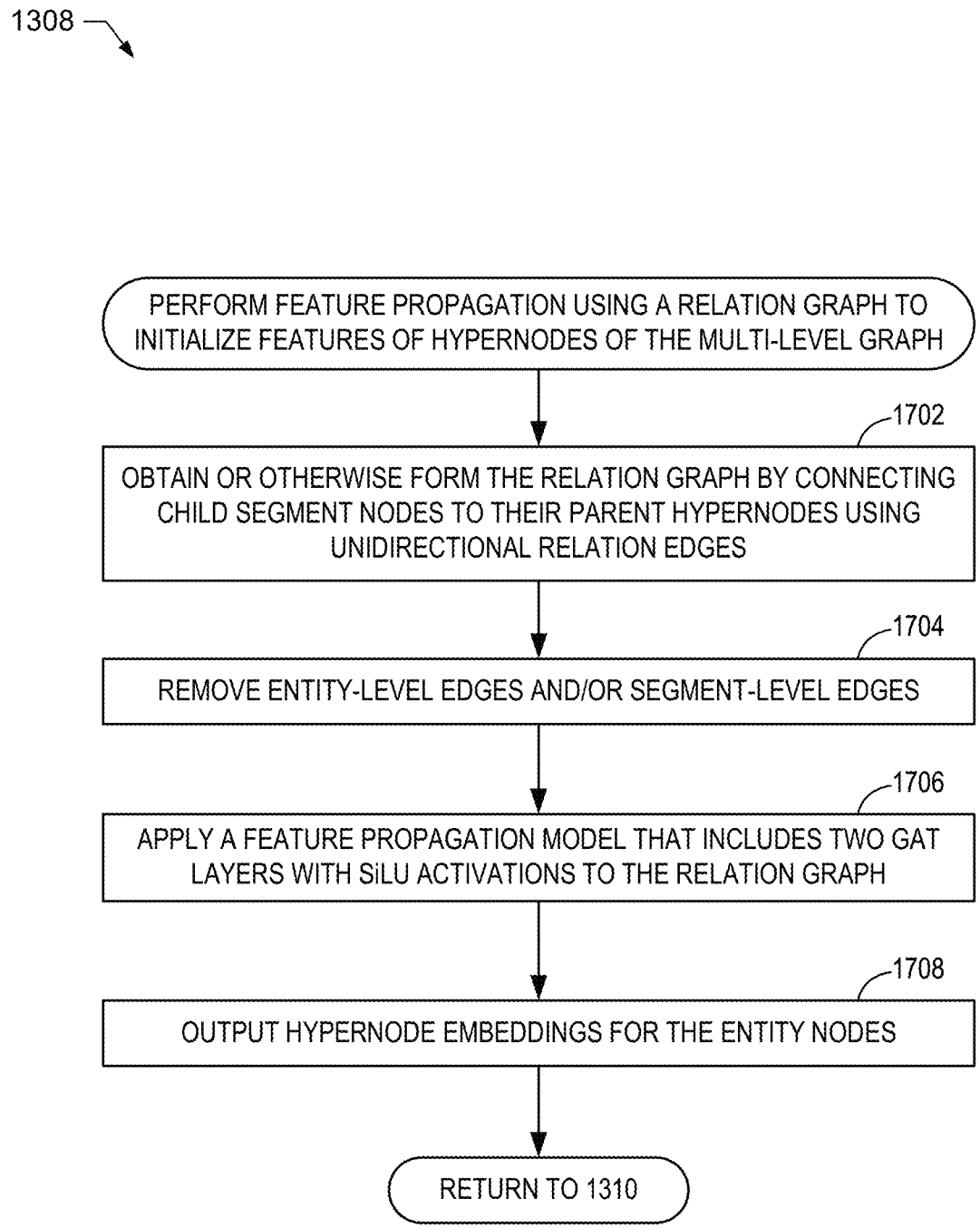

FIG. 17 is a flowchart representative of example machine readable instructions and/or example operations 1308 that may be executed and/or instantiated by processor circuitry to initialize features of entity nodes of a multi-level graph representing the receipt. The machine readable instructions and/or the operations 1308 of FIG. 17 begin at block 1702, at which the example feature propagation circuitry 318 obtains or otherwise forms the relation graph by connecting child segment nodes to their respective parent hypernodes using unidirectional relation edges. That is, the feature propagation circuitry 318 can connect each of the segment nodes to their respective parent hypernodes using the relation edges that are directed from the segment nodes to the hypernodes.

At block 1704, the feature propagation circuitry 318 removes entity-level edges and/or segment level edges. For example, if the feature propagation circuitry 318 operates on the multi-level graph, the feature propagation circuitry 318 can remove the entity-level edges and/or segment level edges such that the segment nodes and hypernodes are only connected to one another via the relation edges. Further, the segment nodes include the output segment nodes embeddings, so they already include information about their neighbor segments.

At block 1706, the feature propagation circuitry 318 applies an example feature propagation model 320 that includes two GAT layers with SiLU activation therebetween to the relation graph. Thus, the information learnt by the segments nodes during the message passing of the segment-level graph is used to generate optimal or otherwise advantageous features for the hypernodes. In some examples, the feature propagation model 320 defines connections between two or more stages of the entity mapping model and how features of the hypernodes are generated. In this manner, the example entity mapping model disclosed herein can learn how to combine the text segments in an advantageous way and to detect key segments of the entities.

At block 1708, the feature propagation circuitry 318 outputs hypernode embeddings for entity nodes representing the entities. The hypernode embeddings includes propagated information from the output segment node feature embeddings, which helps prevent a loss of information that will impact the EL accuracy.

Figure 18:
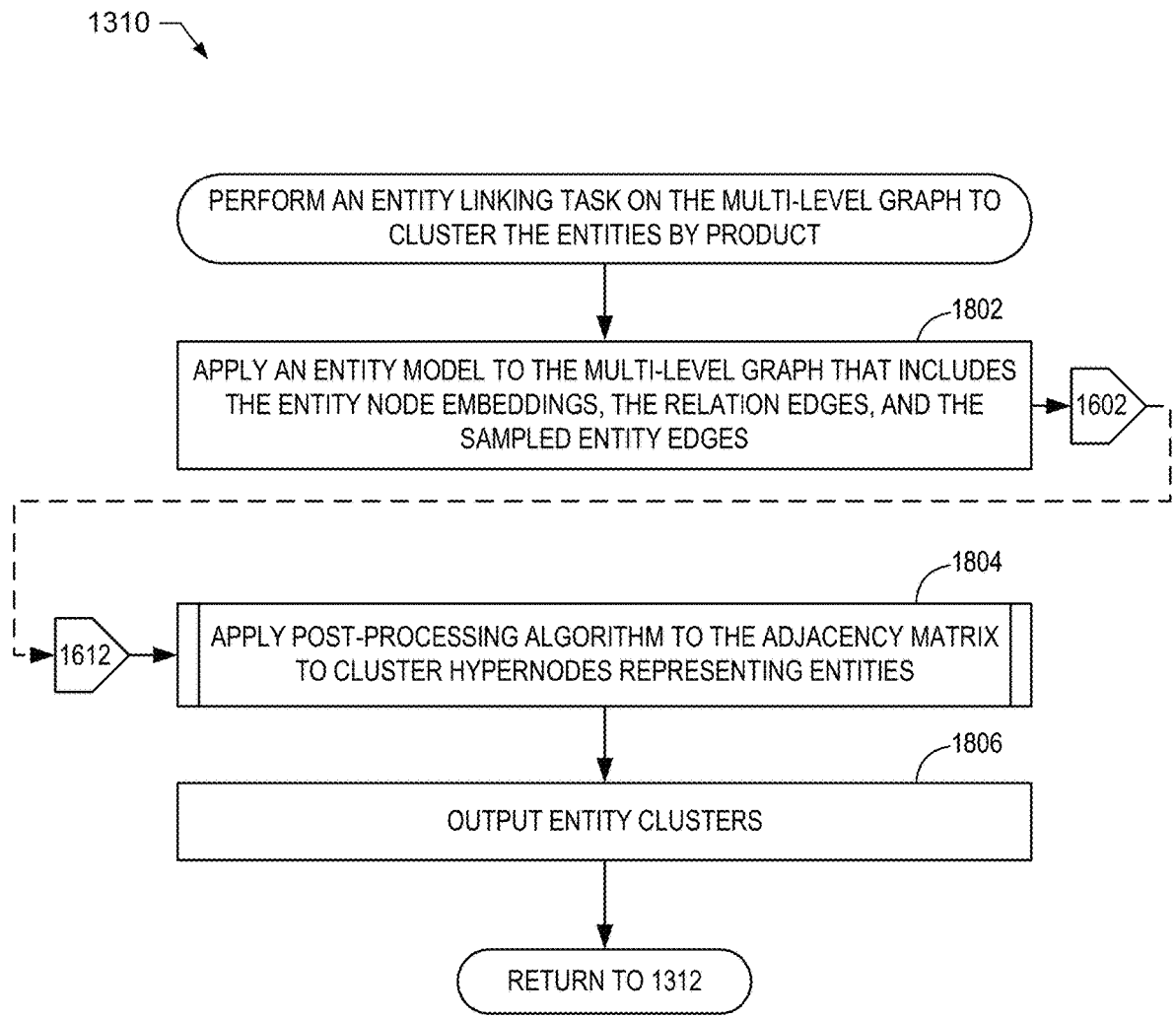

FIG. 18 is a flowchart representative of example machine readable instructions and/or example operations 1308 that may be executed and/or instantiated by processor circuitry to perform the entity linking task on the multi-level graph to cluster the entities by product. The machine readable instructions and/or the operations 1308 of FIG. 18 begin at block 1802, at which the GNN circuitry 310 applies an example entity model 314 to the multi-level graph that includes the hypernode embeddings, the sampled entity-level edges, the relation edges, and the segment-level graph. For example, the example GNN circuitry 310 applies the entity model 314, which is a GAN-based model that includes a series of GAT layers, to enrich the entity features with information from neighbor entities. In some examples, the GNN circuitry 310 generates an example global node (e.g., by averaging the input hypernode embeddings) to provide a global perspective. In some examples, the GNN circuitry 310 adds self-loops to reduce error (e.g., to avoid 0-in-degree errors while using GAT layers). For example, the GNN circuitry 310 can add a self-loop for each hypernode, which means adding another edge that connects the hypernode with itself. In some examples, the GNN circuitry 310 inputs the input hypernode embeddings, the global node, the self-loops, and the multi-level graph to the entity model 314, which performs message passing of weights, and outputs enriched (e.g., output) hypernode embeddings. In some examples, the GNN circuitry 310 discards the global node. Control then advances to block 1602 of FIG. 16, which outputs an example entity-level adjacency matrix of confidence scores for the entity-level edges.

At block 1804, the task solver circuitry 316 applies a post-processing algorithm to an entity-level adjacency matrix to cluster the hypernodes representing the entities. For example, the task solver circuitry 316 can apply a graph spectral method to the adjacency matrix, which determines a number of clusters to form and forms the clusters.

At block 1806, the task solver circuitry 316 outputs the entity clusters. In some examples, the entity clusters represent products. In some examples, the entity clusters represent product lines of a receipt. Control then returns to block 1312 of FIG. 13.

Figure 19:
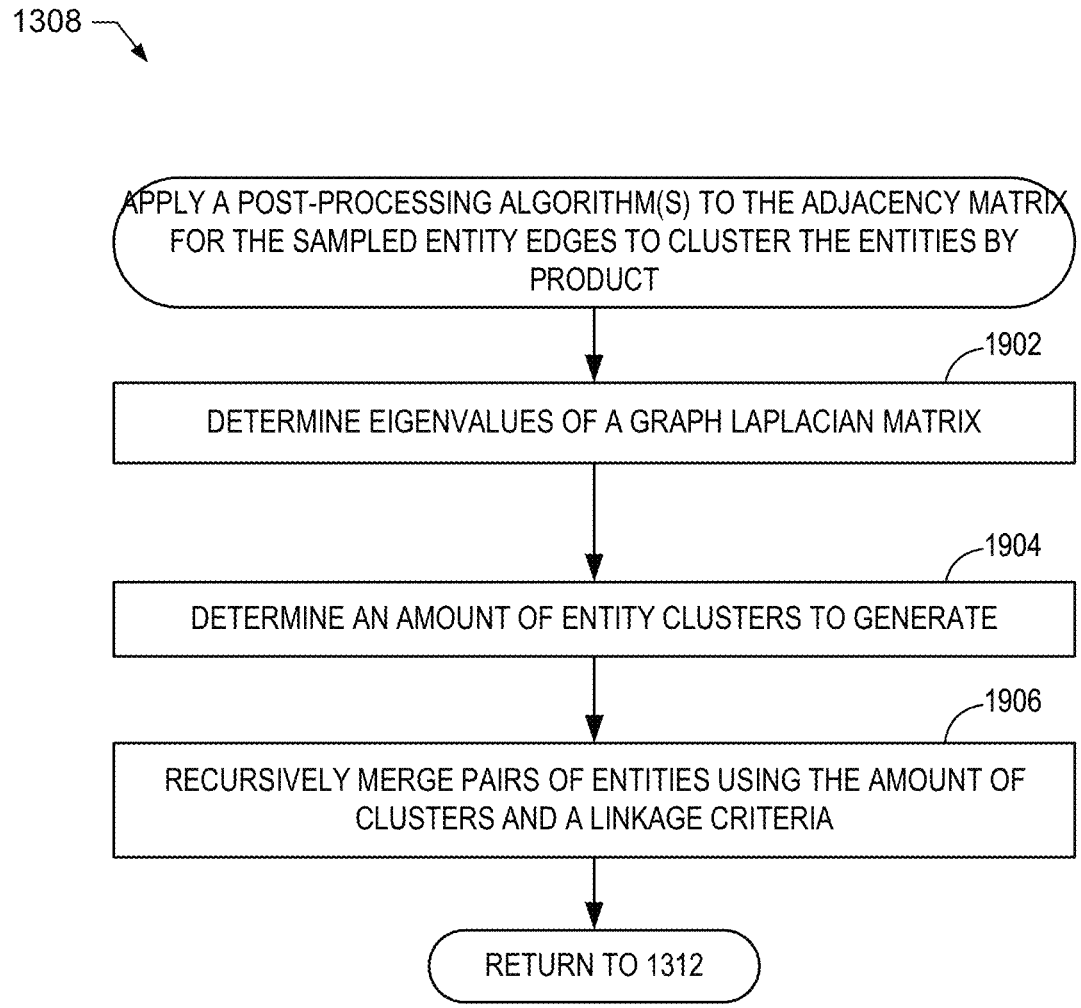

FIG. 19 is a flowchart representative of example machine readable instructions and/or example operations 1806 that may be executed and/or instantiated by processor circuitry to apply the post-processing algorithm to the entity-level adjacency matrix to cluster the hypernodes representing the entities. The machine readable instructions and/or the operations 1804 of FIG. 19 begin at block 1902, at which the example task solver circuitry 316 determines eigenvalues of a normed graph Laplacian matrix. For example, the task solver circuitry 316 can generate the normed graph Laplacian matrix based on the adjacent matrix.

At block 1904, the task solver circuitry 316 determines an amount of entity clusters to generate. For example, the task solver circuitry 316 can sort the eigenvalues (e.g., in ascending order), identify a maximum gap between the eigenvalues, and add one to the maximum gap. In some examples, the number of clusters representing a number of products in the receipt.

At block 1906, the task solver circuitry 316 recursively merges pairs of entities using the amount of clusters and a linkage criteria. For example, the task solver circuitry 316 can recursively determine whether to link a given entity with another entity and/or a cluster of entities. In some examples, the linkage criteria is based on an average of the distances between the eigenvalues (e.g., an inverse of the adjacency matrix). In some examples, the task solver circuitry 316 can use the number of clusters and the linkage criteria to output the entities as clustered into the number of clusters representing the number of products in the receipt.

FIG. 20 is a block diagram of an example processor platform 2000 structured to execute and/or instantiate the machine readable instructions and/or the operations of FIGS. 12-19 to implement the document processor circuitry 102 of FIGS. 1-2 and/or, more specifically, the entity mapping circuitry 116 of FIGS. 1-9. The processor platform 2000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a Blu-ray player, a gaming console, a set top box, a headset (e.g., an augmented reality (AR) headset, a virtual reality (VR) headset, etc.) or other wearable device, or any other type of computing device.

The processor platform 2000 of the illustrated example includes processor circuitry 2012. The processor circuitry 2012 of the illustrated example is hardware. For example, the processor circuitry 2012 can be implemented by one or more integrated circuits, logic circuits, FPGAs, microprocessors, CPUs, GPUs, DSPs, and/or microcontrollers from any desired family or manufacturer. The processor circuitry 2012 may be implemented by one or more semiconductor based (e.g., silicon based) devices. In this example, the processor circuitry 2012 implements the example model trainer circuitry 118, the example interface circuitry 302, the example feature extraction circuitry 304, the example encoder circuitry 306, the example edge generator circuitry 308, the example GNN circuitry 310, the example task solver circuitry 316, and the example feature propagation circuitry 318.

The processor circuitry 2012 of the illustrated example includes a local memory 2013 (e.g., a cache, registers, etc.). The processor circuitry 2012 of the illustrated example is in communication with a main memory including a volatile memory 2014 and a non-volatile memory 2016 by a bus 2018. The volatile memory 2014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2016 may be implemented by flash memory and/or any other desired type of memory device. Access to the main memory 2014, 2016 of the illustrated example is controlled by a memory controller 2017.

The processor platform 2000 of the illustrated example also includes interface circuitry 2020. The interface circuitry 2020 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 2022 are connected to the interface circuitry 2020. The input device(s) 2022 permit(s) a user to enter data and/or commands into the processor circuitry 2012. The input device(s) 2022 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2024 are also connected to the interface circuitry 2020 of the illustrated example. The output device(s) 2024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2020 of the illustrated example, thus, typically includes a graphics driver card, a graphics driver chip, and/or graphics processor circuitry such as a GPU.

The interface circuitry 2020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 2000 of the illustrated example also includes one or more mass storage devices 2028 to store software and/or data. Examples of such mass storage devices 2028 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 2032, which may be implemented by the machine readable instructions of FIGS. 12-19, may be stored in the mass storage device 2028, in the volatile memory 2014, in the non-volatile memory 2016, and/or on a removable non-transitory computer readable storage medium such as a CD or DVD.

Figure 21:
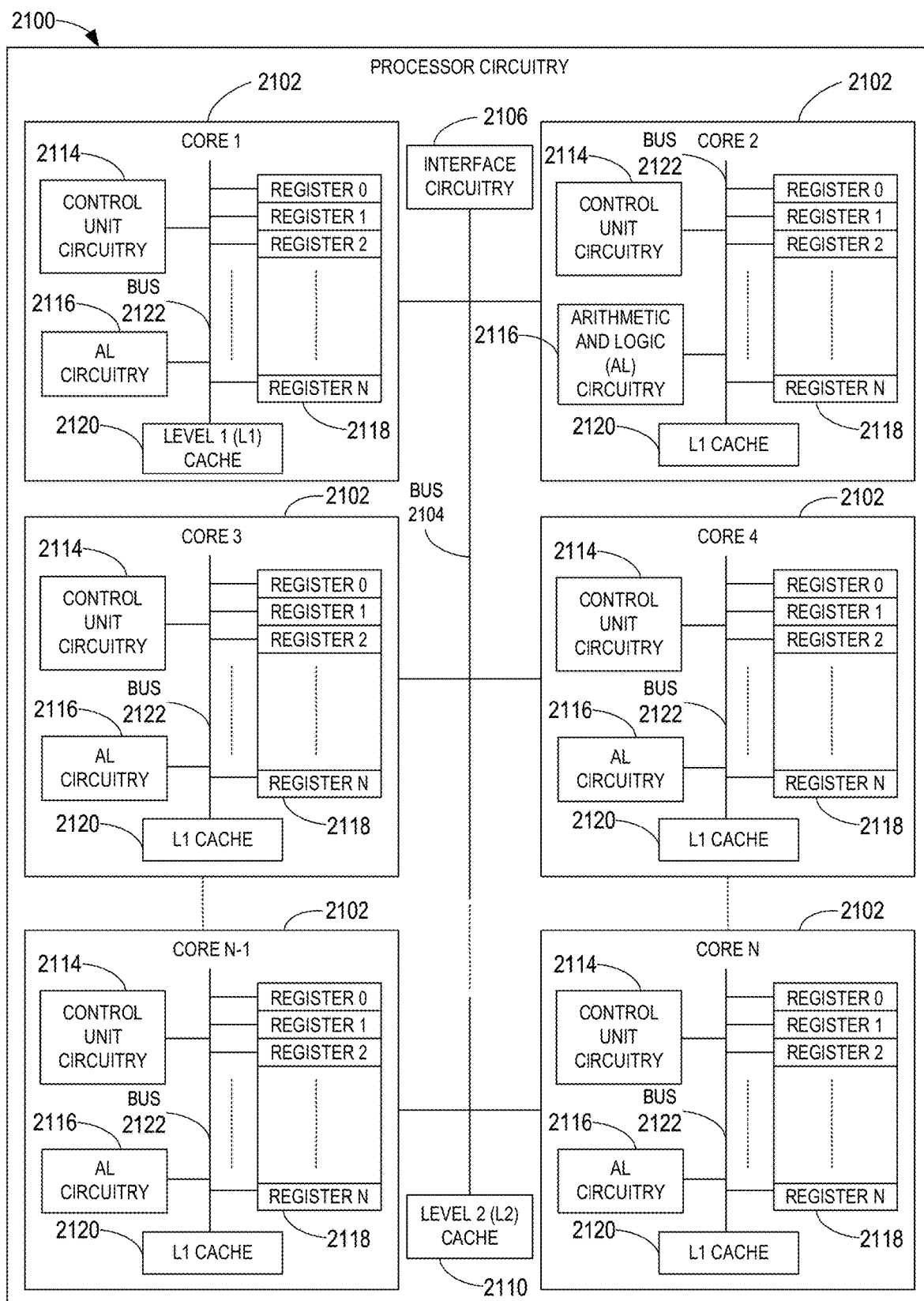
FIG. 21 is a block diagram of an example implementation of the processor circuitry of FIG. 20.

FIG. 21 is a block diagram of an example implementation of the processor circuitry 2012 of FIG. 20. In this example, the processor circuitry 2012 of FIG. 20 is implemented by a microprocessor 2100. For example, the microprocessor 2100 may be a general purpose microprocessor (e.g., general purpose microprocessor circuitry). The microprocessor 2100 executes some or all of the machine readable instructions of the flowcharts of FIGS. 12-19 to effectively instantiate the circuitry of FIG. 3 as logic circuits to perform the operations corresponding to those machine readable instructions. In some such examples, the circuitry of FIGS. 1-9 is instantiated by the hardware circuits of the microprocessor 2100 in combination with the instructions. For example, the microprocessor 2100 may be implemented by multi-core hardware circuitry such as a CPU, a DSP, a GPU, an XPU, etc. Although it may include any number of example cores 2102 (e.g., 1 core), the microprocessor 2100 of this example is a multi-core semiconductor device including N cores. The cores 2102 of the microprocessor 2100 may operate independently or may cooperate to execute machine readable instructions. For example, machine code corresponding to a firmware program, an embedded software program, or a software program may be executed by one of the cores 2102 or may be executed by multiple ones of the cores 2102 at the same or different times. In some examples, the machine code corresponding to the firmware program, the embedded software program, or the software program is split into threads and executed in parallel by two or more of the cores 2102. The software program may correspond to a portion or all of the machine readable instructions and/or operations represented by the flowcharts of FIGS. 12-19.

The cores 2102 may communicate by a first example bus 2104. In some examples, the first bus 2104 may be implemented by a communication bus to effectuate communication associated with one(s) of the cores 2102. For example, the first bus 2104 may be implemented by at least one of an Inter-Integrated Circuit (I2C) bus, a Serial Peripheral Interface (SPI) bus, a PCI bus, or a PCIe bus. Additionally or alternatively, the first bus 2104 may be implemented by any other type of computing or electrical bus. The cores 2102 may obtain data, instructions, and/or signals from one or more external devices by example interface circuitry 2106. The cores 2102 may output data, instructions, and/or signals to the one or more external devices by the interface circuitry 2106. Although the cores 2102 of this example include example local memory 2120 (e.g., Level 1 (L1) cache that may be split into an L1 data cache and an L1 instruction cache), the microprocessor 2100 also includes example shared memory 2110 that may be shared by the cores (e.g., Level 2 (L2 cache)) for high-speed access to data and/or instructions. Data and/or instructions may be transferred (e.g., shared) by writing to and/or reading from the shared memory 2110. The local memory 2120 of each of the cores 2102 and the shared memory 2110 may be part of a hierarchy of storage devices including multiple levels of cache memory and the main memory (e.g., the main memory 2014, 2016 of FIG. 20). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2102 may be referred to as a CPU, DSP, GPU, etc., or any other type of hardware circuitry. Each core 2102 includes control unit circuitry 2114, arithmetic and logic (AL) circuitry (sometimes referred to as an ALU) 2116, a plurality of registers 2118, the local memory 2120, and a second example bus 2122. Other structures may be present. For example, each core 2102 may include vector unit circuitry, single instruction multiple data (SIMD) unit circuitry, load/store unit (LSU) circuitry, branch/jump unit circuitry, floating-point unit (FPU) circuitry, etc. The control unit circuitry 2114 includes semiconductor-based circuits structured to control (e.g., coordinate) data movement within the corresponding core 2102. The AL circuitry 2116 includes semiconductor-based circuits structured to perform one or more mathematic and/or logic operations on the data within the corresponding core 2102. The AL circuitry 2116 of some examples performs integer based operations. In other examples, the AL circuitry 2116 also performs floating point operations. In yet other examples, the AL circuitry 2116 may include first AL circuitry that performs integer based operations and second AL circuitry that performs floating point operations. In some examples, the AL circuitry 2116 may be referred to as an Arithmetic Logic Unit (ALU).

The registers 2118 are semiconductor-based structures to store data and/or instructions such as results of one or more of the operations performed by the AL circuitry 2116 of the corresponding core 2102. For example, the registers 2118 may include vector register(s), SIMD register(s), general purpose register(s), flag register(s), segment register(s), machine specific register(s), instruction pointer register(s), control register(s), debug register(s), memory management register(s), machine check register(s), etc. The registers 2118 may be arranged in a bank as shown in FIG. 21. Alternatively, the registers 2118 may be organized in any other arrangement, format, or structure including distributed throughout the core 2102 to shorten access time. The second bus 2122 may be implemented by at least one of an I2C bus, a SPI bus, a PCI bus, or a PCIe bus Each core 2102 and/or, more generally, the microprocessor 2100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 22:
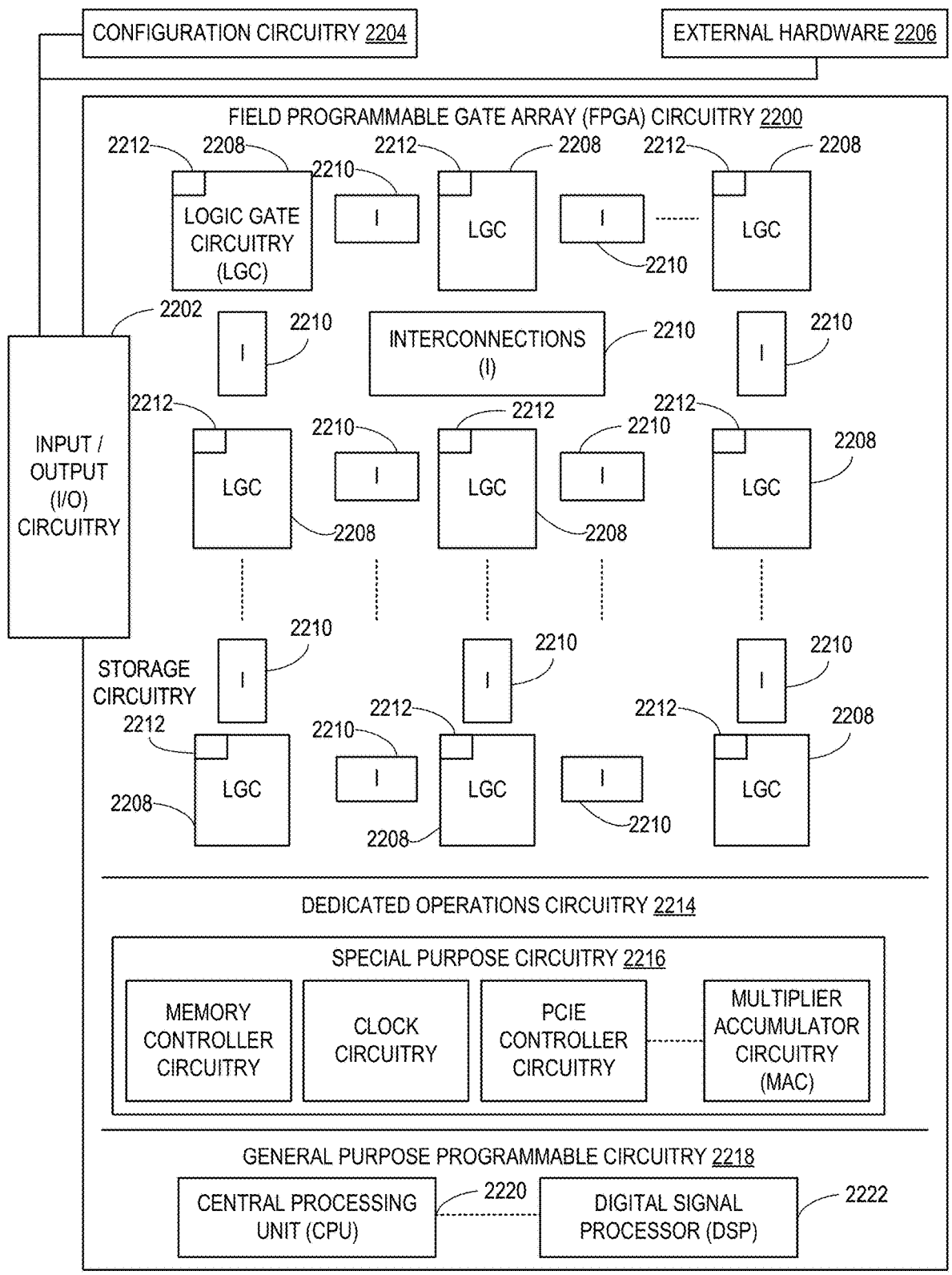
FIG. 22 is a block diagram of another example implementation of the processor circuitry of FIG. 20.

FIG. 22 is a block diagram of another example implementation of the processor circuitry 2012 of FIG. 20. In this example, the processor circuitry 2012 is implemented by FPGA circuitry 2200. For example, the FPGA circuitry 2200 may be implemented by an FPGA. The FPGA circuitry 2200 can be used, for example, to perform operations that could otherwise be performed by the example microprocessor 2100 of FIG. 21 executing corresponding machine readable instructions. However, once configured, the FPGA circuitry 2200 instantiates the machine readable instructions in hardware and, thus, can often execute the operations faster than they could be performed by a general purpose microprocessor executing the corresponding software.

More specifically, in contrast to the microprocessor 2100 of FIG. 21 described above (which is a general purpose device that may be programmed to execute some or all of the machine readable instructions represented by the flowcharts of FIGS. 12-19 but whose interconnections and logic circuitry are fixed once fabricated), the FPGA circuitry 2200 of the example of FIG. 22 includes interconnections and logic circuitry that may be configured and/or interconnected in different ways after fabrication to instantiate, for example, some or all of the machine readable instructions represented by the flowcharts of FIGS. 12-19. In particular, the FPGA circuitry 2200 may be thought of as an array of logic gates, interconnections, and switches. The switches can be programmed to change how the logic gates are interconnected by the interconnections, effectively forming one or more dedicated logic circuits (unless and until the FPGA circuitry 2200 is reprogrammed). The configured logic circuits enable the logic gates to cooperate in different ways to perform different operations on data received by input circuitry. Those operations may correspond to some or all of the software represented by the flowcharts of FIGS. 12-19. As such, the FPGA circuitry 2200 may be structured to effectively instantiate some or all of the machine readable instructions of the flowcharts of FIGS. 12-19 as dedicated logic circuits to perform the operations corresponding to those software instructions in a dedicated manner analogous to an ASIC. Therefore, the FPGA circuitry 2200 may perform the operations corresponding to the some or all of the machine readable instructions of FIGS. 12-19 faster than the general purpose microprocessor can execute the same.

In the example of FIG. 22, the FPGA circuitry 2200 is structured to be programmed (and/or reprogrammed one or more times) by an end user by a hardware description language (HDL) such as Verilog. The FPGA circuitry 2200 of FIG. 22, includes example input/output (I/O) circuitry 2202 to obtain and/or output data to/from example configuration circuitry 2204 and/or external hardware 2206. For example, the configuration circuitry 2204 may be implemented by interface circuitry that may obtain machine readable instructions to configure the FPGA circuitry 2200, or portion(s) thereof. In some such examples, the configuration circuitry 2204 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2206 may be implemented by external hardware circuitry. For example, the external hardware 2206 may be implemented by the microprocessor 2100 of FIG. 21. The FPGA circuitry 2200 also includes an array of example logic gate circuitry 2208, a plurality of example configurable interconnections 2210, and example storage circuitry 2212. The logic gate circuitry 2208 and the configurable interconnections 2210 are configurable to instantiate one or more operations that may correspond to at least some of the machine readable instructions of FIGS. 12-19 and/or other desired operations. The logic gate circuitry 2208 shown in FIG. 22 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2208 to enable configuration of the electrical structures and/or the logic gates to form circuits to perform desired operations. The logic gate circuitry 2208 may include other electrical structures such as look-up tables (LUTs), registers (e.g., flip-flops or latches), multiplexers, etc.

The configurable interconnections 2210 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2208 to program desired logic circuits.

The storage circuitry 2212 of the illustrated example is structured to store result(s) of the one or more of the operations performed by corresponding logic gates. The storage circuitry 2212 may be implemented by registers or the like. In the illustrated example, the storage circuitry 2212 is distributed amongst the logic gate circuitry 2208 to facilitate access and increase execution speed.

The example FPGA circuitry 2200 of FIG. 22 also includes example Dedicated Operations Circuitry 2214. In this example, the Dedicated Operations Circuitry 2214 includes special purpose circuitry 2216 that may be invoked to implement commonly used functions to avoid the need to program those functions in the field. Examples of such special purpose circuitry 2216 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2200 may also include example general purpose programmable circuitry 2218 such as an example CPU 2220 and/or an example DSP 2222. Other general purpose programmable circuitry 2218 may additionally or alternatively be present such as a GPU, an XPU, etc., that can be programmed to perform other operations.

Although FIGS. 21 and 22 illustrate two example implementations of the processor circuitry 2012 of FIG. 20, many other approaches are contemplated. For example, as mentioned above, modern FPGA circuitry may include an on-board CPU, such as one or more of the example CPU 2220 of FIG. 22. Therefore, the processor circuitry 2012 of FIG. 20 may additionally be implemented by combining the example microprocessor 2100 of FIG. 21 and the example FPGA circuitry 2200 of FIG. 22. In some such hybrid examples, a first portion of the machine readable instructions represented by the flowcharts of FIGS. 12-19 may be executed by one or more of the cores 2102 of FIG. 21, a second portion of the machine readable instructions represented by the flowcharts of FIGS. 12-19 may be executed by the FPGA circuitry 2200 of FIG. 22, and/or a third portion of the machine readable instructions represented by the flowcharts of FIGS. 12-19 may be executed by an ASIC. It should be understood that some or all of the circuitry of FIGS. 1-9 may, thus, be instantiated at the same or different times. Some or all of the circuitry may be instantiated, for example, in one or more threads executing concurrently and/or in series. Moreover, in some examples, some or all of the circuitry of FIGS. 1-9 may be implemented within one or more virtual machines and/or containers executing on the microprocessor.

In some examples, the processor circuitry 2012 of FIG. 20 may be in one or more packages. For example, the microprocessor 2100 of FIG. 21 and/or the FPGA circuitry 2200 of FIG. 22 may be in one or more packages. In some examples, an XPU may be implemented by the processor circuitry 2012 of FIG. 20, which may be in one or more packages. For example, the XPU may include a CPU in one package, a DSP in another package, a GPU in yet another package, and an FPGA in still yet another package.

Figure 23:
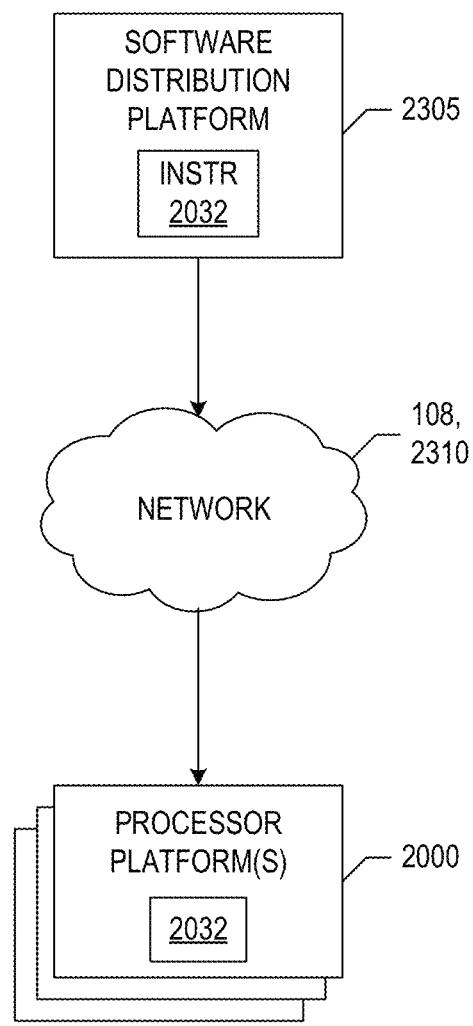
FIG. 23 is a block diagram of an example software distribution platform (e.g., one or more servers) to distribute software (e.g., software corresponding to the example machine readable instructions of FIGS. 12-19) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2305 to distribute software such as the example machine readable instructions 2032 of FIG. 20 to hardware devices owned and/or operated by third parties is illustrated in FIG. 23. The example software distribution platform 2305 may be implemented by any computer server, data facility, cloud service, etc., capable of storing and transmitting software to other computing devices. The third parties may be customers of the entity owning and/or operating the software distribution platform 2305. For example, the entity that owns and/or operates the software distribution platform 2305 may be a developer, a seller, and/or a licensor of software such as the example machine readable instructions 2032 of FIG. 20. The third parties may be consumers, users, retailers, OEMs, etc., who purchase and/or license the software for use and/or re-sale and/or sub-licensing. In the illustrated example, the software distribution platform 2305 includes one or more servers and one or more storage devices. The storage devices store the machine readable instructions 2032, which may correspond to the example machine readable instructions 1300 of FIGS. 13-19, as described above. The one or more servers of the example software distribution platform 2305 are in communication with an example network 2310, which may correspond to any one or more of the Internet and/or any of the example networks 108 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 2032 from the software distribution platform 2305. For example, the software, which may correspond to the example machine readable instructions 1008 of FIGS. 13-19, may be downloaded to the example processor platform 2000, which is to execute the machine readable instructions 2032 to implement the entity mapping circuitry 116. In some examples, one or more servers of the software distribution platform 2305 periodically offer, transmit, and/or force updates to the software (e.g., the example machine readable instructions 2032 of FIG. 20) to ensure improvements, patches, updates, etc., are distributed and applied to the software at the end user devices.

From the foregoing, it will be appreciated that example systems, methods, apparatus, and articles of manufacture have been disclosed that determine related content in a document. Disclosed examples can provide a large improvement on the productivity, error reduction, and digitalization of companies by providing for the technological (e.g., automatic) extraction of data from the document image. Disclosed examples can boost document processing to generate more data with increased quality by enabling the removal of manual techniques and providing for efficient processes. Example entity mapping model disclosed herein work on extracting node-level relations only, which reduces the complexity of the problem, and not higher-level relations as in other approaches. For example, information learnt by text segments nodes during the message passing of a segment-level first graph can be used to generate features for the entity nodes.

Disclosed examples provide improved accuracy of an information extraction process by discarding text strings output by an OCR engine, which removes any impact of text errors output by an OCR engine and prevents hard overfitting. Disclosed examples provide improved accuracy of an information extraction process by utilizing custom node features that are normalized relative to a stable dimension (e.g., a document width). Disclosed examples provide improved accuracy of an information extraction process by utilizing a novel edge sampling algorithm that prevent missing edges between two text segments that belong to an entity. Disclosed examples improve an accuracy of an information extraction process by propagating enriched features of segment-level nodes to entity-level nodes applying a graph attention network to a relation graph that connects the segment-level nodes to their parent entity-level nodes.

Examples disclosed herein improve an accuracy of an entity mapping model by performing a two-step training process that includes an initial training stage following by a fine-tuning stage. For example, disclosed examples utilize ground truth (GT) information during the initial training stage, which includes training an example segment model and an example entity model using the ground truth information. In other words, example entities for the entity model are constructed using GT segment clusters only during the initial training stage. During the fine-tuning stage, predictions from the trained segment model are used to fine-tune the entity model. Following this strategy accelerates the convergency of the entity mapping model as it reduces dependency of the EL task and the EB task and allows optimizing the parameters for both tasks in parallel.

Disclosed systems, methods, apparatus, and articles of manufacture improve the efficiency of using a computing device by grouping text segments to form entities using only bounding box features and category embeddings. Because examples disclosed herein utilize the bounding box and category features, example entity mapping models disclosed herein do not operate over an image. As such, disclosed examples avoid a need to load and preprocess the image, and avoid the use of an image backbone for extracting a feature map. In other words, examples disclosed herein eliminate the unnecessary consumption of computing resources by not utilizing an image. Further, example entity mapping models disclosed herein are GNN-based model utilized herein are more efficient than methods based on FCNNs to evaluate all possible connections. Thus, disclosed examples limit a number of connections that need to be evaluated among text segments, which accelerates the inference and reduces the amount of required resources. Moreover, by propagating features of segment-level nodes to entity-level nodes, disclosed example do not generate the entity-level nodes from scratch. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to determine related content in a document are disclosed herein. Further examples and combinations thereof include the following:

Example 1 includes an apparatus, comprising at least one memory; machine readable instructions; and processor circuitry to at least one of instantiate or execute the machine readable instructions to generate a segment-level graph by sampling segment-level edges among segment nodes representing text segments in a document, the segment-level graph including segment node embeddings representing features of the segment nodes; cluster the text segments to form entities by applying a first graph attention network (GAN) based model to the segment-level graph to update the segment node embeddings; generate a multi-level graph by (a) generating an entity-level graph over the segment-level graph, the entity-level graph including hypernodes representing the entities and sampled entity-level edges connecting ones of the hypernodes, and (b) connecting the segment nodes to respective ones of the hypernodes using relation edges; generate hypernode embeddings by propagating the updated segment node embeddings using a relation graph, the relation graph including the updated segment node embeddings for the segment nodes, the hypernodes, and the relation edges; and cluster the entities by product by applying a second graph attention network (GAN) based model to the multi-level graph, the multi-level graph to generate updated hypernode embeddings.

Example 2 includes the apparatus of example 1, wherein the document is a receipt, and the text segments correspond to words in the receipt.

Example 3 includes the apparatus of any preceding example, wherein ones of the text segments include (a) a text string that includes one or more characters, (b) a bounding box representing coordinates of the ones of the text segments, and (c) an entity category.

Example 4 includes the apparatus of any preceding example, wherein the processor circuitry is to at least one of instantiate or execute the machine readable instructions to discard the text strings to reduce a computational demand.

Example 5 includes the apparatus of any preceding example, wherein the processor circuitry is to sample a first one of the segment-level edges between a first text segment and a second text segment in response to determining that an absolute value of vertical distance between a center coordinate of the first text segment and a center coordinate of the second text segment is less than a height of the first text segment multiplied by a constant.

Example 6 includes the apparatus of any preceding example, wherein the processor circuitry is to generate a first one of the segment node embeddings for a first text segment by at least one of instantiating or executing the machine readable instructions to extract first features from the first text segment, the first features including a left center coordinate, a right center coordinate, and a rotation angle of a respective bounding box; normalize the left center and right center coordinates using a width of the document; apply a one-hot encoder to an entity category; apply a linear layer to an output of the one-hot encoder to generate a category embedding; and concatenate the normalized left and right center coordinates, the rotation angle, and the category embedding.

Example 7 includes the apparatus of any preceding example, wherein the first GAN based model includes two GAT layers, and wherein the processor circuitry to at least one of instantiate or execute the machine readable instructions to generate a first global node by averaging the segment node embeddings, the first global node to be passed through the GAT layers with the segment node embeddings to provide a global document perspective.

Example 8 includes the apparatus of any preceding example, wherein to cluster the text segments, the processor circuitry applies a first post-processing stage to the updated segment node embeddings by at least one of instantiating or executing the machine readable instructions to apply an edge prediction model based on a multi-layer perceptron to the updated segment node embeddings to generate a first adjacency matrix; apply a connected components algorithm to the first adjacency matrix, the connected components algorithm to select ones of the segment-level edges to maintain; and generate bounds of the entities by forming boxes around the bounding boxes of respective ones of the text segments defining the entities.

Example 9 includes the apparatus of any preceding example, wherein the processor circuitry is to sample a first one of the entity-level edges between a first entity and a second entity in response to determining that an absolute value of vertical distance between a center coordinate of the first entity and a center coordinate of the second entity is less than a height of the first entity multiplied by a constant.

Example 10 includes the apparatus of any preceding example, wherein the first and second GAN based models include a series of graph attention (GAT) layers to update respective node embeddings with information from neighbor nodes.

Example 11 includes the apparatus of any preceding example, wherein a sigmoid linear unit (SiLu) activation is applied to an output of ones of the GAT layers.

Example 12 includes the apparatus of any preceding example, wherein the GAT layers include residual connections.

Example 13 includes the apparatus of any preceding example, wherein the second GAN based model includes four GAT layers, and wherein the processor circuitry to at least one of instantiate or execute the machine readable instructions to generate a first global node by averaging the updated segment node embeddings, the first global node to be passed through the GAT layers with the hypernode embeddings to provide a global document perspective.

Example 14 includes the apparatus of any preceding example, wherein the processor circuitry is to propagate the updated segment node embeddings using the relation graph by at least one of instantiating or executing the machine readable instructions to apply a third GAN based model to the relation graph, the third GAN based model including two graph attention (GAT) layers and an activation layer therebetween.

Example 15 includes the apparatus of any preceding example, wherein to cluster the entities by product, the processor circuitry applies a second post-processing stage to the updated hypernode embeddings by at least one of instantiating or executing the machine readable instructions to apply an edge prediction model based on a multi-layer perceptron to the updated hypernode embeddings to generate a second adjacency matrix; determine a number of entity clusters to form based on the second adjacency matrix; and apply a linking criteria to the second adjacency matrix to form the number of the entity clusters.

Example 16 includes at least one non-transitory computer readable storage medium comprising instructions that, when executed, cause at least one processor to at least generate a segment-level graph by sampling segment-level edges among segment nodes representing text segments in a document, the segment-level graph including segment node embeddings representing features of the segment nodes; group the text segments by entity to form entities by applying a first graph attention network (GAN) based model to the segment-level graph to update the segment node embeddings; generate a multi-level graph by (a) generating an entity-level graph over the segment-level graph, the entity-level graph including hypernodes representing the entities and sampled entity-level edges connecting ones of the hypernodes, and (b) connecting the segment nodes to respective ones of the hypernodes using relation edges; generate hypernode embeddings by propagating the updated segment node embeddings using a relation graph, the relation graph including the updated segment node embeddings for the segment nodes, the hypernodes, and the relation edges; and group the entities by product by applying a second graph attention network (GAN) based model to the multi-level graph, the multi-level graph to generate updated hypernode embeddings.

Example 17 includes the at least one non-transitory computer readable storage medium of example 16, wherein the document is a receipt, and the text segments correspond to words in the receipt.

Example 18 includes the at least one non-transitory computer readable storage medium of any preceding example, wherein ones of the text segments include (a) a text string that includes one or more characters, (b) a bounding box representing coordinates of the ones of the text segments, and (c) an entity category.

Example 19 includes the at least one non-transitory computer readable storage medium of any preceding example, wherein the instructions, when executed, cause the at least one processor to discard the text strings to reduce a computational demand.

Example 20 includes the at least one non-transitory computer readable storage medium of any preceding example, wherein the instructions, when executed, cause the at least one processor to sample a first one of the segment-level edges between a first text segment and a second text segment in response to determining that an absolute value of vertical distance between a center coordinate of the first text segment and a center coordinate of the second text segment is less than a height of the first text segment multiplied by a constant.

Example 21 includes the at least one non-transitory computer readable storage medium of any preceding example, wherein the instructions, when executed, cause the at least one processor to generate a first one of the segment node embeddings for a first text segment by extracting first features from the first text segment, the first features including a left center coordinate, a right center coordinate, and a rotation angle of a respective bounding box; normalizing the left center and right center coordinates using a width of the document; applying a one-hot encoder to the entity category; applying a linear layer to an output of the one-hot encoder to generate a category embedding; and concatenating the normalized left and right center coordinates, the rotation angle, and the category embedding.

Example 22 includes the at least one non-transitory computer readable storage medium of any preceding example, wherein the first GAN based model includes two GAT layers, and wherein the instructions, when executed, cause the at least one processor to generate a first global node by averaging the segment node embeddings, the first global node to be passed through the GAT layers with the segment node embeddings to provide a global document perspective.

Example 23 includes the at least one non-transitory computer readable storage medium of any preceding example, wherein the instructions, when executed, cause the at least one processor to cluster the text segments by applying a first post-processing stage to the updated segment node embeddings, the first post-processing stage including applying an edge prediction model based on a multi-layer perceptron to the updated segment node embeddings to generate a first adjacency matrix; applying a connected components algorithm to the first adjacency matrix, the connected components algorithm to select ones of the segment-level edges to maintain; and generating bounds of the entities by forming boxes around the bounding boxes of respective ones of the text segments defining the entities.

Example 24 includes the at least one non-transitory computer readable storage medium of any preceding example, wherein the instructions, when executed, cause the at least one processor to sample a first one of the entity-level edges between a first entity and a second entity in response to determining that an absolute value of vertical distance between a center coordinate of the first entity and a center coordinate of the second entity is less than a height of the first entity multiplied by a constant.

Example 25 includes the at least one non-transitory computer readable storage medium of any preceding example, wherein the first and second GAN based models include a series of graph attention (GAT) layers to update respective node embeddings with information from neighbor nodes.

Example 26 includes the at least one non-transitory computer readable storage medium of any preceding example, wherein a sigmoid linear unit (SiLu) activation is applied to an output of ones of the GAT layers.

Example 27 includes the at least one non-transitory computer readable storage medium of any preceding example, wherein the GAT layers include residual connections.

Example 28 includes the at least one non-transitory computer readable storage medium of any preceding example, wherein the second GAN based model includes four GAT layers, and wherein the instructions, when executed, cause the at least one processor to generate a first global node by averaging the updated segment node embeddings, the first global node to be passed through the GAT layers with the hypernode embeddings to provide a global document perspective.

Example 29 includes the at least one non-transitory computer readable storage medium of any preceding example, wherein the instructions, when executed, cause the at least one processor to propagate the updated segment node embeddings using the relation graph by applying a third GAN based model to the relation graph, the third GAN based model including two graph attention (GAT) layers and an activation layer therebetween.

Example 30 includes the at least one non-transitory computer readable storage medium of any preceding example, wherein to cluster the entities by product, the instructions, when executed, cause the at least one processor to apply a second post-processing stage to the updated hypernode embeddings, the second processing stage including applying an edge prediction model based on a multi-layer perceptron to the updated hypernode embeddings to generate a second adjacency matrix; determining a number of entity clusters to form based on the second adjacency matrix; and applying a linking criteria to the second adjacency matrix to form the number of the entity clusters.

Example 31 includes a method comprising generating, by executing at least one instruction with at least one processor, a segment-level graph by sampling segment-level edges among segment nodes representing text segments in a document, the segment-level graph including segment node embeddings representing features of the segment nodes; clustering, by executing the at least one instruction with the at least one processor, the text segments to form entities by applying a first graph attention network (GAN) based model to the segment-level graph to update the segment node embeddings; generating, by executing the at least one instruction with the at least one processor, a multi-level graph by (a) generating an entity-level graph over the segment-level graph, the entity-level graph including hypernodes representing the entities and sampled entity-level edges connecting ones of the hypernodes, and (b) connecting the segment nodes to respective ones of the hypernodes using relation edges; generating, by executing the at least one instruction with the at least one processor, hypernode embeddings by propagating the updated segment node embeddings using a relation graph, the relation graph including the updated segment node embeddings for the segment nodes, the hypernodes, and the relation edges; and clustering, by executing the at least one instruction with the at least one processor, the entities by product by applying a second graph attention network (GAN) based model to the multi-level graph, the multi-level graph to generate updated hypernode embeddings.

Example 32 includes the method of example 31, wherein the document is a receipt, and the text segments correspond to words in the receipt.

Example 33 includes the method of any preceding example, wherein ones of the text segments include (a) a text string that includes one or more characters, (b) a bounding box representing coordinates of the ones of the text segments, and (c) an entity category.

Example 34 includes the method of any preceding example, further including discarding the text strings to reduce a computational demand.

Example 35 includes the method of any preceding example, wherein the sampling of a first one of the segment-level edges between a first text segment and a second text segment includes identifying the first one of the segment-level edges in response to determining that an absolute value of vertical distance between a center coordinate of the first text segment and a center coordinate of the second text segment is less than a height of the first text segment multiplied by a constant.

Example 36 includes the method of any preceding example, wherein the generating of a first one of the segment node embeddings for a first text segment includes extracting first features from the first text segment, the first features including a left center coordinate, a right center coordinate, and a rotation angle of a respective bounding box; normalizing the left center and right center coordinates using a width of the document; applying a one-hot encoder to the entity category; applying a linear layer to an output of the one-hot encoder to generate a category embedding; and concatenating the normalized left and right center coordinates, the rotation angle, and the category embedding.

Example 37 includes the method of any preceding example, wherein the first GAN based model includes two GAT layers, and further including generating a first global node by averaging the segment node embeddings, the first global node to be passed through the GAT layers with the segment node embeddings to provide a global document perspective.

Example 38 includes the method of any preceding example, wherein the clustering of the text segments, including applying a first post-processing stage to the updated segment node embeddings, the first post-processing stage including applying an edge prediction model based on a multi-layer perceptron to the updated segment node embeddings to generate a first adjacency matrix; applying a connected components algorithm to the first adjacency matrix, the connected components algorithm to select ones of the segment-level edges to maintain; and generating bounds of the entities by forming boxes around the bounding boxes of respective ones of the text segments defining the entities.

Example 39 includes the method of any preceding example, the sampling of a first one of the entity-level edges between a first entity and a second entity including identifying the first one of the entity-level edges in response to determining that an absolute value of vertical distance between a center coordinate of the first entity and a center coordinate of the second entity is less than a height of the first entity multiplied by a constant.

Example 40 includes the method of any preceding example, wherein the first and second GAN based models include a series of graph attention (GAT) layers to update respective node embeddings with information from neighbor nodes.

Example 41 includes the method of any preceding example, wherein a sigmoid linear unit (SiLu) activation is applied to an output of ones of the GAT layers.

Example 42 includes the method of any preceding example, wherein the GAT layers include residual connections.

Example 43 includes the method of any preceding example, wherein the second GAN based model includes four GAT layers, and further including generating a first global node by averaging the updated segment node embeddings, the first global node to be passed through the GAT layers with the hypernode embeddings to provide a global document perspective.

Example 44 includes the method of any preceding example, wherein the propagating the updated segment node embeddings using the relation graph including applying a third GAN based model to the relation graph, the third GAN based model including two graph attention (GAT) layers and an activation layer therebetween.

Example 45 includes the method of any preceding example, wherein the clustering of the entities by product including applying a second post-processing stage to the updated hypernode embeddings, the second post-processing stage including applying an edge prediction model based on a multi-layer perceptron to the updated hypernode embeddings to generate a second adjacency matrix; determining a number of entity clusters to form based on the second adjacency matrix; and applying a linking criteria to the second adjacency matrix to form the number of the entity clusters.

Example 46 includes an apparatus comprising means for generating first feature embeddings for text segments detected in a document, the text segments to be represented by segment nodes in a segment-level graph; means for generating a graph to identify first candidate edges among the segment nodes to form the segment-level graph, the segment-level graph including the segment nodes represented by the first feature embeddings and the first candidate edges; and identify second candidate edges among entity hypernodes representing entities to form an entity-level graph, the entity-level graph including the entity hypernodes represented by second feature embeddings and the second candidate edges; and connect the segment-level graph and the entity-level graph by generating relation edges from the segment nodes to respective ones of the entity hypernodes to generate a multi-level graph, the multi-level graph including a relation graph that includes the segment nodes, the first feature embeddings, the entity hypernodes, and the relation edges; means for generating the second feature embeddings for the entity hypernodes by applying a first graph attention based model to the relation graph to propagate updated first feature embeddings; means for updating to update the first feature embeddings for the text segments by applying a second graph attention network based model to the segment-level graph; and update the second feature embeddings for the entity hypernodes by applying a second graph attention based model to the entity-level graph; means for clustering to cluster the segment nodes to generate the entities, the clustering based on the updated first feature embeddings; and cluster the entity hypernodes to generate entity clusters, the clustering based on the updated second feature embeddings.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus, comprising:
at least one memory;
machine readable instructions; and
processor circuitry to at least one of instantiate or execute the machine readable instructions to:
generate a segment-level graph by sampling segment-level edges among segment nodes representing text segments in a document, the segment-level graph including segment node embeddings representing features of the segment nodes;
cluster the text segments to form entities by applying a first graph attention network (GAN) based model to the segment-level graph to update the segment node embeddings;
generate a multi-level graph by (a) generating an entity-level graph over the segment-level graph, the entity-level graph including hypernodes representing the entities and sampled entity-level edges connecting ones of the hypernodes, and (b) connecting the segment nodes to respective ones of the hypernodes using relation edges;
generate hypernode embeddings by propagating the updated segment node embeddings using a relation graph, the relation graph including the updated segment node embeddings for the segment nodes, the hypernodes, and the relation edges; and
cluster the entities by product by applying a second graph attention network (GAN) based model to the multi-level graph, the multi-level graph to generate updated hypernode embeddings.

2. The apparatus of claim 1, wherein the document is a receipt, and the text segments correspond to words in the receipt.

3. The apparatus of claim 1, wherein ones of the text segments include (a) a text string that includes one or more characters, (b) a bounding box representing coordinates of the ones of the text segments, and (c) an entity category.

4. The apparatus of claim 3, wherein the processor circuitry is to at least one of instantiate or execute the machine readable instructions to discard the text strings to reduce a computational demand.

5. The apparatus of claim 3, wherein the processor circuitry is to sample a first one of the segment-level edges between a first text segment and a second text segment in response to determining that an absolute value of vertical distance between a center coordinate of the first text segment and a center coordinate of the second text segment is less than a height of the first text segment multiplied by a constant.

6. The apparatus of claim 3, wherein the processor circuitry is to generate a first one of the segment node embeddings for a first text segment by at least one of instantiating or executing the machine readable instructions to:
extract first features from the first text segment, the first features including a left center coordinate, a right center coordinate, and a rotation angle of a respective bounding box;
normalize the left center and right center coordinates using a width of the document;
apply a one-hot encoder to an entity category;
apply a linear layer to an output of the one-hot encoder to generate a category embedding; and
concatenate the normalized left center and right center coordinates, the rotation angle, and the category embedding.

7. The apparatus of claim 1, wherein the first GAN based model includes two GAT layers, and wherein the processor circuitry to at least one of instantiate or execute the machine readable instructions to generate a first global node by averaging the segment node embeddings, the first global node to be passed through the GAT layers with the segment node embeddings to provide a global document perspective.

8. The apparatus of claim 1, wherein to cluster the text segments, the processor circuitry applies a first post-processing stage to the updated segment node embeddings by at least one of instantiating or executing the machine readable instructions to:
   apply an edge prediction model based on a multi-layer perceptron to the updated segment node embeddings to generate a first adjacency matrix;
   apply a connected components algorithm to the first adjacency matrix, the connected components algorithm to select ones of the segment-level edges to maintain; and
   generate bounds of the entities by forming boxes around respective ones of the text segments defining the entities.

9. The apparatus of claim 8, wherein the processor circuitry is to sample a first one of the entity-level edges between a first entity and a second entity in response to determining that an absolute value of vertical distance between a center coordinate of the first entity and a center coordinate of the second entity is less than a height of the first entity multiplied by a constant.

10. The apparatus of claim 1, wherein the first and second GAN based models include a series of graph attention (GAT) layers to update respective node embeddings with information from neighbor nodes.

11. The apparatus of claim 10, wherein the second GAN based model includes four GAT layers, and wherein the processor circuitry to at least one of instantiate or execute the machine readable instructions to generate a first global node by averaging the updated segment node embeddings, the first global node to be passed through the GAT layers with the hypernode embeddings to provide a global document perspective.

12. The apparatus of claim 1, wherein the processor circuitry is to propagate the updated segment node embeddings using the relation graph by at least one of instantiating or executing the machine readable instructions to apply a third GAN based model to the relation graph, the third GAN based model including two graph attention (GAT) layers and an activation layer therebetween.

13. The apparatus of claim 1, wherein to cluster the entities by product, the processor circuitry applies a second post-processing stage to the updated hypernode embeddings by at least one of instantiating or executing the machine readable instructions to:
   apply an edge prediction model based on a multi-layer perceptron to the updated hypernode embeddings to generate a second adjacency matrix;
   determine a number of entity clusters to form based on the second adjacency matrix; and
   apply a linking criteria to the second adjacency matrix to form the number of the entity clusters.

14. At least one non-transitory computer readable storage medium comprising instructions that, when executed, cause at least one processor to at least:
   generate a segment-level graph by sampling segment-level edges among segment nodes representing text segments in a document, the segment-level graph including segment node embeddings representing features of the segment nodes;
   group the text segments by entity to form entities by applying a first graph attention network (GAN) based model to the segment-level graph to update the segment node embeddings;
   generate a multi-level graph by (a) generating an entity-level graph over the segment-level graph, the entity-level graph including hypernodes representing the entities and sampled entity-level edges connecting ones of the hypernodes, and (b) connecting the segment nodes to respective ones of the hypernodes using relation edges;
   generate hypernode embeddings by propagating the updated segment node embeddings using a relation graph, the relation graph including the updated segment node embeddings for the segment nodes, the hypernodes, and the relation edges; and
   group the entities by product by applying a second graph attention network (GAN) based model to the multi-level graph, the multi-level graph to generate updated hypernode embeddings.

15. The at least one non-transitory computer readable storage medium of claim 14, wherein ones of the text segments include (a) a text string that includes one or more characters, (b) a bounding box representing coordinates of the ones of the text segments, and (c) an entity category.

16. The at least one non-transitory computer readable storage medium of claim 15, wherein the instructions, when executed, cause the at least one processor to discard the text strings to reduce a computational demand.

17. The at least one non-transitory computer readable storage medium of claim 15, wherein the instructions, when executed, cause the at least one processor to sample a first one of the segment-level edges between a first text segment and a second text segment in response to determining that an absolute value of vertical distance between a center coordinate of the first text segment and a center coordinate of the second text segment is less than a height of the first text segment multiplied by a constant.

18. The at least one non-transitory computer readable storage medium of claim 15, wherein the instructions, when executed, cause the at least one processor to generate a first one of the segment node embeddings for a first text segment by:
   extracting first features from the first text segment, the first features including a left center coordinate, a right center coordinate, and a rotation angle of a respective bounding box;
   normalizing the left center and right center coordinates using a width of the document;
   applying a one-hot encoder to the entity category;
   applying a linear layer to an output of the one-hot encoder to generate a category embedding; and
   concatenating the normalized left and right center coordinates, the rotation angle, and the category embedding.

19. The at least one non-transitory computer readable storage medium of claim 14, wherein the first GAN based model includes two GAT layers, and wherein the instructions, when executed, cause the at least one processor to generate a first global node by averaging the segment node embeddings, the first global node to be passed through the GAT layers with the segment node embeddings to provide a global document perspective.

20. The at least one non-transitory computer readable storage medium of claim 14, wherein the instructions, when executed, cause the at least one processor to cluster the text segments by applying a first post-processing stage to the updated segment node embeddings, the first post-processing stage including:
   applying an edge prediction model based on a multi-layer perceptron to the updated segment node embeddings to generate a first adjacency matrix;

applying a connected components algorithm to the first adjacency matrix, the connected components algorithm to select ones of the segment-level edges to maintain; and generating bounds of the entities by forming boxes around respective ones of the text segments defining the entities.

21. The at least one non-transitory computer readable storage medium of claim 20, wherein the instructions, when executed, cause the at least one processor to sample a first one of the entity-level edges between a first entity and a second entity in response to determining that an absolute value of vertical distance between a center coordinate of the first entity and a center coordinate of the second entity is less than a height of the first entity multiplied by a constant.

22. The at least one non-transitory computer readable storage medium of claim 14, wherein the first and second GAN based models include a series of graph attention (GAT) layers to update respective node embeddings with information from neighbor nodes.

23. The at least one non-transitory computer readable storage medium of claim 14, wherein the instructions, when executed, cause the at least one processor to propagate the updated segment node embeddings using the relation graph by applying a third GAN based model to the relation graph, the third GAN based model including two graph attention (GAT) layers and an activation layer therebetween.

24. The at least one non-transitory computer readable storage medium of claim 14, wherein to cluster the entities by product, the instructions, when executed, cause the at least one processor to apply a second post-processing stage to the updated hypernode embeddings, the second processing stage including:

applying an edge prediction model based on a multi-layer perceptron to the updated hypernode embeddings to generate a second adjacency matrix;

determining a number of entity clusters to form based on the second adjacency matrix; and applying a linking criteria to the second adjacency matrix to form the number of the entity clusters.

25. An apparatus comprising:
means for generating first feature embeddings for text segments detected in a document, the text segments to be represented by segment nodes in a segment-level graph;

means for generating a graph to:
identify first candidate edges among the segment nodes to form the segment-level graph, the segment-level graph including the segment nodes represented by the first feature embeddings and the first candidate edges;

identify second candidate edges among entity hypernodes representing entities to form an entity-level graph, the entity-level graph including the entity hypernodes represented by second feature embeddings and the second candidate edges; and connect the segment-level graph and the entity-level graph by generating relation edges from the segment nodes to respective ones of the entity hypernodes to generate a multi-level graph, the multi-level graph including a relation graph that includes the segment nodes, the first feature embeddings, the entity hypernodes, and the relation edges;

means for generating the second feature embeddings for the entity hypernodes by applying a first graph attention based model to the relation graph to propagate updated first feature embeddings;

means for updating embeddings to:
update the first feature embeddings for the text segments by applying a second graph attention network based model to the segment-level graph; and update the second feature embeddings for the entity hypernodes by applying a second graph attention based model to the entity-level graph;

means for clustering to:
cluster the segment nodes to generate the entities, the clustering based on the updated first feature embeddings; and cluster the entity hypernodes to generate entity clusters, the clustering based on the updated second feature embeddings.

* * * * *